US012183200B1

(12) United States Patent
Lambert et al.

(10) Patent No.: US 12,183,200 B1
(45) Date of Patent: Dec. 31, 2024

(54) VEHICLE PARKING LOCATION IDENTIFICATION

(71) Applicant: Lytx, Inc., San Diego, CA (US)

(72) Inventors: Daniel Lambert, Carlsbad, CA (US); Dennis Cheng, Bellevue, WA (US); Chris Rice, El Cajon, CA (US); Anton Volodko, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 17/992,748

(22) Filed: Nov. 22, 2022

(51) Int. Cl.
*G08G 1/14* (2006.01)

(52) U.S. Cl.
CPC .................................... *G08G 1/146* (2013.01)

(58) Field of Classification Search
CPC ...................................................... G08G 1/146
See application file for complete search history.

(56) References Cited

U.S. PATENT DOCUMENTS 10,921,487 B1 2/2021 Wagstaff
11,904,889 B1 * 2/2024 Lumb ................ B60W 60/001
2019/0250621 A1 * 8/2019 Ghannam ........ G08G 1/096741
2020/0142419 A1 * 5/2020 Pohl ..................... G05D 1/0214
2022/0044344 A1 * 2/2022 Ramot ................... G06Q 50/40
2022/0203935 A1 * 6/2022 Kim ....................... B60R 25/305
2023/0119295 A1 * 4/2023 Nilsson .................. G08G 1/143
701/26

OTHER PUBLICATIONS

"Is Your Driver a 'Sitting Duck'?", SmartDrive, Accessed Aug. 15, 2022 from https://www.smartdrive.net/sitting_duck.

* cited by examiner

*Primary Examiner* — Mohamed Barakat
(74) *Attorney, Agent, or Firm* — Van Pelt, Yi & James LLP

(57) ABSTRACT

The present application discloses a method, system, and computer system for providing a unified map and performing an active measure for re-routing transport based on one or more hazards along a current route. The method includes obtaining context information for a managed vehicle, obtaining map data, determining, based at least in part on the context information and the map data, whether the managed vehicle is parked in an unsafe location, in response to determining that the managed vehicle is parked in the unsafe location, determining whether to perform an active measure with respect to the managed vehicle, and in response to determining to perform the active measure, performing the active measure.

25 Claims, 20 Drawing Sheets

400

500

1300

1600

1700

1800

1900

2000

VEHICLE PARKING LOCATION IDENTIFICATION

BACKGROUND OF THE INVENTION

Modern transportation vehicles often include a vehicle management services in order to support driver safety, operational safety, and operational productivity. Examples of vehicle management services include receiving routing information, vehicle event recorders, providing alerts to vehicle operators such as to inform vehicle operators of expected high risk events, location-based services, etc. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane change, pedestrians, rain, accidents, risky maneuvers, unexpected locations, proximity risks, vehicle malfunctions, improper driver behavior, etc.).

BRIEF DESCRIPTION OF THE DRAWINGS

Various embodiments of the invention are disclosed in the following detailed description and the accompanying drawings.

DETAILED DESCRIPTION

Figure 1:
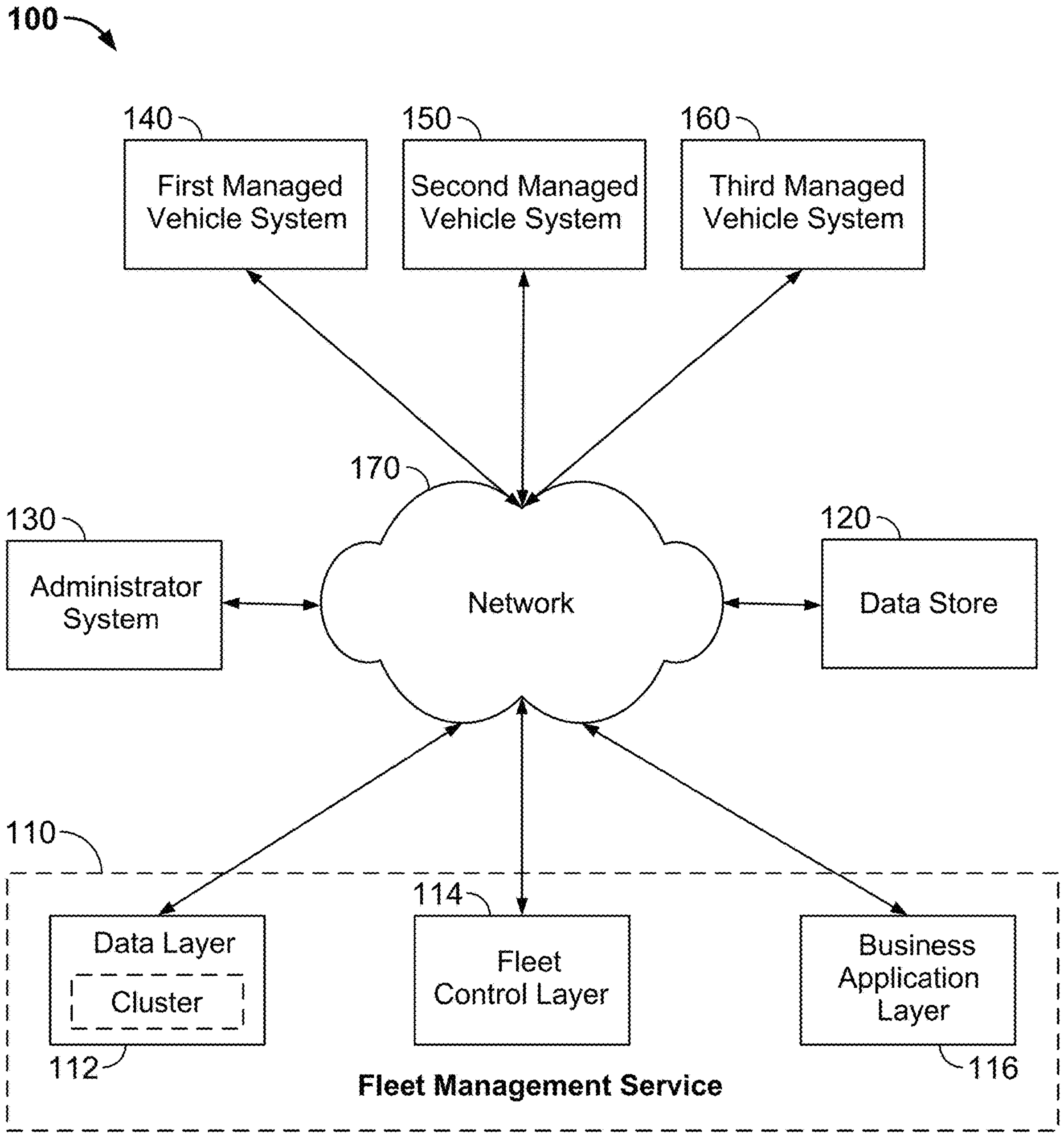
FIG. 1 is a block a diagram of a system for managing a fleet of vehicles according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a managed vehicle may include a vehicle that is in communication with a fleet management service. As an example, the managed vehicle may send to the fleet management service status information, context information, route information, etc. As another example, the managed vehicle may receive from the fleet management service various hazard information, routing information, etc. A managed vehicle may be a vehicle that is registered with fleet management service (e.g., to receive a management service such as re-routing, etc.). A managed vehicle may also be referred to herein as a vehicle.

As used herein, context information (e.g., for a managed vehicle) may include vehicle location, speed, direction of travel, a current route, an image (e.g., an interior or exterior image) captured by the managed vehicle, a status of the payload, an indication of the payload, a destination, driver information, etc.

As used herein, a sitting duck may include a managed vehicle that is parked in a manner or location that is not permitted. For example, a vehicle is deemed to be a sitting duck if the vehicle is parked in a manner or location that causes or, is subject to, one or more hazards. As an example, a vehicle may be deemed a sitting duck if the vehicle is parked too closely to a roadway having a speed limit or historical average speed greater than a predefined speed threshold. As another example, a vehicle may be deemed a sitting duck if the vehicle is parked in a location deemed to be an unsafe location. As another example, a vehicle may be deemed a sitting duck if the vehicle is parked in a restricted parking area (e.g., a predefined area).

Typically, fleet managers use various information to manually make decisions for managing vehicles. For example, in related art systems, fleet managers balance various inputs that may impact the route for a vehicle. Fleet managers use various web browser windows to obtain information that may impact a managed vehicle, such as road information, weather information, or traffic information applicable to a location of a managed vehicle or along the planned route for the managed vehicle. This poses a problem because such reliance on obtaining relevant information from separate sources and the manual decision making based on the separate information results in inefficient and error-prone decisions. Further, the reliance on third party sources to provide information relevant to a route(s) for one or more managed vehicles without confirmation that the information is accurate or relevant to decisions for fleet management.

Related art systems are unable to accurately assess whether a managed vehicle is parked improperly, parked in a restricted area, or otherwise in a manner in which the managed vehicle is deemed a sitting duck. For example, related art systems may classify a managed vehicle as a sitting duck merely obtains a broad geographical location of the managed vehicle and determines whether the managed vehicle is parked along a roadway. Accordingly, related art systems lack precise determinations of whether a managed vehicle is a sitting duck.

Accurate determination of whether a vehicle is a sitting duck is important because the parking of a vehicle can create a hazard or increased likelihood of a collision event. If the vehicle is a sitting duck, then the driver or vehicle, or other driver/vehicle may be injured during such a collision event. Accordingly, a vehicle that is a sitting duck may expose the driver or organization with which the driver/vehicle is associated to liabilities. Further, avoiding mischaracterization of the vehicle as a sitting duck is important to reduce the cost associated with moving the vehicle or unduly restricting locations at which the vehicle can safely park.

Various embodiments include a method, system, and device for managing parking of a set of one or more managed vehicle. The method includes (i) obtaining context information for a managed vehicle, (ii) obtaining map data, (iii) determining, based at least in part on the context information and the map data, whether the managed vehicle is parked in an unsafe location, (iv) in response to determining that the managed vehicle is parked in the unsafe location, determining whether to perform an active measure with respect to the managed vehicle, and (v) in response to determining to perform the active measure, performing the active measure. Examples of the active measure include alerting a fleet manager (e.g., sending an indication to a user interface of a client system used by the fleet manager), alerting a driver of the managed vehicle (e.g., sending an indication to a user interface of a client system associated with the driver or managed vehicle), determining recommended alternative parking locations, determining a route to an alternative parking location (e.g., a selected alternative parking location), etc.

Various embodiments include a method, system, and device for determining whether a vehicle is parked in an unsafe manner or unsafe location. For example, the method, system, and device determine whether a vehicle is a sitting duck. The method includes using one or more predefined heuristics (or set of rules) to determine whether the vehicle is parked in an unsafe manner or unsafe location based on (i) a current location of the vehicle, (ii) vehicle motion prior to a parked event, and/or (iii) map data. As an example, the system obtains the current location of the vehicle from the vehicle. Examples of vehicle motion prior to a parked event include a way to characterize how the vehicle moving prior to the parked event to help detect false positive parking events caused by construction vehicles on or next to the highway. In some embodiments, the GPS-only approach suffers from not having construction zone data and the lack of video detection of construction zones. In some embodiments, the characterization detects if the vehicle is driving normally or plausibly along the road as opposed to moving erratically within a construction zone on the highway or a parking lot next to it. The system can decrease the sitting duck confidence score if the driving maneuver prior to parking is "moving erratically" vs "driving-normally" using the vehicles' GPS trail from the 10 minutes prior to the parked event. This enables detection of a large number of false positives that are caused by construction vehicles operating in work zones on or adjacent to public roads. Using this characterization also enables the system to handle general GPS imprecision or dead-reckoning location estimation, which could incorrectly locate a vehicle on a public road when it is actually moving within a parking lot next to the road. In some embodiments, GPS data in a time window prior to being parked is used to differentiate normal or plausible driving pattern prior to parking as opposed to abnormal or implausible patterns (e.g., erratic movements of construction vehicles, work vehicles, etc.) on a road or area that is a construction zone and not a parking lot, which would exclude the vehicle from being parked unsafely. Examples of map data includes road data, traffic data, weather data, current traffic data, current weather data, predefined permitted parking areas (e.g., geofences for permitted parking areas), predefined restricted parking areas (e.g., geofences for locations in which vehicles are not to be parked or are otherwise deemed unsafe), or predefined exclusion zones (e.g., geofences for locations in which vehicles are not to be parked or are otherwise deemed unsafe).

In some embodiments, the system determines a composite score pertaining to a prediction of whether the vehicle is parked as a sitting duck. For example, the composite score corresponds to a likelihood or confidence level that the vehicle is parked as a sitting duck. The system uses the composite score to determine whether the vehicle is to be deemed a parking duck. For example, the system compares the composite score to a predefined scoring threshold for a vehicle to be a sitting duck. A composite score greater than, or equal to, the predefined scoring threshold is indicative of the vehicle being a sitting duck (e.g., the system deems the vehicle to be a sitting duck). The predefined scoring threshold can be set by an administrator, such as a fleet manager, to adjust the sensitivity for detecting sitting ducks. In some embodiments, the scoring is lowest score is best in which case a composite score less than, or equal to a threshold is indicative of a vehicle being a sitting duck.

The composite score pertaining to the prediction of whether the vehicle is parked as a sitting duck is determined based at least in part on assessing the parking of the vehicle using one or more predefined heuristics. For example, the composite score is computed using a scoring function that uses weighted values for the various predefined heuristics to determine the composite score. In some embodiments, each weighted value is computed by analyzing the location of the vehicle and determining whether the corresponding heuristic is indicative of the vehicle being a sitting duck. Examples of predefined heuristics include (a) a centroid of the vehicle being within the middle third of a roadway (e.g., a particular road such as a highway), (b) the vehicle parked within a predefined distance of the edge of a road (e.g., a vehicle within 3 m of the road), (c) a vehicle location being on a road and traffic data indicating that the road has congestion (e.g., a slow moving traffic), (d) a vehicle location being within a predefined restricted parking area, (e) a vehicle being within a predefined permitted parking area, (f) a vehicle being within a predefined exclusion zone, (g) a vehicle location being along a road that connects a major highway, (h) a distance by which a vehicle location has changed over a predefined amount of time (e.g., movement of the vehicle over 30 seconds, etc.), (i) the vehicle being on any part of a particular type of paved road (e.g., a high-speed road such as a highway, a road for which a historical collision rate exceeds a collision threshold, a road having a posted speed limit or average traffic speed in excess of a speed threshold, etc.), ( ) the speed of the vehicle being greater than a predetermined parked speed threshold (e.g., 2 mph). The system may implement any combination of the foregoing examples of predefined heuristics. Various other heuristics may be applied.

In some embodiments, in the absence of a posted speed, the free flow speed of a road is estimated by analyzing map data. For example, the system analyzes map data including one or more of: traffic volume, roadway type (e.g., interstate, freeway, city street), roadway features (e.g., curves, hills, number of lanes), roadway setting (e.g., urban, rural, residential, woodland, farmland), number and spacing of driveways or intersections, sight distances, etc. to determine an estimate of speed for road or estimate of speed limit for road.

In some embodiments, the system determines that a status of the vehicle is a pending status (e.g., a pending sitting duck status) based on a determination that the vehicle satisfies one or more predefined heuristics or has an associated composite score that is indicative of the vehicle being a sitting duck. The system deems the vehicle to be a pending sitting duck if the system determines that the vehicle has not been parked for at least a predefined length of time. For example, the system assesses whether the vehicle is a sitting duck in response to determining that the vehicle has been parked for a first threshold length of time (e.g., 5 minutes, etc.). In response to determining that the first threshold length of time, the system determines whether the vehicle is a pending sitting duck based on the one or more heuristics. In response to determining that the vehicle is a pending sitting duck, the system waits a second threshold length of time (e.g., 10 minutes from the time the vehicle was last detected, 5 minutes from the time that the state of the vehicle was determined to be a pending sitting duck, etc.) and determines whether the vehicle has moved. In response to determining that the vehicle has not moved after the second threshold length of time (e.g., if the distance moved by the vehicle is less than a predefined threshold distance, such as a threshold distance that may account for variation in precise location data from, for example, a global positioning system), the system deems/confirms that the vehicle is a sitting duck (e.g., a declared sitting duck status, a declared status, etc.). In response to deeming the vehicle as a sitting duck, the system may perform an active measure such as alert the fleet manager, the driver, and/or another user.

In some embodiments, the system uses the map data to determine road data such as a location at which the roads are paved (e.g., geographic coordinates for road paving), a type of road (e.g., an interstate, a highway), a direction of traffic, a posted speed limit, construction data (e.g., an indication that a particular road or part of the road is undergoing construction), geofenced areas, etc. As an example, the map data may further include historical information such as historical collision rates or numbers along a road or a particular part of the road, historical average speeds (e.g., average speeds that may be based on a time of day), historical traffic patterns, etc. As an example, the map data includes predefined permitted parking areas (e.g., designated parking lots or other areas that an administrator has preset as permitted, such as on-ramps, off ramps, certain lengths of the road, etc.). As another example, the map data includes predefined areas in which parking is deemed safe. The geofenced areas are used to denote certain features/locations, such as toll booths, parking lots, border crossings, bus stops, flood zones, foggy zones (e.g., zones in which fog occurs often or under certain conditions), etc.

The system uses the current location of a vehicle and the map data to determine positioning of the vehicle in relation to the roads, and to determine whether the vehicle is deemed a sitting duck. For example, an area on the map may correspond to an exclusion zone because a parking lot is located under the freeway (e.g., under a bridge, in an underpass, etc.), such as a construction lot. The overlapping freeway area and parking lot make discerning whether the vehicle is parked in the parking lot or the freeway difficult. Accordingly, the system deems such area on the map corresponding to the overlapping freeway and the parking lot as a predefined exclusion zone. The system stores a geofence (e.g., geographical coordinates corresponding to the predefined exclusion zone). When the system determines that a vehicle in such area has not moved but the location data indicates that the location of the vehicle corresponds to an area of the road that overlaps the parking lot, the system excludes such a context from determining that the vehicle is a sitting duck. For example, in response to determining that the vehicle location corresponds to (e.g., matches) the predefined exclusion zone, the system does not perform other checks with respect to assessing whether the vehicle is a sitting duck (e.g., the system does not perform a check with respect to traffic data, etc.).

A managed vehicle uses a global positioning system to determine its precise location and reports its current location to the system (e.g., a fleet management service). As an example, the managed vehicle sends its current location to the system according to a predefined frequency or schedule. As another example, the managed vehicle sends its current location to the system in response to a query from the system. Querying a managed vehicle to report high-resolution (e.g., high frequency such as 2 hz location data, a 30 second breadcrumb of location data, etc.) location and visual data is generally costly (e.g., time and compute resources are needed to perform the querying). In some embodiments, the system uses low-resolution non-visual location data for the managed vehicle (e.g., a location reported by the managed vehicle) to determine whether the vehicle satisfies some preliminary criteria for being a sitting duck, such as being located on a certain type of road or stopped on the road, etc. For example, if the system determines that the vehicle is stopped along a particular type of road (e.g., a highway), the system determines to query the managed vehicle for more refined location data, such as location data captured over a threshold period of time (e.g., thirty seconds, etc.). As another example, the preliminary criteria may include (i) the vehicle being stopped, (ii) the vehicle within proximity of a certain type of road, and (iii) the absence of congested traffic in the area in which the vehicle is located. The system queries the managed vehicle for the higher-resolution location and/or visual data. In some embodiments, the visual (video/image) data is used as an additional layer of validation to detect unknown construction zones (e.g., unpaved, equipment, cones, etc.), parking lots, sudden traffic backups not available from live traffic providers yet such as a crash or long train crossing delay, etc. The system uses the higher-resolution location data to determine whether the vehicle is moving or is actually stopped. For example, the system compares a location of the centroid of the vehicle at a first time and the location of the centroid of the vehicle at a second time, and determines whether the vehicle has moved (e.g., more than a threshold distance) based on the comparison. The threshold distance used in determining whether the vehicle has moved based on comparison of vehicle location at two different time points can be configurable based on a desired sensitivity. As an example, the threshold distance is 100 m.

In some embodiments, in response to receiving location data for the vehicle, the system generates a bounding box corresponding to a shape and size of the vehicle. The system computes the bounding box based at least in part on (i) vehicle information (e.g., a type of trailer, a type of truck, etc.) mapped to the vehicle, such as in a mapping of vehicle identifiers to vehicle information, or (ii) a predefined standard size/shape of vehicles. For example, in the case of a fleet of transport trucks, the size/shape of the transport trucks in the fleet may be the same, and thus the predefined standard/size/shape of the transport trucks can be configured (e.g., by a user such as the fleet manager). In some embodiments, the bounding box is sufficiently large to include the vehicle therein, taking into account the jitter of location data over a threshold period of time. For example, location data obtained using a global positioning data may experience jitter even though the underlying object has not moved. The jitter corresponds to an imprecision in the measurement of the vehicle location. If the bounding box is larger than the range over which jitter associated with the location data may be observed, the system determines that the vehicle has moved if the vehicle location is outside the bounding box (or a threshold percentage of the vehicle has moved outside the bounding box). As an example, the size of the bounding box may be determined empirically based on historical location data and deviations in location data for a stationary object. As another example, the size of the bounding box may be dynamic based on the system computing a current amount of jitter being observed in the vehicle location (or vehicle locations for a set of vehicles) and the size/shape of the vehicle.

In some embodiments, a parked vehicle is deemed a sitting duck based at least in part on a road within proximity to which the vehicle is parked. For example, the system determines a road type for the road and determines whether the vehicle is a sitting duck based at least in part on the road type (e.g., a classification of the road). The road type is determined based at least in part on the map data. In some embodiments, for roads within the map data, the map data includes road metadata associated with the road. The road metadata may include one or more of a preset road type, a posted speed limit, an average speed limit, a historical collision data (e.g., public collision database, private collision database, fleet collision database, etc.), etc. In some embodiments, the system determines the road type based at least in part on the road metadata. For example, the system uses a preset road type (e.g., classified by the department of transportation or data source provider, etc.) associated with a particular as the road type. As another example, the system obtains the preset road types/classifications and performs a re-classification based at least in part on one or more parameters. The parameters may be configured by a user, such as a fleet manager based on user/fleet preferences.

In some embodiments, the re-classified road types correspond to different levels of risk (e.g., extent to which the road or parking along the side or in proximity of the road is unsafe). Examples of the parameters used in connection with re-classifying roads within map data include: posted speed limit, historical average traffic speed (e.g., overall or at the particular time at which sitting duck assessment is performed), number of lanes, width of road proximity to area type (e.g., urban area, suburban area, rural area, etc.), historical traffic congestion, an indication that the road is an interstate highway, an indication that the road is a road one class below interstate highway (e.g., state highways), an indication whether the road is paved, an indication whether the road connects to a highway (e.g., an arterial road), etc. For example, the system re-classifies roads in accordance with one or more types defined in Table 1. In some embodiments, the system temporarily re-classifies roads based on weather conditions (e.g., in response to winds being above a threshold—for example, X MPH) drivers are allowed to park on the side of a highway to protect from roll overs. Various other classification schemes may be implemented. In some embodiments, the upper speed threshold of Table 1 is a different speed than 50 mph—for example, 40 mph, 60 mph, 70 mph, 30 mph, etc. In some embodiments, the lower speed threshold of Table 1 is a different speed than 25 mph—for example, 5 mph, 10 mph, 15 mph, 20 mph, etc.

TABLE 1

| Custom Road Classification | Criteria for Road Type |
|---|---|
| Type 1 | Interstate highways & ramps<br>Highways in class immediately below interstate highways (e.g., state highways)<br>Posted road speed limit ≥ 50 mph<br>Roads where roadside parking or stopping is not legally permitted<br>Paved public roads in all localities |

TABLE 1-continued

| Custom Road Classification | Criteria for Road Type |
|---|---|
| Type 2 | Secondary highways & ramps not in Type 1 roads<br>Posted road speed limit ≥ 50 mph<br>Roads where roadside parking or stopping is not legally permitted<br>Paved public roads only in urban, suburban, and rural localities |
| Type 3 | Any highways & ramps not in Type 2 roads<br>Posted road speed limit > 25 mph and < 50 mph<br>Roads where roadside parking or stopping is not legally permitted<br>Paved public roads in urban and suburban localities with roads segments ≥ 1 mile in length without traffic control devices, intersections, or access points such as driveways.<br>2 or more lanes in each direction on roads without a median divider<br>1 or more lanes in each direction on roads with a median divider |
| Type 4 | Posted road speed limit is unavailable or unknown to map providers<br>Roads where roadside parking or stopping is not legally permitted<br>Paved public roads in rural localities where free flow speeds are >= 25 mph that do not have traffic control devices, intersections, or access points such as driveways nearby. |

In some embodiments, the scoring function (e.g., for determining the composite score used to assess whether a vehicle is a sitting duck) is based at least in part on the classification (e.g., road type) for the road along which the vehicle is located (or in proximity to). For example, the scoring function may more likely classify a parked vehicle as a sitting duck on a Type 1 road than a Type 4 road. As another example, the system does not assess whether a vehicle is a sitting duck if the vehicle is stopped on a Type 4 road. In some embodiments, the system does not assess whether a vehicle is a sitting duck if the vehicle is stopped on a Type 3 road. As another example, if a vehicle is parked on a Type 1 road and traffic data indicates that the road does not have traffic congestion where the vehicle is stopped, then the system determines that the vehicle is a sitting duck if the vehicle is located on a paved portion of the road (e.g., the roadway or the road shoulder, etc.); if the vehicle is stopped further from the road on an unpaved portion (e.g., a grassy area), the system deems the vehicle to not be a sitting duck. The system may further assess whether the vehicle on the Type 1 road is parked in a permitted parking area or an exclusion zone along the road (e.g., a parking lot underneath the road). As another example, if a vehicle is stopped on a Type 2 road, the system determines whether the road is parked within a predefined distance of the side of the road (e.g., 3 m). If the road is parked within the predefined distance of the side of the road, the system deems the vehicle to be a sitting duck. Conversely, if the road is parked at a distance beyond the predefined distance of the road, then the system deems the vehicle to not be a sitting duck.

In some embodiments, the system improves the computer by providing a system to more efficiently manage a fleet of vehicles. The system enables more accurate determination of a hazardous situation for a vehicle in a fleet enabling more timely ability to perform active measures to avoid the hazardous situation for a vehicle of the fleet being managed.

FIG. 1 is a block a diagram of a system for managing a fleet of vehicles according to various embodiments of the present application. According to various embodiments, system 100 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or process 1600 of FIG. 16.

In the example illustrated in FIG. 1, system 100 includes fleet management service 110, data store 120, administrator system 130, and systems for one or more managed vehicles such as first managed vehicle system 140, second managed vehicle system 150, and/or third managed vehicle system 160. In some embodiments, fleet management service 110 and/or data store 120 are integrated (e.g., combined into a layer or a single set of servers). System 100 further includes one or more networks such as network 170 over which administrator system 130 and/or first managed vehicle system 140, second managed vehicle system 150, and/or third managed vehicle system 160 communicates with fleet management service 110 or data store 120. In various embodiments, network 170 includes one or more of a wired network, and/or a wireless network such as a cellular network, a wireless local area network (WLAN), or any other appropriate network. System 100 may include various other systems or devices. In some embodiments, system 100 further includes one or more data sources such as third-party data sources (e.g., traffic information, weather information) or information provided by governments (e.g., road information such as collision rates, speed limits, etc.). Fleet management service 110 obtains information from the one or more data sources in connection with managing safety of parked vehicles and/or determining and implementing an active measure. For example, fleet management service 110 obtains information from the one or more data sources in connection with generating a map (e.g., a unified map comprising a plurality of layers of different types of data) and using the map and vehicle location data to determine whether the vehicle is parked and/or a sitting duck. For example, fleet management service 110 may poll/query the data source(s) for current information or the data source(s) pushes the information to fleet management service or data store 120 (which in turn may be queried by fleet management service 110).

In some embodiments, fleet management service 110 comprises data layer 112, fleet control layer 114, and business application layer 116. Data layer 112, fleet control layer 114, and/or business application layer 116 can be respectively implemented by one or more servers. In some implementations, data layer 112, fleet control layer 114, and/or business application layer 116 are implemented by a same set of one or more servers. In some embodiments, system 100 comprises a plurality of data layers that respectively process data pertaining to various tenants or customers. For example, each data layer can be instantiated and implemented for a different tenant or customer. Fleet management service 110 may implement different instances for different fleets of managed vehicles, etc.

In some embodiments, system 100 uses fleet control layer 114 to perform various functions pertaining to control/management of a set of managed vehicles (e.g., a fleet). Examples of functions implemented by fleet control layer 114 include generating a unified map generation, determining and/or implementing an active measure, determining of whether the vehicle(s) is stopped, determining whether the vehicle(s) is parked, determining whether the vehicle is a sitting duck, re-classifying road types, etc.

According to various embodiments, fleet management service 110 performs management of a fleet of vehicles (e.g., a set of managed vehicles) or otherwise provides functionality or information to a fleet manager (e.g., a user associated with the set of managed vehicles) for use in connection with managing the fleet of vehicles. In some embodiments, fleet management service 110 actively monitors the fleet of vehicles to determine if/when a vehicle has stopped, whether the vehicle has parked, and whether the vehicle is a sitting duck (e.g., if the vehicle is parked in a hazardous location). For example, fleet management service 110 periodically (e.g., according to a preset frequency) receives location data for a set of managed vehicles (e.g., first managed vehicle system 140, second managed vehicle system 150, and/or third managed vehicle system 160) for each vehicle in the set of managed vehicles whether a vehicle is a sitting duck. In response to determining that the vehicle is a sitting duck, performing an active measure (e.g., alerting a fleet manager, alerting a driver, determining an alternative parking location recommendation, etc.).

In some embodiments, Fleet management service 110 can receive requests to update data for one or more managed vehicles from administrator system 130 (e.g., used by a fleet manager) and/or systems for one or more managed vehicles such as first managed vehicle system 140, second managed vehicle system 150, and/or third managed vehicle system 160. For example, fleet management service 110 can receive a request to obtain current vehicle location and/or determine whether a particular vehicle is parked as a sitting duck. In response to receiving the request, fleet management service 110 obtains a current vehicle location for the particular vehicle and determines whether the particular vehicle is parked as a sitting duck (e.g., based on map data for the area and the current vehicle location).

In some embodiments, system 100 uses fleet management service 110 to monitor movement or parking of managed vehicles. Fleet management service 110 determines whether a vehicle is parked as a sitting duck based at least in part on map data. The map data may correspond to a unified map that fleet management service 110 generates based on a plurality of source data, such as map and road data, weather data, traffic data, road closure data, road construction data, parking data (e.g., predefined restricted parking areas, predefined permitted parking areas, and/or predefined exclusion zones), etc. The source data may be stored in data store 120 among one or more datasets or may be received via third party data sources/services such as in the form of a data stream (e.g., a weather service, a traffic service, etc.). In some embodiments, fleet management service 110 queries the one or more third party data sources/services for the source data in connection with generating/updating the map data, such as a unified map (e.g., in response to determining that a unified map is to be generated or updated, or in response to determining that a parking assessment is to be performed). In some embodiments, fleet management service 110 periodically queries, or receives from, the one or more third party data sources/services for the source data. As an example, administrator system 130, first managed vehicle system 140, second managed vehicle system 150, and/or third managed vehicle system 160, and/or third-party data sources/services are connected to fleet management service 110 via a connector, such as an application programming interface (API).

In some embodiments, fleet management service 110 updates the map data (e.g., the unified map) according to a predefined frequency/time interval. The predefined frequency may be configured to ensure that the unified map comprises accurate information that is relevant when determining whether a parked vehicle is a sitting duck. For example, the vehicle location data may be obtained every 15 seconds, 30 seconds, 60 seconds, etc. and the fleet management service 110 updates the unified map with the vehicle location. In some embodiments, the unified map is presented to a user, for example, to allow fleet managers to have visibility of the fleet and the status of one or more of the managed vehicles in the fleet. The unified map may include recommended active measures such as emphatic display of recommended alternative parking locations, etc. In some embodiments, fleet management service 110 provides a unified map, information pertaining to the unified map (e.g., a set of indicators comprised in the unified map), information pertaining to an active measure (e.g., a list of potential/recommended active measures), or an interface to receive or provide an instruction to implement an active measure (e.g., an update to a managed vehicle route), such as in response to data requests. For example, the data requests can be communicated to fleet management service 110 by a client system (e.g., managed vehicle system 140). In some embodiments, fleet management service 110 receives a data request from administrator system 130 in connection with a fleet manager using fleet management service 110 to manage a fleet, to monitor a status of the fleet, to ensure that vehicles in the fleet are safely parked, etc.

In response to receiving a request for a unified map (e.g., a newly generated unified map, an update to a unified map, etc.) or to perform a monitoring/assessment of whether a vehicle is safely parked, fleet management service 110 obtains the applicable source data from data store 120, a managed vehicle (e.g., first managed vehicle system 140, second managed vehicle system 150, and/or third managed vehicle system 160), and/or a third party service(s)/system(s) and generates/update the unified map. As an example, the request for the unified map may include, or be associated with, a particular geographic area. As another example, the geographic area is determined based on the one or more managed vehicles for which the unified map is to be generated/updated or that are to be managed or monitored to ensure safe parking. Fleet management service 110 uses the geographic area to obtain the applicable/relevant source data. For example, fleet management service 110 obtains weather data for the geographic area, traffic data for roads within the geographic area, or roads corresponding to a predefined route for a managed vehicle(s), map and road data (e.g., road classifications, road dimensions, number of lanes, posted speed limit, etc.), etc. Fleet management service 110 analyzes the source data to determine locations of a set of managed vehicles, determine whether the managed vehicle(s) are stopped, determine whether the managed vehicle(s) are parked, and determine whether a parked managed vehicle is a sitting duck. Fleet management service 110 may generate a unified map in connection with monitoring a fleet or determining whether a parked managed vehicle is a sitting duck. In response to receiving the source data, fleet management service 110 generates the unified map, including generating one or more layers for the unified map. For example, fleet management service 110 annotates a standard geographic/road map with information pertaining to one or more of identified driving conditions, parking conditions, or other conditions that may impact a parked vehicle (e.g., a flood warning, a flood zone), indicators for predefined permitted parking areas, predefined restricted parking areas, or exclusion zones, hazardous parking conditions (e.g., indicators that vehicles that are unsafely parked are sitting ducks), etc. The annotating of a standard geographic/road map includes generating indicators for the driving conditions or various other conditions or information and configuring one or more layers to include such indicators. The one or more layers for the unified map may be toggled on/off and when toggled on (e.g., to be displayed), the one or more layers are provided as an overlay to the standard geographic/road map. In some embodiments, the standard geographic/road map is predefined (e.g., stored in data store 120) or a service provider for the geographic standard geographic/road map is predefined.

Fleet management service 110 uses data layer 112 to obtain the source data to be used in connection with generating/updating a unified map or implementing an active measure. In response to fleet management service 110 determining to generate/update the unified map (e.g., in response to receiving a request from a fleet manager via fleet control layer 114), fleet management service instructs/causes data layer 112 to obtain the applicable source data. Data layer 112 can obtain the applicable source data by querying data store 120, a third-party service/data source, and/or a managed vehicle (e.g., first managed vehicle system 140, second managed vehicle system 150, and/or third managed vehicle system 160). Fleet management service 110 also uses data layer 112 to generate the unified map, such as based on parameters provided by fleet control layer 114 (e.g., parameters that are predefined for a fleet or user or that are received from a fleet manager such as via administrator system 130).

The unified map comprises various different types of data, such as performance data, local data, and third-party data. The unified map presents the various types of data (e.g., collectively referred to herein as unified map data) in a format that enables fleet managers or drivers of managed vehicles to have integrated information of the fleet and the context of the fleet (e.g., driving conditions or other potential impacts to the fleet safety, etc.). The unified map enables fleet managers to identify dangerous areas (e.g., based on emphatic display of hazardous areas), dangerous context for vehicles (e.g., vehicles parked as sitting ducks, vehicles parked in areas expected to be impacted by a weather condition), and to perform global fleet routing/management in a manner that avoids the dangerous areas or conditions, or mitigates the risk associated with the dangerous areas. Further, an association of current images (or ability to retrieve images in real-time from a managed vehicle in a particular area) allows a fleet manager or driver to quickly view and assess the road conditions for a particular road (e.g., to obtain real-time driving conditions), such as a road along which a managed vehicle is parked. For example, an area of the map may be subject to snowstorm conditions according to weather data, but a current image of the area may show that the driving conditions are not hazardous (e.g., the roads may be plowed, or the snowstorm may not have impacted the particular area). The unified map improves on interfaces implemented by related art systems in which fleet managers use distinct interfaces (e.g., browser windows) for the different types of information. Under related art systems, fleet managers struggle with assembling the entire context of the fleet to make informed decisions on routing and fleet safety. The unified map comprises a plurality of layers that can be toggled on/off to enable the system or fleet managers to make quick assessments of whether a managed vehicle is experiencing, or is expected to experience, a driving condition (e.g., a hazardous driving condition), and whether to perform an active measure (e.g., a change in route, slowing down, stopping, etc.).

Fleet management service 110 uses fleet control layer 114 to obtain/communicate information, instructions, or requests from/to a fleet manager or managed vehicle, such as via administrator system 130 or first managed vehicle system 140, second managed vehicle system 150, and/or third managed vehicle system 160. For example, fleet control layer 114 configures a user interface based on the unified map or other information pertaining to sitting duck assessments (e.g., determinations of whether a parked vehicle is a sitting duck) generated/updated by data layer 112, and fleet control layer 114 provides the user interface to the fleet manager or a managed vehicle. Fleet control layer 114 can receive from a user a request for a unified map, information pertaining to a fleet, or an assessment of whether a particular vehicle is parked as a sitting duck. In response to receiving the request for the unified map, fleet control layer 114 causes the unified map to be generated/updated. In response to obtaining the unified map, fleet control layer 114 configures the user interface based on the unified map, such as to include the unified map (or a part thereof) or information obtained from the unified map (e.g., indicators of driving conditions, route information, etc.). Fleet control layer 114 then provides the user interface (e.g., the unified map or information pertaining to the unified map) to a user. The user can interact with the user interface, such as to toggle information/layers of the unified map on/off, to select selectable elements provided on the user interface, to select an indicator corresponding to a particular managed vehicle for further information or active measures, etc. As an example, the user uses the user interface to select an active measure (e.g., from among a set of recommended active measures), to accept an active measure (e.g., to confirm a recommended parking location and generation of a route to the parking location), to toggle the granularity of information pertaining to a driving condition or parking condition that is provided on the user interface, etc.

In some embodiments, fleet management service 110 uses fleet control layer 114 to respond to queries for data with respect to a particular managed vehicle or in connection with controlling the processing of various data requests such as generating a unified map, determining whether a vehicle is parked, determining whether a parked vehicle is a sitting duck, recommending active measures, implementing active measures, etc. As an example, administrator system 130, first managed vehicle system 140, second managed vehicle system 150, and/or third managed vehicle system 160 use an API to connect to fleet management service 110 and configure one or more settings for obtaining vehicle information (e.g., vehicle status, route, driver, vehicle size, vehicle shape, vehicle type/class, corresponding geographic area, unified map, a frequency according to which a vehicle is to provide its current location, etc.). Fleet control layer 114 receives the configurations, queries, etc. from the API, queries data store 120 for data responsive to the query or requests data layer 112 to perform a fleet management control (e.g., generate/update a unified map, generate recommended active measures, retrieving a current image captured by a vehicle deemed to be parked, determine whether a vehicle is parked, etc.), and provides the data to the system or service requesting the data.

According to various embodiments, system 100 comprises data store 120. System 100 uses data store 120 to store one or more datasets comprising data pertaining to a fleet of managed vehicles (e.g., location data, route information, vehicle information, map information, current images, etc.). In some embodiments, data store 120 stores one or more datasets comprising data pertaining to fleet or vehicle configurations, such as predefined permitted parking areas, predefined restricted parking areas, predefined exclusion zones, or other parking preferences. Data store 120 may further store one or more datasets comprising data pertaining to map and road data, such as road identifier, posted speed limit, historical average speed limit (either generally or at a predefined time of day/week), flood zone information, construction zone information, road classification (e.g., interstate, state highway, rural road, etc.), road dimensions, a road surface composition indicator of whether the road is paved, road international roughness index (IRI), number of lanes, lane width, total width of the road, geo-coordinates for the road (e.g., the boundaries, center line, etc.), right and left shoulder width, traffic control devices, intersections, road access points, annual average daily traffic (AADT), road grade/slope, elevation, road sightlines, road length, radius, and angle of horizontal curves, etc. In some embodiments, data store 120 includes road metadata (e.g., as sourced from a database such as the United States Department of Transportation, OpenStreetMap, etc.).

Data store 120 can store datasets for a plurality of tenants or customers serviced by fleet management service 110. In some embodiments, fleet management service 110 uses datasets across tenants or customers. For example, fleet management service 110 queries/retrieves current images from managed vehicles across a plurality of tenants/customers to obtain a current image with respect to a particular location or driving conditions. In response to detecting a parking condition (e.g., a hazard that may impact a parked vehicle), fleet management service 110 may determine that a first managed vehicle of a first fleet (e.g., a first customer) is expected to be impacted by the parking condition (e.g., the current parking location is in a flood zone and current weather data comprises an amount of precipitation that exceeds a predefined precipitation threshold or a flash flood warning), and fleet management service may query current images pertaining to a location (e.g., within a predefined distance) of the driving location that are captured by the managed vehicles of the first fleet (e.g., fleet management service 110 may query the first managed vehicle to capture a current image using a camera coupled to the vehicle). In response to determining that the current images captured by the managed vehicles of the first fleet do not include the location of the parking condition (e.g., within a predefined time threshold), fleet management service 110 may determine that a second managed vehicle of a second fleet is within the location for the driving condition, and fleet management service 110 requests the second managed vehicle to capture a current image and send the current image to fleet management service 110. Fleet management service 110 then uses the current image in connection with assessing the parking condition, determining an active measure, and/or providing a recommended route to an alternative parking location for the first managed vehicle, etc.

According to various embodiments, system 100 comprises administrator system 130 for use by an administrator such as an administrator of fleet management service 110 or an administrator or a user associated with data store 120 and/or an instance of fleet management service 110, such as a fleet manager. For example, administrator system 130 comprises a system for communication, data access, computation, etc. A user uses administrator system 130 to maintain a dataset stored in data store 120, to define and manage applications provided by system 100, to set data management policies, to set parking policies, to set routing policies, to set active measure policies, to set current image policies (e.g., retention policies, permissions, etc.), to provide various system configurations or settings, etc. For example, a user uses administrator system 130 to define one or more security policies that are to be enforced (e.g., by fleet management service 110, data layer 112, and/or fleet control layer 114) with respect to a data stored at data store 120. In some embodiments, administrator system 130 communicates with fleet management service 110 via a web-interface (e.g., by using a web browser, etc.). For example, administrator system 130 communicates with fleet management service 110 via a web-browser installed on administrator system 130 (e.g., via a user interface configured by an application running on fleet management service 110). In some embodiments, administrator system 130 communicates with fleet management service 110 via an application or service running on administrator system 130 (e.g., a connector or API corresponding to fleet management service 110).

According to various embodiments, fleet management service 110 comprises business application layer 116. Fleet management service 110 uses business application layer 116 to provide an interface via which a user (e.g., using administrator system 130, etc.) may interact with various applications such as a development application for developing a feature or model for analyzing the data stored in the data store 120 (e.g., a feature/model for detecting driving conditions, a feature/model for classifying driving conditions, a feature/model for generating a unified map, a feature/model for determining active measures, a feature/model for routing vehicles, etc.), an application for querying a dataset stored in data store 120, an application for analyzing/manipulating a data entity (e.g., an image, map data, vehicle data, the dataset, etc.), an application to access files stored in a dataset (e.g., a dataset stored in data store 120), etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and send the formatted query to data layer 112). Business application layer 116 may query fleet control layer 114, which in turn queries data layer 112. As another example, a user uses an interface provided/configured by business application layer 116 to configure (e.g., define) one or more security policies, including configuring access permissions to files, data entities, and/or one or more data management policies.

According to various embodiments, system 100 comprises one or more managed vehicles. The managed vehicles communicate with system (e.g., fleet management service 110) via a managed vehicle system (e.g., first managed vehicle system 140, second managed vehicle system 150, and/or third managed vehicle system 160). The managed vehicles may correspond to a single fleet (e.g., a single tenant/customer), or may correspond to a plurality of fleets. The managed vehicle system is used by a user such as a driver of a managed vehicle to communicate with fleet management service 110 (e.g., business application layer 116) and/or data stored in data store 120. For example, the managed vehicle system obtains from fleet management service 110 route information, map and road data, parking data, a unified map, alerts of driving or parking conditions, traffic information, weather information, etc. As an example, the managed vehicle system communicates with fleet management service 110 via a web-interface. In some embodiments, the managed vehicle system communicates with fleet management service 110 via an application or service running on a managed vehicle system (e.g., a module such as a connector or API that interfaces with fleet management service 110).

Figure 2:
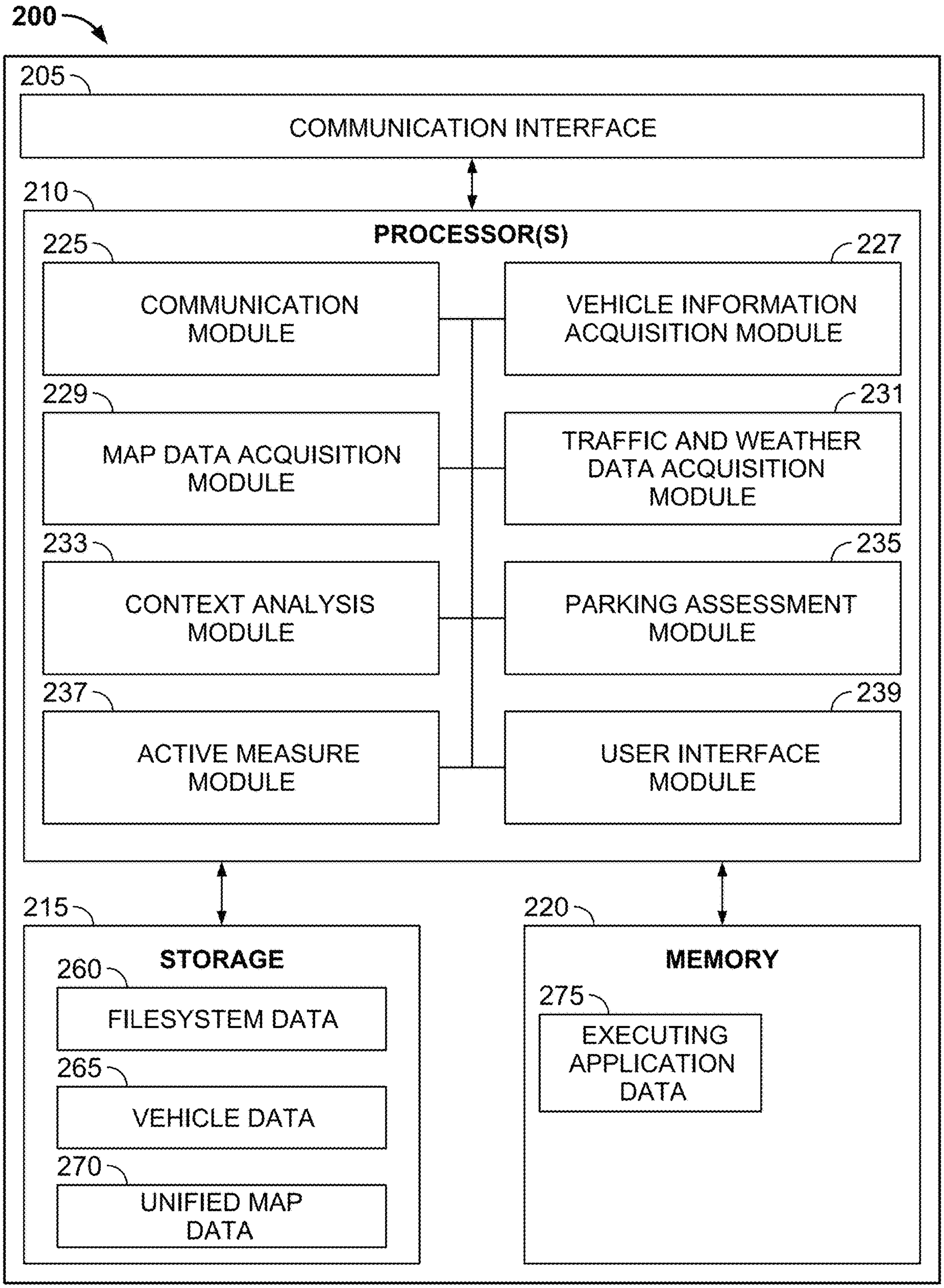
FIG. 2 is a block diagram of a fleet management service for managing managed vehicles according to various embodiments of the present application.

FIG. 2 is a block diagram of a fleet management service for managing managed vehicles according to various embodiments of the present application. According to various embodiments, system 200 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or process 1600 of FIG. 16.

In the example shown, system 200 implements one or more modules in connection with managing a fleet of managed vehicles, managing parking for the fleet of managed vehicles, detecting that a parked vehicle is a sitting duck, determining parking conditions, classifying parking conditions (e.g., criteria according to which a parking condition is identified, such as a flash flood warning in or around a flood zone, etc.), recommending or implementing an active measure for a managed vehicle, etc. System 200 comprises communication interface 205, one or more processors 210, storage 215, and/or memory 220. One or more processors 210 comprises, or implements, one or more of communication module 225, vehicle information acquisition module 227, map data acquisition module 229, traffic and weather data (e.g., live or current traffic and current weather data) acquisition module 231, context analysis module 233, parking assessment module 235, active measure module 237, and/or user interface module 239.

In some embodiments, system 200 comprises communication module 225. System 200 uses communication module 225 to communicate with various other systems such as a user system, an administrator system, a managed vehicle system, a data source (e.g., from which files comprising information to be ingested are received, such as a weather service, a traffic service, road data, etc.), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request for a parking assessment (e.g., a determination of whether a vehicle is parked as a sitting duck), a request for a unified map, a request for map data (e.g., traffic data, weather data, hazard data, etc.), a request for recommended active measures (e.g., alternative parking locations), a request for routing information (e.g., an updated route based on detected driving conditions), a security policy, an access policy, a fleet management policy, a routing policy, an active measure policy, a driving condition classification policy, a storage system configuration such as a configuration for a partitioning of data, a selection of an active measure, etc. The user input to the user system can include a query for a file (e.g., a csv file, a library, a module, etc.), a query for a data (e.g., a unified map, traffic data, weather data, hazard data, etc.), a request to set one or more security policies (e.g., a permission with respect to accessing a file), etc. Communication module 225 is configured to provide various user systems or data requesting services with information such as a user interface (e.g., an interface corresponding to a managed vehicle dashboard, a unified map, driving condition information), information that is responsive to one or more queries or tasks requested to be executed, credentials for accessing data, etc. In some embodiments, communication module 225 communicates data responsive to data requests (e.g., unified map, routing information, current images, etc.).

In some embodiments, system 200 comprises vehicle information acquisition module 227. System 200 uses vehicle information acquisition module 227 to obtain vehicle information pertaining to fleet(s) of managed vehicles and/or a geographic area (e.g., a geographic area associated with a fleet of managed vehicles), etc. For example, vehicle information acquisition module 227 obtains a current vehicle location or other context data associated with the vehicle. In some embodiments, vehicle information comprises information obtained by one or more sensors for a managed vehicle(s). Vehicle information acquisition module 227 communicates with one or more data sources to obtain the driving information. The one or more data sources may be the particular managed vehicle (e.g., querying the vehicle for a current location) and/or third-party services, such as services with which system 200 is registered, etc. In some embodiments, vehicle information acquisition module 227 receives streams of information from the one or more data sources. For example, the one or more data services may push information to system 200. In some embodiments, vehicle information acquisition module 227 queries the one or more data sources, such as in accordance with a predetermined schedule or frequency, in response to requests for assessments of whether a vehicle is parked as a sitting duck, unified maps, recommendations for active measures, or routing information, etc. As an example, the predetermined schedule or frequency is set according to a driving information policy set by an administrator/fleet manager, etc.

A managed vehicle may obtain its location data based on an on-board global positioning system (GPS) system, etc. In some embodiments, vehicle information acquisition module 227 queries the one or more managed vehicles, such as in accordance with a predetermined schedule or frequency. The predetermined schedule or frequency may be set on a vehicle-by-vehicle basis or a fleet-by-fleet basis. For example, the predetermined schedule or frequency is set according to a vehicle location policy set by an administrator/fleet manager, etc. As an example, vehicle information acquisition module 227 obtains current location from a managed vehicle every 15 to 60 seconds. In some embodiments, vehicle information acquisition module 227 obtains current location from a managed vehicle every 15 seconds. In some embodiments, vehicle information acquisition module 227 obtains current location from a managed vehicle every 30 seconds. Various other time intervals may be used/configured. System 200 uses location data for the set of managed vehicles in connection with generating/updating a unified map, determining whether a managed vehicle is parked, determining whether a particular parked vehicle is a sitting duck, detecting relevant parking conditions (e.g., a parked vehicle that may be impacted by a hazard), providing recommendations for active measures, and/or determining relevant current images or vehicles to capture current images.

In some embodiments, system 200 comprises map data acquisition module 229. System 200 uses map data acquisition module 229 to obtain map data and/or road data. Map Data acquisition module 229 obtains the map data and/or road data from a data store, such as data store 120 of system 100, one or more third party services (e.g., department of transportation traffic cameras, a weather service, etc.), or from one or more managed vehicles, such as first managed vehicle system 140, second managed vehicle system 150, or third managed vehicle system 160. System 200 uses the map data and/or road data in connection with detecting whether a parking condition exists (or is predicted to exist), determining whether a parked vehicle is a sitting duck, generate a unified map (e.g., a map that aggregates different types of information to provide system 200 with a holistic view of the context of managed vehicles). For example, system 200 (e.g., parking assessment module, etc.) uses the map data and/or road data to generate a unified map. In some embodiments, map data acquisition module 229 obtains the map data and/or road data at predefined intervals, in response to obtaining a request for a determination of whether a parked vehicle is a sitting duck, in response to determining that a unified map is to be updated, etc. The predefined intervals can be set on a service-by-service basis, or a type of data-by-type of data basis. For example, system 200 receives a live stream of weather data or weather data that is refreshed at relatively short intervals. As another example, system 200 obtains road data less frequently (e.g., every week, every month, every 3 months, etc.) because characteristics of the roads do not change as frequently.

Examples of road data include road identifier, posted speed limit, historical average speed limit (either generally or at a predefined time of day/week), flood zone information, construction zone information, road classification (e.g., interstate, state highway, ramp, rural road, public or private access road, etc.), road dimensions, length, angle, turn direction, radius, slope/grade, elevation, a road surface composition (e.g., bituminous, concrete, gravel, unpaved, etc.), international roughness index (IRI), number of lanes, width of the road, presence of railroad crossings, intersections, driveways, road access points, crosswalks, traffic control devices present, geo-coordinates for the road (e.g., the boundaries, center line, etc.), etc. Various other types of road data may be implemented.

Examples of map data include weather data, road closure data, road construction data, parking data (e.g., predefined restricted parking areas, predefined permitted parking areas, and/or predefined exclusion zones), etc. Various other types of map data may be implemented.

In some embodiments, system 200 comprises traffic and weather data acquisition module 231. System 200 uses traffic and weather data acquisition module 231 to obtain traffic and/or weather data. For example, traffic and weather data acquisition module 231 obtains raw data captured by a traffic service or traffic cameras (e.g., department of transportation traffic cameras) and traffic and weather data acquisition module 231 parses the traffic data to obtain relevant portions of the traffic data to use in generating the unified map, determining whether a parking condition exists, determining whether a parked vehicle is a sitting duck, etc. In some embodiments, vehicle video data is analyzed for traffic and/or weather information and is acquired by traffic and weather data acquisition module 231 as traffic and weather data As another example, traffic and weather data acquisition module 231 obtains traffic data from one or more data sources (e.g., one or more third party services such as third party traffic cameras, traffic services, etc.) based on a predefined geographic area, such as a geographic area selected by a fleet manager (e.g., a geographic area of the fleet being monitored or a geographic area that fleet manager wants to monitor). In some embodiments, system 200 (e.g., parking assessment module 235) uses the traffic data to generate a unified map (e.g., from which a parking assessment is made) or in connection with determining whether a vehicle is a sitting duck (e.g., a high traffic area may be deemed a higher risk to driver, vehicle or third-party safety by parking along or in proximity to the road).

In some embodiments, system 200 comprises context analysis module 233. System 200 uses context analysis module 233 to determine a holistic context associated with one or more managed vehicles. Context analysis module 233 uses location data, map data, and/or road data to determine the context for a particular vehicle. For example, context analysis module 233 uses the map data and vehicle location data to determine a road along which, or in proximity to, the vehicle is located. In addition, context analysis module 233 determines a context of the environment in which the vehicle is located, such as weather conditions, traffic conditions, road conditions, etc. System 200 uses the context in connection with assessing whether a vehicle is parked, and if the vehicle is parked, whether the parked vehicle is a sitting duck. System 200 may further determine an active measure based at least in part on the context information.

In some embodiments, system 200 comprises parking assessment module 235. System 200 uses parking assessment module 235 in connection with determining whether one or more managed vehicles are parked, and in response to determining that a vehicle is parked, determining whether the parked vehicle is predicted to be a sitting duck (e.g., a pending sitting duck). As an example, parking assessment module 235 uses the context (e.g., context information) obtained by context analysis module 233 to determine whether the vehicle is parked and/or whether the parked vehicle is predicted to be a sitting duck. In some embodiments, in response to determining that the vehicle is predicted to be a sitting duck, parking assessment module 235 confirms that the vehicle is indeed parked. For example, parking assessment module 235 confirms that vehicle is parked by waiting a predefined period of time and determining whether the vehicle is still in a parked state (e.g., that the vehicle has not moved more than a threshold distance over the predefined period of time). As an example, the predefined period of time after which the vehicle is confirmed to be parked is 5 additional minutes (e.g., or 10 minutes since the vehicle was last detected to be moved from which the deemed parked state arose), however, the predefined period of time may be configurable.

For example, system 200 uses parking assessment module 235 to assess whether one or more managed vehicles are parked at predetermined intervals, such as in connection with performing active monitoring of the managed vehicle(s). Parking assessment module 235 can monitor a plurality of vehicles (e.g., an entire fleet or a subset of the fleet) to detect when one or more of such vehicles are stopped/parked. Alternatively, parking assessment module 235 can monitor a vehicle individually, such as based on a selection from a fleet manager to monitor or query a status of the vehicle.

In some embodiments, parking assessment module 235 determines whether a vehicle is parked based at least in part on whether the vehicle is moving (e.g., whether a vehicle has moved a threshold distance over threshold time, such as whether the vehicle moved more than 2 m over 30 seconds). As an example, a vehicle is deemed parked if the vehicle has remained stationary for a threshold period of time or based on a composite score computed based on whether the vehicle is stationary and/or one or more other heuristics that are indicative of whether the vehicle is parked. In some embodiments, parking assessment module 235 uses various other context information in connection with determining whether the vehicle is parked.

In some embodiments, parking assessment module 235 uses the context information to determine whether the vehicle is parked based at least in part on using one or more heuristics to assess whether the vehicle is parked. The heuristics may be configurable to allow a fleet manager to adjust a sensitivity of parked vehicle determinations. As an example, the heuristics are preset by a fleet manager or a subject matter expert. As another example, the heuristics are empirically determined, such as by using a machine learning process to analyze historical information to derive the heuristics. Examples of heuristics include (i) the vehicle having moved a threshold distance over a threshold time and that the vehicle movement patterns prior to this predefined time period is consistent with a vehicle entering a parked state is indicative of the vehicle not being parked (or increases the likelihood that the vehicle is not parked), (ii) the vehicle being located in a permitted parking area is indicative of the vehicle being parked (or increases the likelihood that the vehicle is parked), (iii) the centroid of the vehicle being in the middle (or middle third) of a road is indicative of the vehicle not being parked (e.g., increases the likelihood that the vehicle is not parked), (iv) traffic data for the road along which vehicle is on, or in proximity to, indicates that traffic is very congested or moving slow is indicative of the vehicle not being parked (e.g., or increases the likelihood that the vehicle is not parked), and/or (v) the vehicle being stationary (e.g. has not moved over a threshold period of time and/or that the vehicle movement patterns prior to this period of time are consistent with a vehicle entering a parked state) and not within the middle third of the road or is located at least a threshold distance from the road is indicative of the vehicle being parked. In some embodiments, using the vehicle movement patterns reduces false positives for a parked location being incorrectly assigned a location by the device GPS on a highway, where in reality the vehicle is actually in a nearby parking lot. In some embodiments, detection of an erratic GPS movements caused by GPS jitter (e.g., at start up, due to low signal, due to dead reckoning, etc.) is used to decrement a sitting duck confidence score. Parking assessment module 235 uses the one or more heuristics to determine a prediction of whether the vehicle is parked. In some embodiments, parking assessment module 235 uses a scoring function that is configured based at least in part on the one or more heuristics. The scoring function uses weighted values for the various predefined heuristics to determine a composite score corresponding to a prediction of whether, or likelihood that, the vehicle is parked. In response to obtaining the composite score, parking assessment module 235 uses the composite score to determine whether the vehicle is parked. For example, the composite score is compared to predefined parked scoring threshold, and if the composite score is greater than or equal to the predefined parked scoring threshold, parking assessment module 235 deems the vehicle to be parked. The predefined parked scoring threshold may be configurable to permit the fleet manager or other administrator to adjust the sensitivity of detecting parked vehicles (e.g., to adjust a false positive rate, etc.).

In some embodiments, in connection with determining whether a vehicle is parked, system 200 (e.g., parking assessment module 235) determines a centroid of the vehicle (e.g., based on the centroid of the location data, such as the GPS, for the vehicle). The centroid of the vehicle may be used to determine whether the vehicle is moving or stationary. The determination of whether the vehicle is parked or is parked as a sitting duck may be based at least in part on the centroid of the vehicle (e.g., the location corresponding to the centroid and the other context information (e.g., such as whether the centroid is in the middle or middle third of a road, etc.). As an example, system 200 compares the centroid of first location data for the vehicle (e.g., GPS data) obtained at a first time and the centroid of second location data for the vehicle obtained at a second time and determines whether the vehicle has moved based on a comparison of the first location data and the second location data. For example, system 20 (e.g., parking assessment module 235) determines whether the distance (e.g., difference) between the centroid of the first location data and the centroid of the second location data exceeds a predetermined threshold distance (e.g., 100 m).

In some embodiments, system 200 (e.g., parking assessment module 235) determines (e.g., computes) a bounding box for the vehicle based at least in part on location data for the vehicle. The bounding box for the vehicle or location of a vehicle relative to a bounding box can be used to detect whether the vehicle is moving or stationary. For example, the bounding box is determined based on the centroid of the location data for the vehicle. The system computes the bounding box based at least in part on the location data for the vehicle and (i) vehicle information (e.g., a type of trailer, a type of truck, etc.) mapped to the vehicle, such as in a mapping of vehicle identifiers to vehicle information, or (ii) a predefined standard size/shape of vehicles. The centroid of the vehicle location data can be set to correspond to the centroid of the bounding box. In the case of a fleet of transport trucks, the size/shape of the transport trucks in the fleet may be the same, and thus the predefined standard/size/shape of the transport trucks can be configured (e.g., by a user such as the fleet manager). In some embodiments, the bounding box is sufficiently large to include the vehicle therein and takes into account the jitter of location data over a threshold period of time. For example, location data obtained using a global positioning data may experience jitter/imprecision even though the underlying object has not moved. If the bounding box is larger than the range over which jitter associated with the location data may be observed, system 200 determines that the vehicle has moved if the vehicle location is outside the bounding box (or a threshold percentage of the vehicle has moved outside the bounding box). As an example, the size of the bounding box may be determined empirically based on historical location data and deviations in location data for a stationary object. As another example, the size of the bounding box may be dynamic and based on the system computing a current amount of jitter being observed in the vehicle location (or vehicle locations for a set of vehicles) and the size/shape of the vehicle. In some embodiments, parking assessment module 235 may determine that the vehicle has moved (e.g., is not stationary) if the centroid for the current location data is outside the boundaries of the bounding box. In some embodiments, parking assessment module 235 may determine that the vehicle has moved (e.g., is not stationary) if a threshold percentage of a second bounding box generated based on current location data is outside the boundaries of a first bounding box generated on previous location data.

In some embodiments, system 200 uses parking assessment module 235 to generate or update a unified map. The unified map is generated for at least a particular geographic area, such as a geographic area that is determined/defined based on a set of one or more managed vehicles (e.g., a fleet) and/or routes or destination locations for the one or more managed vehicles. In some embodiments, the geographic area is determined based on user input, such as selection by a fleet manager (e.g., in connection with management of a managed vehicle(s)). The unified map aggregates various information from various data sources, such as aggregating vehicle location data, map data, road data, weather data, traffic data, hazard data, etc. In some embodiments, parking assessment module 235 uses the unified map (e.g., information comprised in the unified map) to determine whether a vehicle is parked, whether a parked vehicle is a sitting duck, and/or whether a parking condition exists and the packed vehicle is likely to be impacted by the parking condition (e.g., a flood warning is in the area and the vehicle is parked in a flood zone), etc. As an example, parking assessment module 235 obtains the context information for the vehicle based on the unified map, and applies the one or more heuristics of scoring function to determine whether the vehicle is parked, whether the parked vehicle is a sitting duck, or whether a parking condition exists and the packed vehicle is likely to be impacted by the parking condition.

In some embodiments, in response to determining that a vehicle is parked (e.g., is stationary for a threshold period of time), parking assessment module 235 analyzes the parking to determine whether an active measure is to be performed with respect to the parked vehicle. For example, parking assessment module 235 determines whether the parked vehicle is a sitting duck, parked improperly (e.g., parked in a predefined restricted parking area or otherwise not in a predefined permitted parking area), is likely to be impacted by a parking condition (e.g., a hazard in the area in which the vehicle is parked), or otherwise parked unsafely. In some embodiments, parking assessment module 235 uses unified map data (e.g., data aggregated in the unified map such as map data, road data, traffic data, weather data, predefined parking data, construction data, etc.) to perform the analysis of the parking or otherwise perform the parking assessment (e.g., determine whether the vehicle is a sitting duck). In some embodiments, parking assessment module 235 uses a subset of types of data comprised in the unified map to perform the analysis of the parking. For example, parking assessment module 235 uses road data to analyze the parking of the vehicle (e.g., to determine whether the vehicle is parked in proximity/along a road of a certain road type, such as a freeway, or parked along a road that is not predefined type, such as a rural road with little traffic and low speed limits, etc.).

Parking assessment module 235 uses the unified map data, or subset of the type of unified map data, to apply one or more heuristics (e.g., predefined rules) to predict whether the parked vehicle satisfies one or more conditions (e.g., parked as a sitting duck, parked unsafely, likely to be impacted by a parking condition, etc.). In some embodiments, parking assessment module 235 uses a scoring function to apply the one or more heuristics. The parking assessment module 235 obtains a composite score based on the using the scoring function to apply the one or more heuristics. As an example, the composite score is indicative of a likelihood that the parked vehicle satisfies the applicable one or more parking assessments (e.g., a likelihood that the vehicle is parked as a sitting duck, a likelihood that the parked vehicle is to be impacted by a parking condition/hazard, etc.). For example, the composite score is a confidence level that the vehicle is in a particular state or satisfies applicable conditions. The scoring function uses weighted values for the various predefined heuristics to determine the composite score. In some embodiments, each weighted value is computed by analyzing the location of the vehicle and determining whether the corresponding heuristic is indicative of the vehicle being a sitting duck. Examples of predefined heuristics include (a) a centroid of the vehicle being within the middle third of a roadway (e.g., a particular road such as a highway), (b) the vehicle parked within a predefined distance of the edge of a road (e.g., a vehicle within 3 m of the road), (c) a vehicle location being on a road and traffic data indicating that the road has congestion (e.g., a slow moving traffic), (d) a vehicle location being within a predefined restricted parking area, (e) a vehicle being within a predefined permitted parking area, (f) a vehicle being within a predefined exclusion zone, (g) a vehicle location being along a road that connects a major highway, (h) a distance by which a vehicle location has changed over a predefined amount of time (e.g., movement of the vehicle over 30 seconds, etc.), (i) the vehicle being on any part of a particular type of paved road (e.g., a high-speed road such as a highway, a road for which a historical collision rate exceeds a collision threshold, a road having a posted speed limit or average traffic speed in excess of a speed threshold, etc.), ( ) the speed of the vehicle being greater than a predetermined parked speed threshold (e.g., 2 mph). System 200 may implement any combination of the foregoing examples of predefined heuristics. Various other heuristics may be applied.

In some embodiments, parking assessment module 235 determines that a state of the vehicle satisfies the one or more applicable conditions based on a determination that the vehicle satisfies one or more predefined heuristics or has an associated composite score that is indicative of the vehicle being in a particular state (e.g., parked as a sitting duck, likely to be impacted as a parking condition/hazard, etc.). In some embodiments, parking assessment module 235 compares the composite score to a corresponding predefined condition threshold (e.g., a sitting duck threshold, a parking hazard threshold, etc.) and uses the results of the comparison to determine whether the state of the vehicle satisfies the one or more applicable conditions. As an example, if system 200 determines that the composite score (e.g., corresponding to a likelihood or prediction that the vehicle is parked as a sitting duck) is greater than a sitting duck threshold, system 200 deems the vehicle to be parked as a sitting duck. As an example, if system 200 determines that the composite score is less than a sitting duck threshold, system 200 deems the vehicle to be parked properly (e.g., determines that the vehicle is not a sitting duck). As an example, if system 200 determines that the composite score (e.g., corresponding to a likelihood or prediction that the vehicle is to be impacted by a parking condition/hazard) is greater than a parking hazard threshold, system 200 deems the vehicle to be impacted by, or subject to, the hazard or other parking condition.

In some embodiments, system 200 comprises active measure module 237. System 200 uses active measure module 237 to determine, recommend, and/or implement one or more active measures. In some embodiments, active measure module 237 determines an active measure to recommend or automatically implement based at least in part on the parking information and/or images captured by one or more managed vehicles within an area. For example, active measure module 237 uses an identified parking condition to recommend active measures to eliminate or mitigate the parking condition. Examples of active measures include: (i) re-routing a managed vehicle (e.g., a managed vehicle expected to be impacted by a particular parking condition) to an alternative parking location (e.g., a parking location deemed safe), (ii) alerting the driver of the managed vehicle, (iii) fetching an image for the particular area, (iv) sending the image to a driver or fleet manager, (v) sending a set of recommended alternative parking locations to a fleet manager or driver, etc.

In some embodiments, active measure module 237 determines whether to perform an active measure based at least in part on the determination of whether the vehicle satisfies the one or more applicable conditions. For example, in response to determining that the parked vehicle is a sitting duck, active measure module 237 determines to perform an active measure. Active measure module 237 may further determine a recommended active measure (provide recommendations for alternative parking locations) or may determine to perform a predefined active measure (e.g., sending an alert to a fleet manager, driver, etc.). Active measure module 237 may use an active measure policy to determine an applicable active measure that is to be performed. Examples of active measures include: (i) re-routing a managed vehicle (e.g., a managed vehicle expected to be impacted by a particular driving condition), (ii) alerting the driver of the managed vehicle, (iii) fetching an image for the particular area, (iv) sending the image to a driver or fleet manager, etc. System 200 may implement various other active measures.

In some embodiments, in response to determining that the vehicle satisfies the one or more applicable conditions, such as that the vehicle is deemed to be a sitting duck, active measure module 237 determines to provide an alert to the fleet manager and/or applicable driver. The alert may further include one or more recommended active measures, such as one or more alternative parking locations for the vehicle.

Active measure module 237 may use the unified map (e.g., unified map data) to determine an active measure. In the case that system 200 is to provide one or more active measures, active measure module 237 may determine a plurality of active measures that can be performed and may use a scoring function to assess the various active measures. Active measure module 237 may filter the set of proposed active measures based on comparing the composite scores for the active measures to an active measure score threshold and recommend those active measures having a composite score that is greater than the active measure score threshold. For example, active measure module 237 identifies active measures that would place the vehicle in a state in which the vehicle is likely to not be deemed a sitting duck, is likely to not be impacted by a driving condition/hazard, is likely to be parked properly (e.g., in a permitted parking area), etc. In some embodiments, active measure module 237 selects a predefined number of the active measures having a composite score greater than the active measure score threshold and provides a recommendation of the predefined number of active measures. For example, active measure module 237 provides the set of N active measures having the highest corresponding composite score, where N is a positive integer that may be configurable such as by an administrator, etc.

Active measure module 237 implements an active measure. System 200 may store an active measure policy that indicates a mapping of scenarios/contexts to active measure. For example, the active measure policy may indicate an active measure to perform in response to determining that the vehicle is parked as a sitting duck. As another example, the active measure policy may indicate the active measure to perform in response to determining that the vehicle is likely to be impacted by a parking condition (e.g., a hazard such as a flood warning, blizzard, etc.). In response to determining the context/state of the vehicle (e.g., context based on context information or unified map data), active measure module 237 may query the mapping of scenarios/contexts to active measure to determine the applicable active measure.

In some embodiments, the active measure includes providing a user with a set of recommended active measures. For example, the active measure includes causing an alert/prompt to be displayed at a client device (e.g., a system used by the fleet manager or a driver of the vehicle) and an indication of recommended active measures that may be performed to alleviate the particular context of the vehicle (e.g., the vehicle being parked as a sitting duck, the vehicle likely to be impacted by a parking condition/hazard, etc.). For example, active measure module 237 automatically generates and communicates the alert or prompt to the client device in response to detecting the applicable context/scenario, such as detecting that the parked vehicle is a sitting duck or detecting a parking condition (e.g., hazard) that is likely to impact the parked vehicle. Active measure module 237 may receive a user input (e.g., via user interface module 239) of the selected active measure, and in response to receiving the selection cause the selected active measure to be implemented. As an example, in the context where the vehicle is parked as a sitting duck, the set of recommended active measures may include a set of alternative permitted parking locations nearby. In response to receiving selection of an alternative permitted parking location, system 200 (e.g., active measure module 237) determines a route to the selected alternative parking location, such as based on a current location of the vehicle and a destination location corresponding to the selected alternative parking location. System 200 can provide the route to the user, such as the driver of the vehicle.

In some embodiments, system 200 uses a set of predetermined rules or heuristics to determine that a parking condition occurs/exists. The predetermined rules or heuristics may include a mapping of a set of parking criteria to parking conditions. For example, system 200 stores a mapping of the various sets of parking criteria to the various parking conditions, and queries the mapping based on characteristics of the vehicle context information (e.g., parking information), etc. to determine whether the parking information match a predefined parking condition (e.g., a hazardous weather condition, such as expected precipitation levels exceeding a precipitation threshold, a flood warning being issued for an area including a flood zone, expectation of precipitation and temperatures being below a predefined temperature threshold such as 0° C., etc.). An example of a set of parking criteria mapped to a parking condition (e.g., existence/expectation of black ice in the area in which the vehicle is parked) includes a temperature being below a predefined temperature threshold (e.g., 0° C.) and the presence of precipitation (e.g., precipitation levels greater than a predefined precipitation threshold). The presence of precipitation may be determined based on past precipitation within a threshold period of time (e.g., precipitation levels over the last 24 hours, or 12 hours, etc.) and/or based on expected precipitation levels within a threshold period of time (e.g., precipitation expected over the next hour, 2 hours, etc.). An example of a set of parking criteria mapped to a driving condition includes a rate or a number of collisions within the area in which the vehicle is parked (e.g., obtained based on historical road safety information, etc.) exceeding a collision threshold. In some embodiments, parking data and driving data inform each other—parking information informs how to drive in areas (e.g., there are lots of parked vehicles, so a driver should slow down) or driving information informs where to park (e.g., there are many fast moving vehicles or crashes reported in the area, so a driver should not park in that area). In some embodiments, a sitting duck hotspot is detected by the system and is used to alert drivers of current and potential sitting ducks at that location (e.g., to driver more slowly in the area, to not park in the area, etc.). Various other parking conditions may be mapped to a set of parking criteria.

In some embodiments, the unified map is a universal map that is used for the management of a plurality of managed vehicles, such as a fleet for a customer or a subset of the fleet. For example, system 200 generates the unified map and the unified map is provided to the plurality of managed vehicles. System 200 uses localized information to generate the unified map for the plurality of managed vehicles. In some embodiments, generating the unified map includes determining unified map data comprising aggregated information from a plurality of data sources. For example, the unified map data comprises an aggregation of vehicle location data, map data, road data, traffic data, weather data, construction data, etc.

The generation/update of the unified map includes generating/updating a plurality of layers for the unified map. For example, the plurality of layers is provided as overlays to the map (e.g., a geographical map comprising the roads). Examples of the layers comprised in the unified map includes: (i) road data, (ii) managed vehicle data, (iii) managed vehicle routes, (iv) weather data, (v) traffic data, (vi) driving condition data, (vii) map data, (viii) construction data, (ix) vehicle collision data, (x) image data, (xi) parking condition data, (xii) predefined parking data, such as permitted parking areas, restricted parking areas, exemption areas, etc. Various other information may be comprised in a layer for the unified map. The unified map (e.g., the plurality of layers) comprise one or more indicators corresponding to relevant information (e.g., information relevant to the type of information provided on a particular layer).

An example of an indicator for a particular layer includes the layer(s) corresponding to managed vehicle data comprises an indicator(s) for the various managed vehicles. An indicator for a managed vehicle may be provided at point on the map corresponding to a current location of the managed vehicle (e.g., the current location obtained by vehicle information acquisition module 227 for the managed vehicle). Accordingly, the indicator(s) for the managed vehicle(s) enable the fleet manager to quickly assess the locations of the managed vehicles within the geographic area.

Another example of an indicator for a particular layer includes the layer(s) for weather data. The indicator may include emphatic display of areas of precipitation (e.g., precipitation that exceeds a predefined precipitation threshold), windy areas (e.g., areas in which windspeed exceeds a predefined windspeed threshold), areas in which a weather event is occurring (e.g., an area subject to a snowstorm may be emphatically displayed), areas in which the weather data is expected to negatively impact parking in a particular area (e.g., if a likelihood of a hazard developing in the area exceeds a hazard threshold).

In some embodiments, the unified map includes one or more elements that are generated in connection with recommending or implementing an active measure. For example, the unified map includes a user interface element that is associated with notifying the drivers of the managed vehicles (e.g., the managed vehicles expected to be impacted, the managed vehicles for which the unified map is generated, etc.). Upon selection of the element, system 200 communicates a notification for the applicable driving condition (e.g., an alert/prompt comprising information pertaining to the driving condition). In some embodiments, a layer of the unified map comprises a user interface element that, upon selection, implements an active measure. The user interface element comprised in a layer may correspond to a particular parking condition expected based on information comprised in the layer. System 200 (e.g., active measure module 237) may determine a set of recommended active measures, and the unified map (e.g., the corresponding layer of the unified map) is configured to provide an indication of one or more of the set of recommended active measures. System 200 may further configure the unified map to include one or more user interface elements that enable a user to select a recommended active measure to be implemented. Examples of recommended active measures may include: (i) fetching a current image from a managed vehicle in the area, (ii) re-routing a managed vehicle(s) expected to be impacted by a parking condition to a recommended alternative parking location (e.g., a location that is deemed safe), and/or (iii) sending a notification/alert to a driver of the managed vehicle(s) expected to be impacted (e.g., a driver of a managed vehicle deemed to be a sitting duck), etc. Various other active measures may be recommended.

In some embodiments, system 200 comprises user interface module 239. System 200 uses user interface module 239 to provide a user interface to a user (e.g., via a client system such as for a fleet manager or a driver of a managed vehicle, etc.) via which the user configures, defines, or develops data entities, policies, preferences, cost functions (e.g., a scoring function), models (e.g., driving condition prediction models), access permissions with respect to certain data (e.g., the unified map or alerts generated for a managed vehicle), etc., or via which the user interfaces with the unified map (e.g., adjusts the zoom, selects an indicator, requests an image, selects a recommended active measure, etc.).

According to various embodiments, storage 215 comprises one or more of file system data 260, vehicle data 265, and/or unified map data 270. Storage 215 comprises a shared storage (e.g., a network storage system) and/or database data, and/or user activity data.

In some embodiments, file system data 260 comprises a database such as one or more datasets for data entities (e.g., one or more datasets for one or more features, models, schemas, tables, unified maps, unified map data, configurations for managed vehicles, fleets, drivers, etc.). File system data 260 can store various policies—for example, a routing policy, a notification policy, an active measure policy, etc. File system data 260 may further comprise parking information and/or other information (e.g., weather data, traffic data, construction data, road data, etc.) obtained by one or more data sources or sensors from a managed vehicle.

In various embodiments, vehicle data 265 comprises information pertaining to a vehicle, such as one or more of vehicle location, a time that a vehicle was last detected to be moving, a length of time that the vehicle has been stationary, a vehicle size/shape, a driver associated with the vehicle, a destination location for the vehicle, a payload information, an image captured by a camera mounted to the vehicle, or any other information pertaining to the vehicle or context of the vehicle.

In some embodiments, unified map data 270 comprises map data, road data, traffic data, weather data, predefined parking data (e.g., data indicating permitted parking areas, restricted parking areas, etc.), hazard data, historical collision data, and/or exclusion data (e.g., data indicating one or more exclusion zones). Unified map data 270 may include information for a particular tenant/customer, or information across various tenants/customer serviced by system 200.

According to various embodiments, memory 220 comprises executing application data 275. Executing application data 275 comprises data obtained or used in connection with executing an application such as an application executing in connection with managing vehicles, an application executing to assess vehicle parking, an application executing to generate unified maps, an application executing to determine, recommend, or implement active measures, an application that processes and/or responds to queries, an application that generates models for detecting (e.g., predicting) driving conditions, etc. Other applications comprise any other appropriate applications (e.g., an index maintenance application, a communications application, a chat application, a web browser application, an image analysis application, a report preparation application, a user interface application, a data analysis application, an anomaly detection application, a user authentication application, a security policy enforcement application, a code analysis application, a code development application, etc.).

In some embodiments, the processor for detecting a sitting duck is located in a vehicle event recorder with similar processes and support as the processor (e.g., processor 210) in the fleet management service described herein.

Figure 3:
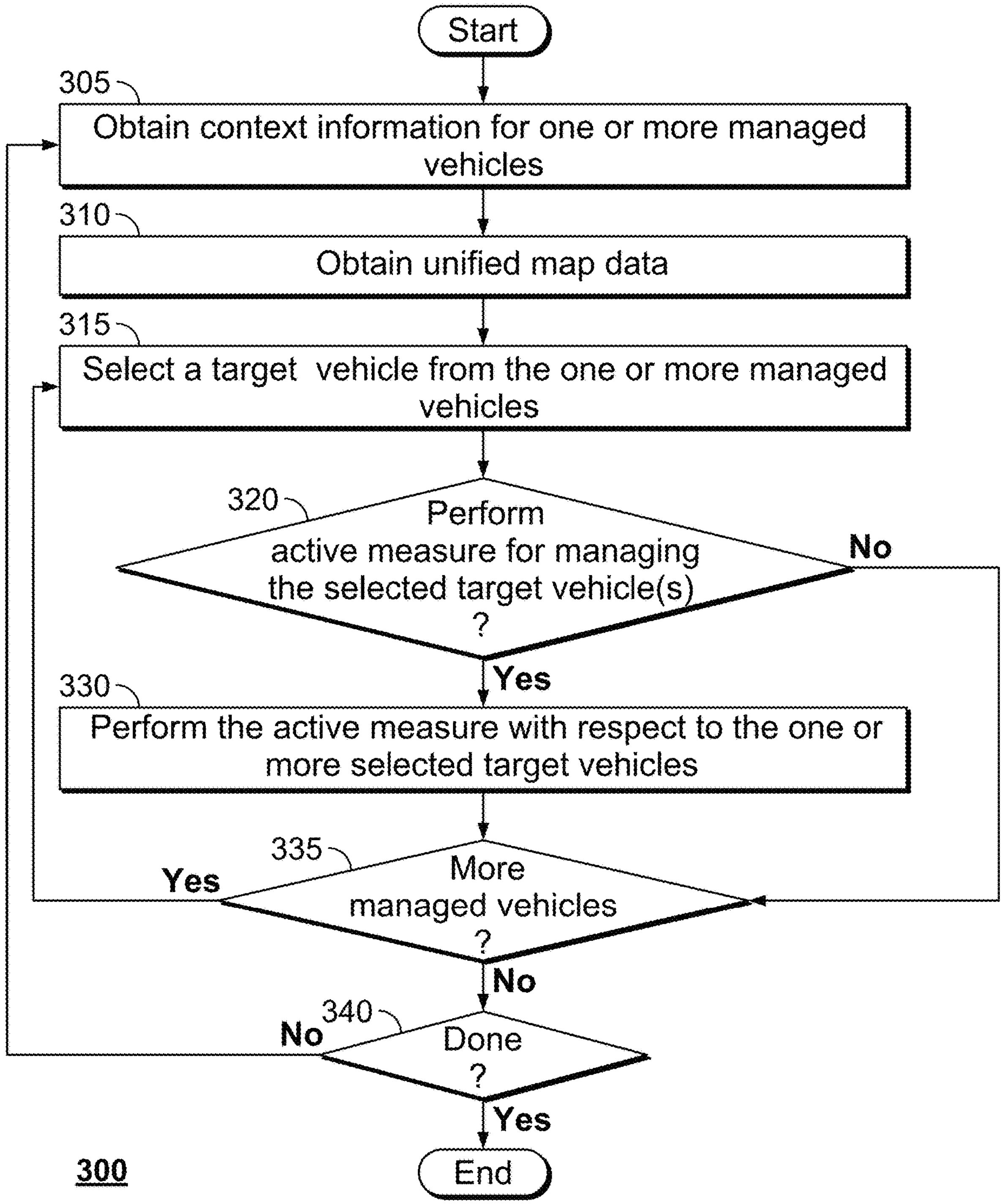
FIG. 3 is a flow diagram of a method for performing an active measure with respect to one or more managed vehicles according to various embodiments of the present application.

FIG. 3 is a flow diagram of a method for performing an active measure with respect to one or more managed vehicles according to various embodiments of the present application. In some embodiments, process 300 is implemented by system 100 of FIG. 1 and/or system 200 of FIG. 2.

At 305, context information for one or more managed vehicles is obtained. The system obtains vehicle information for the one or managed vehicles, such as location data, route data, destination location(s), payload information, etc. In some embodiments, the system obtains the context information from the corresponding managed vehicle. For example, the managed vehicle may periodically report its current location (e.g., every 15 seconds, 30 seconds, minute, etc.).

At 310, unified map data is obtained. For example, the system obtains weather data, traffic data, road data, map data, construction data, etc. In some embodiments, the system obtains the unified map data from storage, such as data stored in connection with generating a unified map. In some embodiments, the system obtains the unified map data from one or more data sources, such as a weather service, traffic service, map service, etc.

At 315, a target vehicle is selected from the one or more managed vehicles. In some embodiments, the target vehicle is a managed vehicle that the system is using to assess whether an active measure is to be implemented. As an example, the target vehicle is selected automatically in response to one or more associated conditions being satisfied. The system may select a managed vehicle as the target vehicle in response to determining that the managed vehicle has been stationary for a threshold amount of time. As another example, the target vehicle is selected based on a user input, such as an input from a fleet manager. The fleet manager may select a managed vehicle for which assessment of whether to perform the active measure is to be performed.

At 320, the system determines whether to perform an active measure for managing the selected target vehicle(s). In response to selecting the target vehicle, the system determines whether a context for the target vehicle satisfies one or more conditions corresponding to an active measure. The one or more conditions may be based on a set of predefined heuristics.

In some embodiments, the system determines whether a vehicle is parked, and in response to determining that the vehicle is parked, the system determines whether the parked vehicle is a sitting duck. In response to determining that the parked vehicle is a sitting duck, the system determines whether to perform an active measure for vehicles that are sitting ducks. For example, the system stores a mapping of contexts/scenarios to active measures, and each context/scenario has a corresponding set of heuristics that the system uses to determine whether the vehicle state matches the context/scenario. In response to determining that the parked vehicle is not a sitting duck, the system may determine not to perform an active measure.

In some embodiments, the system determines whether a vehicle is parked, and in response to determining that the vehicle is parked, the system determines whether the vehicle is parked improperly or unsafely. For example, the system determines whether the vehicle is parked in a predefined permitted parking area or a predefined restricted parking area. In response to determining that the vehicle is parked improperly or unsafely, the system determines to perform the active measure for the particular context/scenario that matches the vehicle parking.

In some embodiments, the system determines whether a parked vehicle is expected to be impacted by a parking condition (e.g., that a likelihood that the parked vehicle is to be impacted exceeds a predefined likelihood threshold), such as a hazardous event (e.g., a flood warning in a flood zone, a blizzard warning, a high wind warnings, a tropical storm warning, etc.). In response to determining that the parked vehicle is expected to be impacted by the parking condition, the system determines to perform an active measure with respect to the parked vehicle.

In response to determining to perform the active measure for managing the selected target vehicle(s) at 320, process 300 proceeds to 325. Conversely, in response to determining not to perform the active measure for managing the selected target vehicle(s) at 320, process 300 proceeds to 335.

At 330, the active measure is performed with respect to the one or more selected target vehicles. In response to determining the active measure, the system implements the active measure, or causes another system/device to implement the active measure. For example, in response to receiving a user selection for a recommended alternative parking location, the system determines a route for the vehicle (e.g., based on the current vehicle location and the alternative parking location) and provides the route to a client system, such as a managed vehicle system (e.g., to provide the driver with the route to the alternative parking location).

At 335, the system determines whether there are more managed vehicles. For example, the system determines whether the fleet (e.g., the one or more managed vehicles) comprises any more vehicles for which a determination of whether to perform the active measure is being performed.

In response to determining that there are more managed vehicles at 335, process 300 returns to 315 and process 300 iterates over 315-335 until no further determinations need to be made for whether an active measure is to be performed (e.g., no further vehicles exist for which a determination of whether to perform the active measure is to be performed). Conversely, in response to determining that no further managed vehicles exist for which the system is to determine whether to perform an active measure at 335, process 300 proceeds to 340.

At 340, a determination is made as to whether process 300 is complete. In some embodiments, process 300 is determined to be complete in response to a determination that no further vehicles are to be assessed for a parking condition or a sitting duck status, no vehicles in the fleet are parked (e.g., vehicles of the fleet within a predefined/selected geographic area), a user has exited the system, a user indicates that process 300 is to be paused or stopped, etc. In response to a determination that process 300 is complete, process 300 ends. In response to a determination that process 300 is not complete, process 300 returns to 305.

Figure 4:
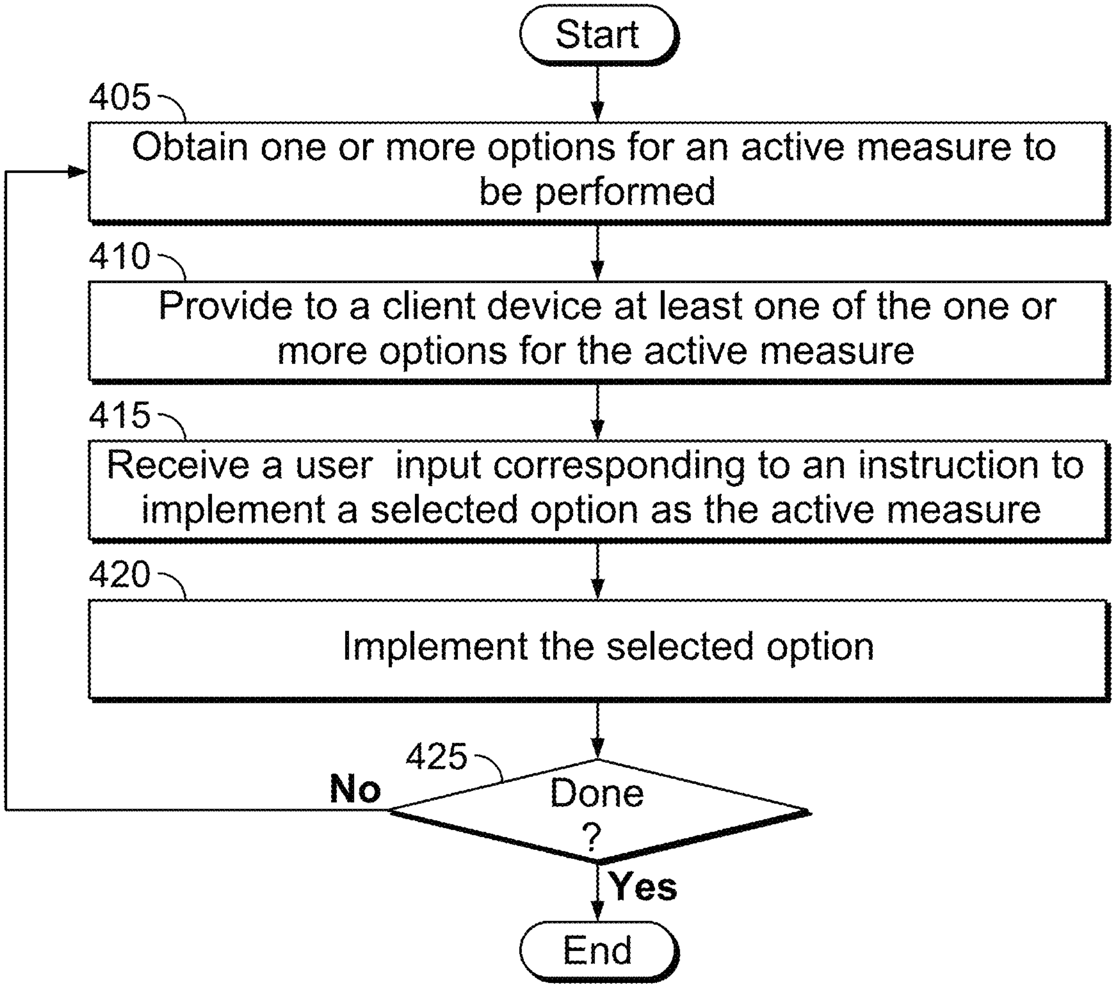
FIG. 4 is a flow diagram of a recommending an active measure and implementing a selected active measure with respect to one or more managed vehicles according to various embodiments of the present application.

FIG. 4 is a flow diagram of a process for recommending an active measure and implementing a selected active measure with respect to one or more managed vehicles according to various embodiments of the present application. In some embodiments, process 400 is implemented by system 100 of FIG. 1 and/or system 200 of FIG. 2. In some embodiments, process 400 is invoked by process 300 of FIG. 3, such as by 325 and/or 330.

At 405, one or more options for an active measure to be performed are obtained. In some embodiments, the system determines a set of recommended active measures. For example, in response to determining that the vehicle is parked as a sitting duck, the system determines a plurality of alternative parking locations in which the vehicle would not be a sitting duck or the vehicle would otherwise be parked safely. The system may use a scoring function and/or cost function to assess various possible alternative parking locations and identify the alternative parking locations to recommend.

At 410, at least one of the one or more options for the active measure are provided to a client device. In some embodiments, the system provides a set of options for active measures (e.g., recommended active measures) to a fleet manager or a driver of a vehicle. The system causes a client system to display a user interface comprising the set of options for active measures.

At 415, the system receives a user input corresponding to an instruction to implement a selected option as the active measure. The user, such as a fleet administrator or driver, inputs the user input to a user interface displayed at the client system.

At 420, the selected option is implemented. In response to receiving the user input (e.g., selection of the active measure), the system causes the corresponding active measure to be implemented.

At 425, a determination is made as to whether process 400 is complete. In some embodiments, process 400 is determined to be complete in response to a determination that no further active measures are to be performed, no vehicles in the fleet are parked (e.g., vehicles of the fleet within a predefined/selected geographic area), active measures with respect to a particular parking condition have been implemented for all applicable vehicles in the fleet or subset of the fleet, a user has exited the system, a user indicates that process 400 is to be paused or stopped, etc. In response to a determination that process 400 is complete, process 400 ends. In response to a determination that process 400 is not complete, process 400 returns to 405.

Figure 5:
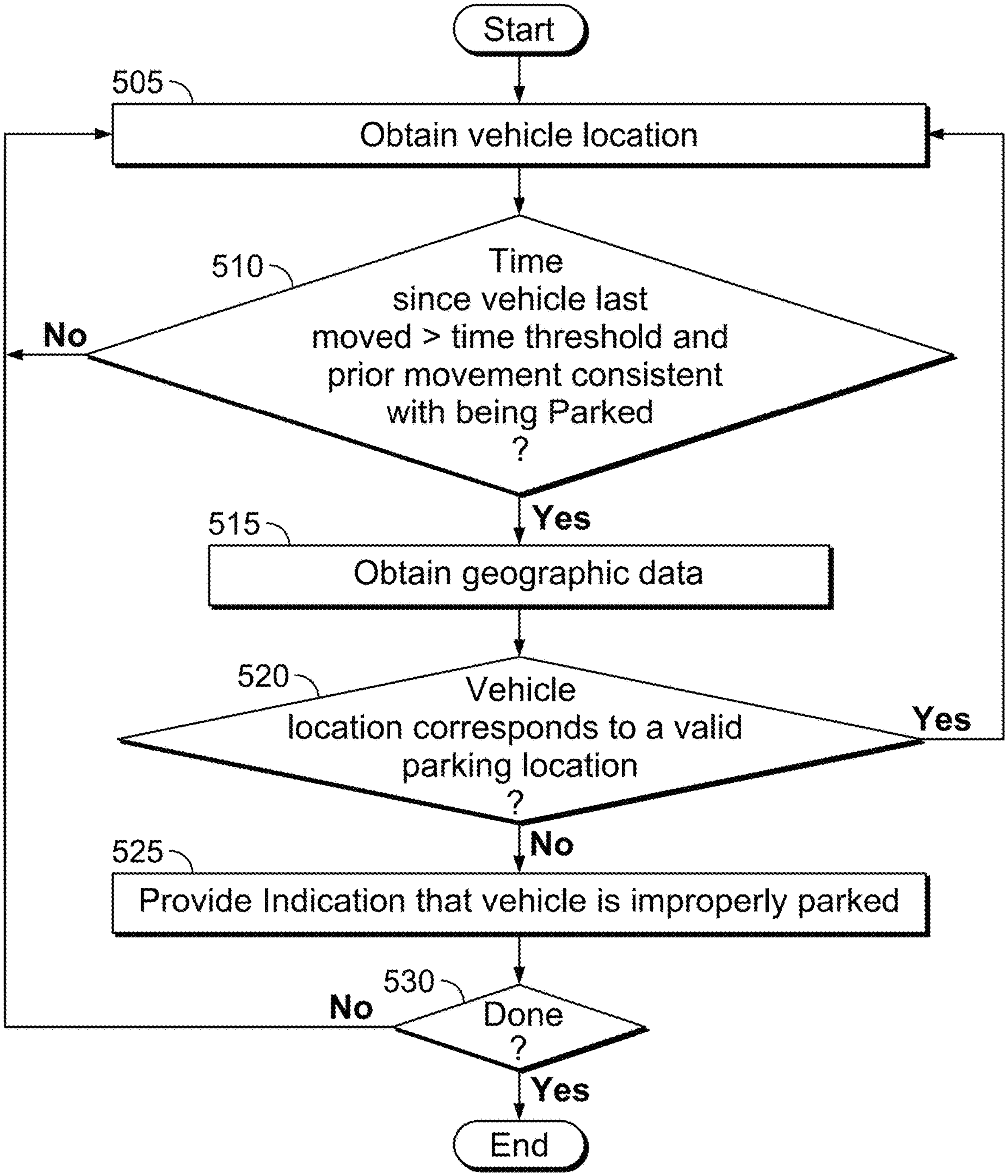
FIG. 5 is a flow diagram of a method for determining whether a vehicle is improperly parked according to various embodiments of the present application.

FIG. 5 is a flow diagram of a method for determining whether a vehicle is improperly parked according to various embodiments of the present application. In some embodiments, process 500 is implemented by system 100 of FIG. 1 and/or system 200 of FIG. 2.

At 505, a vehicle location is obtained. In some embodiments, the system receives the vehicle location in connection with receiving vehicle information from the vehicle. A managed vehicle may send its current location to a server (e.g., the system) according to a predefined frequency. The predefined frequency may be configurable, such as by a fleet administrator. As an example, the managed vehicle sends its current location every 15 seconds, 30 seconds, 60 seconds, etc. In some embodiments, the system sends a request to the managed vehicle, in response to which the managed vehicle reports its current location.

In some embodiments, the system determines the vehicle location to be a centroid in the GPS data obtained by a GPS system of the vehicle. The system may obtain a set of vehicle locations based on GPS data captured at different times (e.g., every 15 seconds, 30 seconds, 60 seconds, etc.). The system can deem an average or median (or other statistically relevant value) to be the centroid of the GPS data, which in turn is used to determine the vehicle location. In some embodiments, the system determines a bounding box corresponding to the vehicle, such as based on the centroid of the GPS data.

At 510, the system determines whether a time since the vehicle has last moved is greater than a time threshold and the prior movement of the vehicle is consistent with being parked. In some embodiments, the time threshold is configurable (e.g., to allow the sensitivity of the system to be adjusted). For example, the time threshold may be 5 minutes. For example, the system determines whether the vehicle has been stationary for a predetermined amount of time (e.g., a stationary time threshold), the vehicle GPS movement trail prior to entering a parking location is not erratic and plausible in that the vehicle speed, heading, and maneuvers aligns with the legal driving direction of the road into the parking location, the absence of atypical/implausible routes along the road caused by GPS low-signal errors, and the absence of atypical/implausible speed, backtracking, or turning maneuvers on the roadway caused by GPS errors that are validated using the unified map data, etc. In response to determining that the time since the vehicle last moved is not greater than the time threshold, process 500 returns to 505 and process 500 iterates over 505-510 until the system determines that the time that has elapsed since the vehicle has last moved is greater than the time threshold. Conversely, in response to determining that the time since the vehicle has last moved is greater than the time threshold at 510, process 500 proceeds to 515.

At 515, geographic data is obtained. In some embodiments, the geographic data comprises map data. The map data includes one or more predefined permitted parking areas and/or one or more predefined restricted parking areas. The geographic data may be obtained based on unified map data that is generated based on aggregating data received from one or more data sources or services.

In some embodiments, a predefined permitted parking area is a geographic location (e.g., a geo-fenced area) where parking is deemed to valid, such as a parking lot/space. The predefined permitted parking area is predefined based on fleet settings or mapping service. The predetermined parking area may be configurable, such as by a fleet manager or other administrator.

In some embodiments, a predetermined restricted area is a geographic location (e.g., geo-fenced area) where parking is restricted or otherwise deemed improper. The predetermined restricted area is predefined on a fleeting settings or mapping service. The predetermined restricted area may be configurable, such as by a fleet manager or other administrator.

At 520, the system determines whether the vehicle location corresponds to a valid parking location. In some embodiments, the system determines whether the vehicle location matches (e.g., is within) a predefined permitted parking area or predefined restricted parking area.

In some embodiments, the system stores a mapping of geographic locations to permitted restricted parking areas and/or a mapping of geographic locations to permitted parking areas. The system uses the vehicle location in connection with querying the mapping of geographic locations to permitted restricted parking areas and/or the mapping of geographic locations to determine whether the vehicle location correspond to a valid parking location.

In some embodiments, the system determines whether a bounding box for the vehicle or vehicle's location data overlaps a predefined restricted parking area or predefined permitted parking area. As an example, the system determines whether a threshold percentage of the bounding box overlaps with a permitted parking area or a restricted parking area, and in response to determining that the threshold percentage of the bounding box so overlaps, the system may deem the vehicle to be within such area (e.g., the applicable permitted parking area or restricted parking area).

In some embodiments, the customer determines a valid parking location—for example, the customer determines that a type of ramp is permitted or disallowed for sitting duck detection. For example, a customer may disable sitting duck detection on only outbound ramps that originate from a highway rest area and the rest area inbound ramp continues to detect sitting ducks. In some embodiments, a customer can identify areas a distance from a highway or a distance from a road feature (e.g., a curve, a sign, etc.) along a ramp to or a ramp from the highway that are eligible for sitting duck detection. For example, sitting duck detection is not done on a ramp 200 meters past the highway exit. As another example, sitting duck detection is not done on a ramp after a curve located on the ramp past the highway exit. In some embodiments, on ramps and off ramps to controlled access highways are indicated as unsafe and are not allowed for parking.

In response to determining that the vehicle location corresponds to a valid parking location at 520, process 500 returns to 505 and process 500 iterates over 505-520 until the system determines that the vehicle is not parked in a valid parking location. For example, the system continues to monitor whether the vehicle is improperly parked.

In response to determining that the vehicle location does not correspond to a valid parking location at 520, process 500 proceeds to 525 at which the system provides an indication that the vehicle is improperly parked. For example, the system configures a user interface and causes another system (e.g., an administrator system, a managed vehicle system, etc.) to display the user interface comprising the indication.

At 530, a determination is made as to whether process 500 is complete. In some embodiments, process 500 is determined to be complete in response to a determination that no further vehicles are to be assessed for a parking condition, an improper parking, or a sitting duck status, no vehicles in the fleet are parked (e.g., vehicles of the fleet within a predefined/selected geographic area), a user has exited the system, a user indicates that process 500 is to be paused or stopped, etc. In response to a determination that process 500 is complete, process 500 ends. In response to a determination that process 500 is not complete, process 500 returns to 505.

Figure 6:
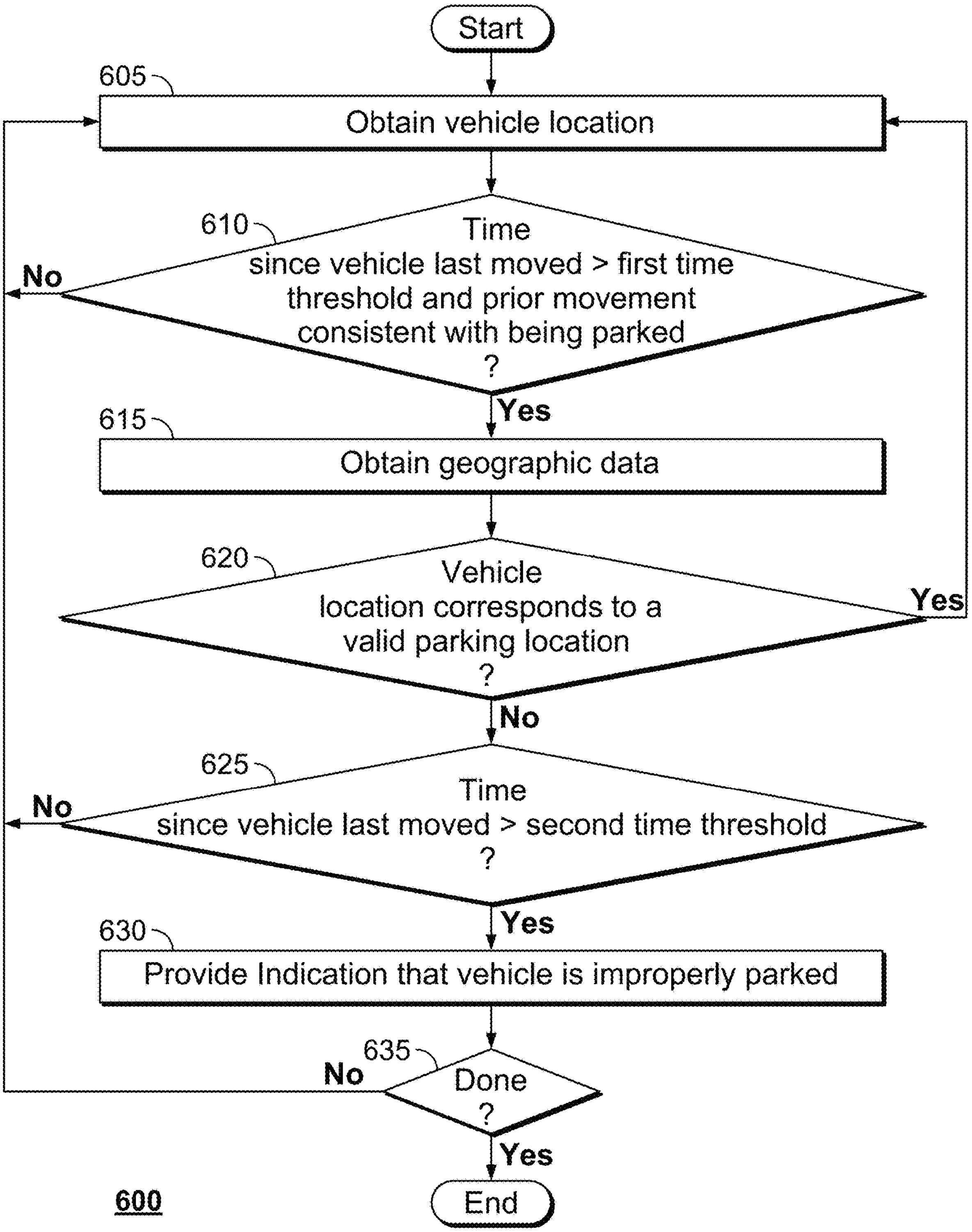
FIG. 6 is a flow diagram of a method for determining whether a vehicle is improperly parked according to various embodiments of the present application.

FIG. 6 is a flow diagram of a method for determining whether a vehicle is improperly parked according to various embodiments of the present application. In some embodiments, process 600 is implemented by system 100 of FIG. 1 and/or system 200 of FIG. 2.

At 605, a vehicle location is obtained. In some embodiments, 605 corresponds to, or is similar to, 505 of process 500 of FIG. 5.

At 610, the system determines whether a time since the vehicle last moved is greater than a first time threshold and the prior movement of the vehicle is consistent with being parked. For example, the system determines whether the vehicle has been stationary for a predetermined amount of time (e.g., a first stationary time threshold) and that the vehicle GPS movement trail prior to entering a parking location is plausible and not erratic in that the vehicle speed, heading, and maneuvers aligns with the legal driving direction of the road into the parking location, the absence of atypical/implausible routes along the road caused by GPS low-signal errors, absence of atypical/implausible speed, backtracking, or turning maneuvers on the roadway caused by GPS errors that are validated using the unified map data, etc. In response to determining that the time since the vehicle last moved is not greater than the first time threshold, process 600 returns to 605 and process 600 iterates over 605-610 until the system determines that the time that has elapsed since the vehicle last moved is greater than the first time threshold. Conversely, in response to determining that the time since the vehicle last moved is greater than the time threshold at 610, process 600 proceeds to 615.

At 615, geographic data is obtained. In some embodiments, 615 corresponds to, or is similar to, 515 of process 500 of FIG. 5.

At 620, the system determines whether the vehicle location corresponds to a valid parking location. In some embodiments, 620 corresponds to, or is similar to, 520 of process 500 of FIG. 5.

In response to determining that the vehicle location corresponds to the valid parking location at 620, process 600 returns to 605 and process 600 iterates over 605-620 until the system determines that the vehicle is not parked in a valid parking location. For example, the system continues to monitor whether the vehicle is improperly parked.

In response to determining that the vehicle location does not correspond to a valid parking location at 620, process 600 proceeds to 625 at which the system determines whether a time since the vehicle last moved is greater than a second time threshold. The second time threshold is greater than the first time threshold. For example, the first time threshold is 5 minutes, and the second time threshold is 10 minutes.

In response to determining that the time since the vehicle last moved is not greater than the second time threshold at 620, process 600 proceeds to 605 and process 600 iterates over 605-625 until the system determines that the time since the vehicle last moved is greater than the second time threshold. Conversely, in response to determining that the time since the vehicle last moved is greater than the second time threshold at 625, process 600 proceeds to 630 at which the system provides an indication that the vehicle is improperly parked.

At 635, a determination is made as to whether process 600 is complete. In some embodiments, process 600 is determined to be complete in response to a determination that no further vehicles are to be assessed for a parking condition, an improper parking, or a sitting duck status, no vehicles in the fleet are parked (e.g., vehicles of the fleet within a predefined/selected geographic area), a user has exited the system, a user indicates that process 600 is to be paused or stopped, etc. In response to a determination that process 600 is complete, process 600 ends. In response to a determination that process 600 is not complete, process 600 returns to 605.

Figure 7:
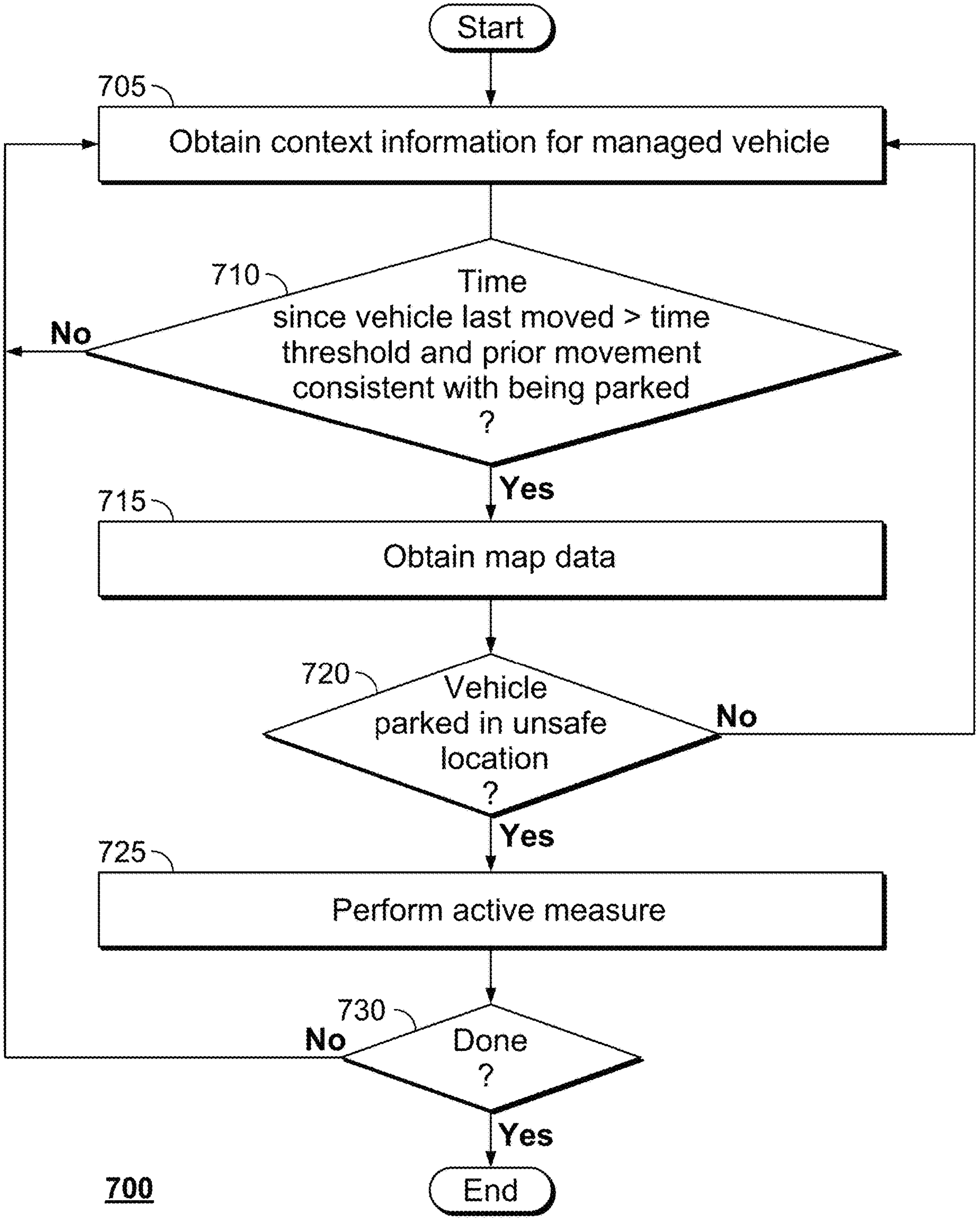
FIG. 7 is a flow diagram of a method for performing an active measure based on the parking of a vehicle according to various embodiments of the present application.

FIG. 7 is a flow diagram of a method for performing an active measure based on the parking of a vehicle according to various embodiments of the present application. In some embodiments, process 700 is implemented by system 100 of FIG. 1 and/or system 200 of FIG. 2.

At 705, a vehicle location is obtained. In some embodiments, 705 corresponds to, or is similar to, 505 of process 500 of FIG. 5.

At 710, the system determines whether a time since the vehicle last moved is greater than a time threshold and prior movement of the vehicle is consistent with being parked. For example, the system determines whether the vehicle has been stationary for a predetermined amount of time (e.g., a stationary time threshold) and that the vehicle GPS movement trail prior to entering a parking location is plausible and not erratic in that the vehicle speed, heading, and maneuvers aligns with the legal driving direction of the road into the parking location, the absence of atypical/implausible routes along the road caused by GPS low-signal errors, absence of atypical/implausible speed, backtracking, or turning maneuvers on the roadway caused by GPS errors that are validated using the unified map data, etc. In response to determining that the time since the vehicle last moved is not greater than the time threshold, process 700 returns to 705 and process 700 iterates over 705-710 until the system determines that the time that has elapsed since the vehicle last moved is greater than the time threshold. Conversely, in response to determining that the time since the vehicle last moved is greater than the time threshold at 710, process 700 proceeds to 715.

At 715, map data is obtained. In some embodiments, the system obtains unified map data comprising aggregated information from various data sources. In response to obtaining the various types of information from the various data sources, the system determines the unified map data or generates a unified map.

At 720, the system determines whether the vehicle is parked in an unsafe location. The system determines whether the vehicle is parked in an unsafe location based at least in part on the vehicle location and the map data.

In some embodiments, the system uses the unified map data to determine areas within a geographic area that are deemed unsafe (e.g., a vehicle parked in the area is expected to be in a collision or other negative safety event). As an example, the system uses a set of heuristics to determine whether a particular area/location is unsafe. The system may apply a scoring function (e.g., a cost function) to determine whether an area is unsafe, and the scoring function is based at least in part the set of heuristics. For example, the system uses the scoring function to predict a likelihood that a vehicle within the area (e.g., a vehicle parked within the area) is expected to be in a collision or other negative safety event. The composite score obtained based on applying the scoring function is compared to a predefined unsafe threshold to determine whether the area is deemed unsafe. For example, if the composite score (e.g., corresponding to the prediction of whether a vehicle in the area is expected to be in a collision) is greater than the unsafe threshold, then the system deems the area as unsafe.

In some embodiments, the determination that an area is deemed unsafe is based at least in part on historical information. For example, the system uses historical traffic data or historical collision data comprised in the unified map to determine whether an area is unsafe. For example, an area in which a collision rate exceeds a particular collision rate threshold or a total number of collisions exceeds a particular collision event threshold, then the particular area may be deemed unsafe, or a heuristic used in the scoring function may be indicative of the area being unsafe.

In some embodiments, the system stores a mapping of geographic locations to unsafe areas. The system uses the vehicle location in connection with querying the mapping of geographic locations to unsafe areas to determine whether the vehicle location corresponds to an unsafe location.

In some embodiments, the system determines whether a bounding box for the vehicle or vehicle's location data overlaps an unsafe area (e.g., an unsafe area determine based on the unified map data). As an example, the system determines whether a threshold percentage of the bounding box overlaps with a permitted parking area or a restricted parking area, and in response to determining that the threshold percentage of the bounding box so overlaps, the system may deem the vehicle to be within the unsafe area.

In response to determining that the vehicle is parked in an unsafe location at 720, process 700 returns to 705 and process 700 iterates over 705-720 until the system determines that the vehicle is not parked in a valid parking location. For example, the system continues to monitor whether the vehicle is improperly parked.

In response to determining that the vehicle location does not correspond to a valid parking location at 720, process 700 proceeds to 725 at which the system performs an active measure.

At 730, a determination is made as to whether process 700 is complete. In some embodiments, process 700 is determined to be complete in response to a determination that no further vehicles are to be assessed for a parking condition or a sitting duck status, no vehicles in the fleet are parked (e.g., vehicles of the fleet within a predefined/selected geographic area), a user has exited the system, a user indicates that process 700 is to be paused or stopped, etc. In response to a determination that process 700 is complete, process 700 ends. In response to a determination that process 700 is not complete, process 700 returns to 705.

Figure 8:
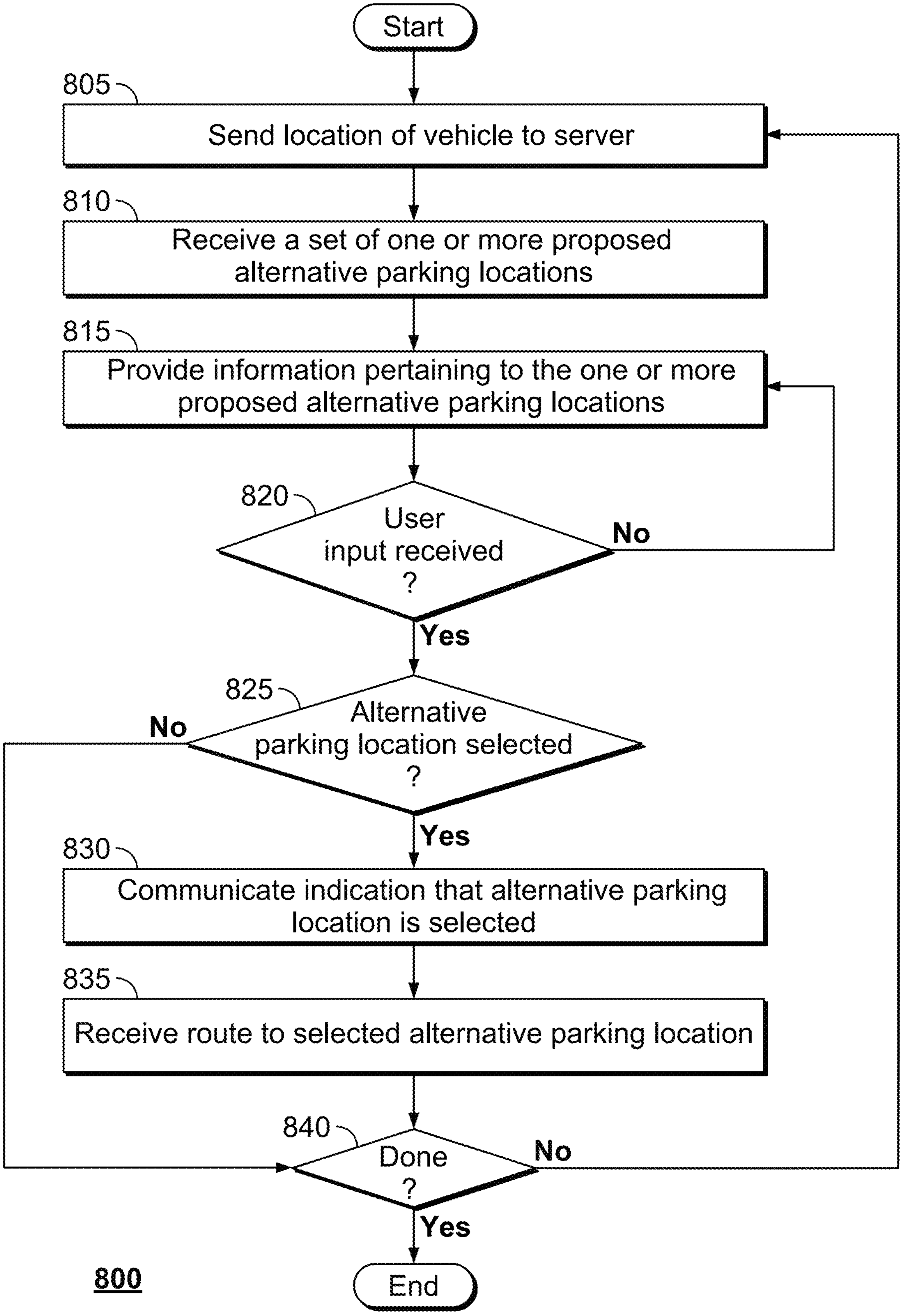
FIG. 8 is a flow diagram of a method for performing an active measure based on the parking of a vehicle according to various embodiments of the present application.

FIG. 8 is a flow diagram of a method for performing an active measure based on the parking of a vehicle according to various embodiments of the present application. In some embodiments, process 800 is implemented by system 100 of FIG. 1 and/or system 200 of FIG. 2. In some embodiments, process 800 is implemented by a managed vehicle system, such as first managed vehicle system 140, second managed vehicle system 150, or third managed vehicle system 160.

At 805, a location of a vehicle is sent to a server. In some embodiments, the vehicle communicates its current location to the server (e.g., fleet management service 110). The vehicle may communicate its current location at a predetermined frequency or in response to being queried by the server.

At 810, a set of one or more proposed alternative parking locations is received. The vehicle receives an indication of recommended alternative parking locations, such as based on the server determining that the vehicle is parked as a sitting duck or is otherwise expected to be subject to a parking condition (e.g., a hazard), or that the vehicle is parked in a restricted area. As an example, the set of one or more proposed alternative parking locations may correspond to parking locations for which an expectation/likelihood that a parked vehicle in the location is a sitting duck or parked in a restricted area is less than a predefined threshold. As another example, the set of one or more proposed alternative locations comprises locations that are within a predefined distance threshold from the current location or for which the cost for re-routing the vehicle is less than a cost threshold.

At 815, information pertaining to the one or more proposed alternative parking locations is provided. For example, the client device (e.g., an administrator system, or a managed vehicle system, etc.) provides at least a subset of the one or more proposed alternative parking locations on a user interface. The user interface may comprise selectable elements for the various alternative parking locations and the user (e.g., a fleet manager or driver) inputs a selection of an alternative parking location by selecting the corresponding selectable element.

At 820, the system determines whether a user input is received. In response to determining that a user input is not received at 825, process 800 returns to 815 and process 800 iterates over 815-820 until the system determines that user input is received. Conversely, in response to determining that the user input is received at 825, process 800 proceeds to 825.

At 825, the system determines whether an alternative parking location is selected. In response to determining that the alternative parking location is selected at 825, process 800 proceeds to 830. Conversely, in response to determining that the alternative parking location is not selected, process 800 proceeds to 840.

At 830, an indication that the alternative parking location is selected is communicated. For example, the client device (e.g., the administrator system, managed vehicle system, etc.) sends an indication of the alternative parking location that was selected by the user.

At 835, a route to the selected alternative parking location is received. In response to the server (e.g., the fleet management service) receiving a selection of an alternative parking location, the server obtains (e.g., determines) a route for the vehicle to relocate to the selected alternative parking location. The server determines the route based on a current vehicle location and a location of the alternative parking location. The server may use unified map data in connection with determining the route. The server provides the route to the system (e.g., the vehicle management system) in response to receiving the selection of the selected alternative parking location.

At 840, a determination is made as to whether process 800 is complete. In some embodiments, process 800 is determined to be complete in response to a determination that no further recommendations for alternative parking locations are to be determined/provided, a determination that the vehicle has successfully parked at the selected alternative parking location a user has exited the system, a user indicates that process 800 is to be paused or stopped, etc. In response to a determination that process 800 is complete, process 800 ends. In response to a determination that process 800 is not complete, process 800 returns to 805.

Figure 9:
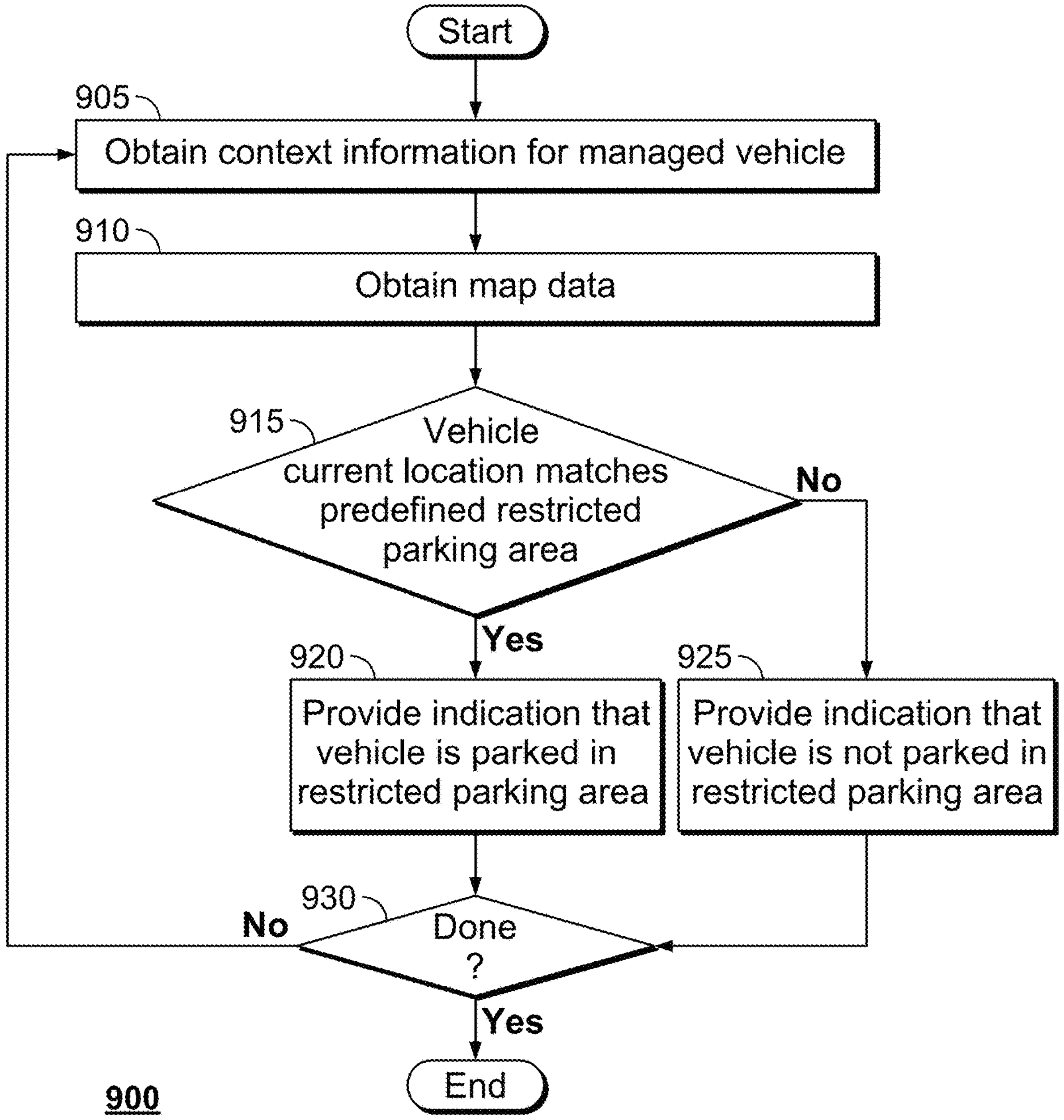
FIG. 9 is a flow diagram of a method for determining whether a vehicle is parked in a restricted parking area according to various embodiments of the present application.

FIG. 9 is a flow diagram of a method for determining whether a vehicle is parked in a restricted parking area according to various embodiments of the present application. In some embodiments, process 900 is implemented by system 100 of FIG. 1 and/or system 200 of FIG. 2. In some embodiments, process 900 is implemented by a fleet manager service.

At 905, context information for a managed vehicle is obtained. The context information for the managed vehicle comprises one or more of location data, speed data, payload data, driver data, an image captured by a camera mounted to the vehicle, etc. Various other types of data with respect to a context of the managed vehicle may be received. The system may obtain the context information for a managed vehicle according to a predefined frequency. The predefined frequency may be configurable, such as by a fleet administrator.

In some embodiments, 905 corresponds to, or is similar to, 505 of process 500 of FIG. 5.

At 910, map data is obtained. The map data may correspond to, or be comprised in, unified map data that aggregates information from various data sources. In response to obtaining the various types of information from the various data sources, the system determines the unified map data or generates a unified map.

At 915, the system determines whether the current location matches a predefined restricted parking area. The system determines whether the current location matches a predefined restricted parking area based on the vehicle location data and the map data. In some embodiments, 915 corresponds to, or is similar to, 520 of process 500 of FIG. 5.

In response to determining that the vehicle location matches a predefined restricted parking area at 915, process 900 proceeds to 920 at which the system provides an indication that the vehicle is parked in a restricted parking area. Conversely, in response to determining that the vehicle location does not match a predefined restricted parking area at 915, process 900 proceeds to 925 at which the system provides an indication that the vehicle is not parked in the restricted area.

At 930, a determination is made as to whether process 900 is complete. In some embodiments, process 900 is determined to be complete in response to a determination that no assessments of improper parking are to be performed, a determination that the vehicle has is not parked (e.g., is not stationary), a user indicates that process 900 is to be paused or stopped, etc. In response to a determination that process 900 is complete, process 900 ends. In response to a determination that process 900 is not complete, process 900 returns to 905.

Figure 10:
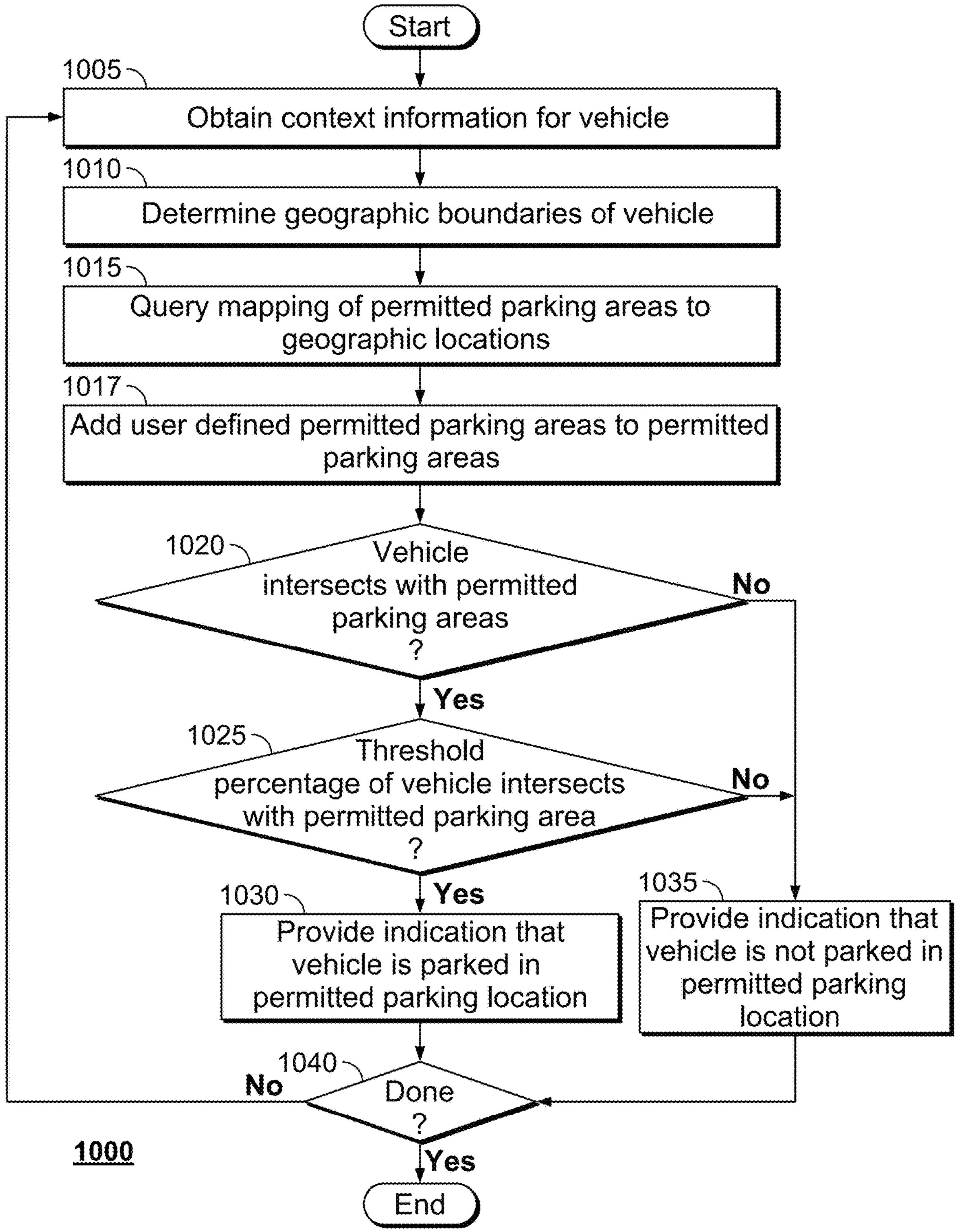
FIG. 10 is a flow diagram of a method for determining whether a vehicle is parked in a permitted parking area according to various embodiments of the present application.

FIG. 10 is a flow diagram of a method for determining whether a vehicle is parked in a permitted parking area according to various embodiments of the present application. In some embodiments, process 1000 is implemented by system 100 of FIG. 1 and/or system 200 of FIG. 2.

At 1005 context information for a vehicle is obtained. In some embodiments, 1005 corresponds to, or is similar to, 905 of process 900 of FIG. 9.

At 1010, geographic boundaries of a vehicle are determined. In some embodiments, the system determines a bounding box for the vehicle. The bounding box can be a representation of geographic boundaries occupied by the vehicle. The geographic boundaries are determined based on the context information. For example, the context information comprises information indicating a size and/or shape of the vehicle, and the system determines the bounding box for the vehicle based on the size/shape of the vehicle and a centroid of the location data for the vehicle.

At 1015, a mapping of permitted parking areas to geographic locations is queried. As an example, system uses the geographic boundaries to obtain unified map data for the vehicle location.

At 1017, user defined permitted parking areas to permitted parking areas. For example, customers can define permitted parking on nearby or leading roads into a permitted parking geofence (e.g., parking can be indicated to be permitted on the exit or entrance ramps from highways leading to any permitted geofence of a type "rest area" or parking can be conditionally permitted based on a state of the "rest area" such as parking area ramp parking is permitted in response to a rest area parking lot being in a full state).

At 1020, the system determines whether the vehicle intersects with a permitted parking area. The system uses a result from querying the mapping of permitted location areas and from the user defined permitted locations to determine whether the vehicle overlaps a permitted parking area (e.g., to determine whether the vehicle is parked in the permitted parking area). In some embodiments, 1020 corresponds to, or is similar to, 520 of process 500 of FIG. 5.

In response to determining that the vehicle intersects with the permitted parking area at 1020, process 1000 proceeds to 1025. Conversely, in response to determining that the vehicle does not intersect with permitted parking area at 1020, process 1000 proceeds to 1035.

At 1025, the system determines whether a threshold percentage of the vehicle intersects with the permitted parking area. For example, if a small percentage of the vehicle or edge of the vehicle overlaps with a permitted parking area, then the system may deem the vehicle to not be within the permitted parking area.

In response to determining that a threshold percentage of the vehicle intersects with the permitted parking area at 1025, process 1000 proceeds to 1030 at which the system provides an indication that the vehicle is parked in a permitted parking area. Conversely, in response to determining that the threshold percentage of the vehicle does not intersect with the permitted parking area at 1025, process 1000 proceeds to 1035 at which the system provides an indication that the vehicle is not parked in the permitted parking area.

At 1040, a determination is made as to whether process 1000 is complete. In some embodiments, process 1000 is determined to be complete in response to a determination that no assessments of whether a vehicle is parked in a permitted parking area, a determination that the vehicle has is not parked (e.g., is not stationary), a user indicates that process 1000 is to be paused or stopped, etc. In response to a determination that process 1000 is complete, process 1000 ends. In response to a determination that process 1000 is not complete, process 1000 returns to 1005.

Figure 11:
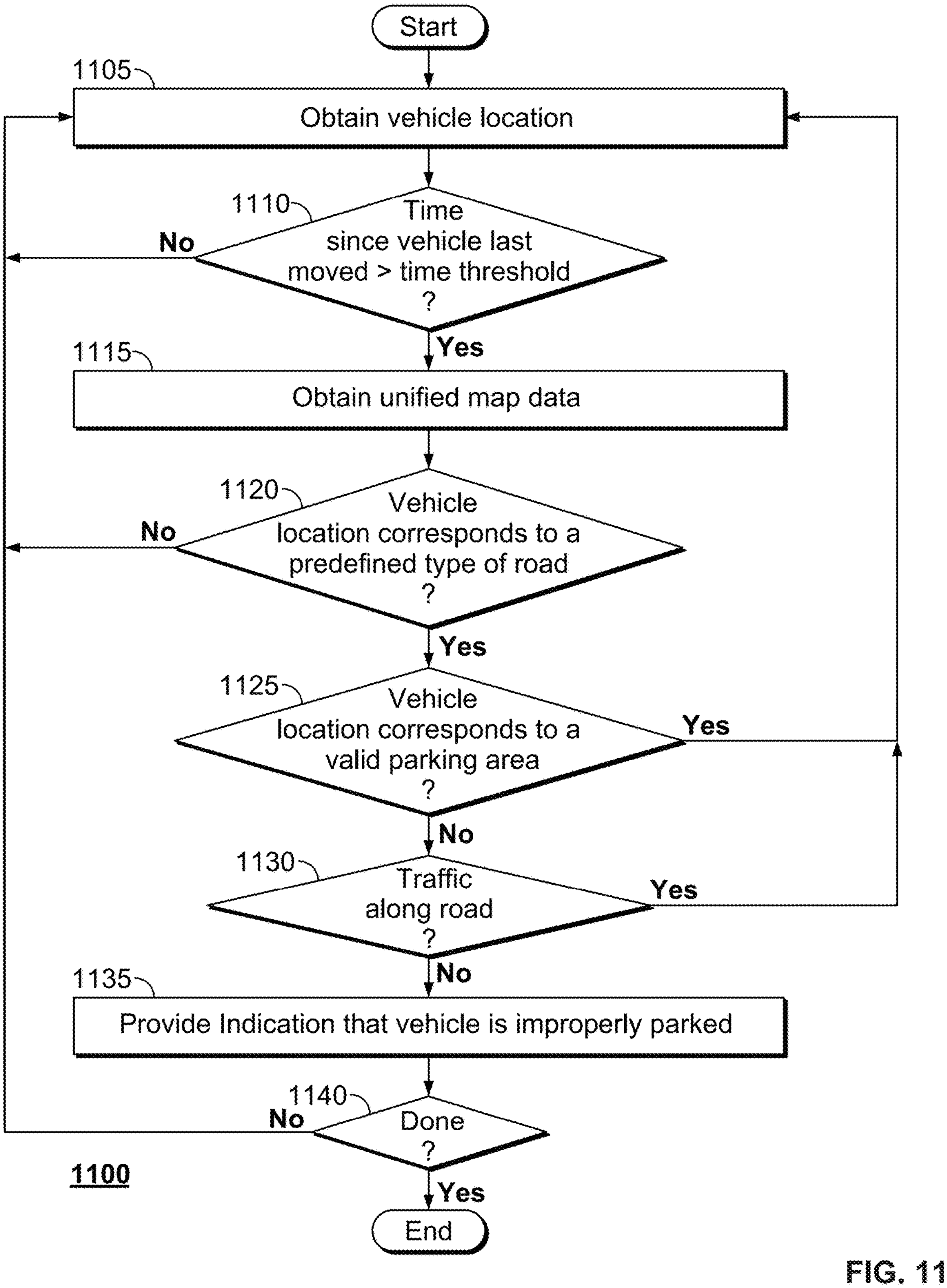
FIG. 11 is a flow diagram of a method for determining whether a vehicle is parked in a permitted parking area according to various embodiments of the present application.

FIG. 11 is a flow diagram of a method for determining whether a vehicle is properly parked according to various embodiments of the present application. In some embodiments, process 1100 is implemented by system 100 of FIG. 1 and/or system 200 of FIG. 2.

At 1105, vehicle location is obtained. In some embodiments, 1105 corresponds to, or is similar to 505 of process 500 of FIG. 5.

At 1110, the system determines whether a time since the vehicle last moved is greater than a time threshold. In some embodiments, 1110 corresponds to, or is similar to 510 of process 500 of FIG. 5. As an example, the system uses the time threshold to ascertain whether the vehicle is parked or otherwise stationary.

In response to determining that the time since the vehicle last moved is not greater than the time threshold at 1110, process 1100 returns to 1105 and process 1100 iterates over 1105-1110 until the system determines that the time since the vehicle last moved is greater than the time threshold.

In response to determining that the time since the vehicle last moved is greater than the time threshold at 1110, process 1100 proceeds to 1115 at which unified map data is obtained. In some embodiments, 1115 corresponds to, or is similar to, 715 of process 700 of FIG. 7.

At 1120, the system determines whether the vehicle location corresponds to a predefined type of road. The system uses the unified map data to determine a road on which (or along which or within proximity of) the vehicle is parked. In response to determining the road, the system uses the unified map data (e.g., road data) to determine the type of road to which the road corresponds. As an example, the road data includes classifications for roads, such as an indication of whether the road is an interstate highway, a state highway, a rural road, etc. As another example, the road data includes information associated with the road, such as a posted speed limit, a number of lanes, a width of the lanes or road, a historical average speed, a collision rate, etc.

In some embodiments, determining whether the vehicle location corresponds to a predefined type of road comprises determining whether the particular road is a type of road for which the system is to perform a parking assessment, such as to predict whether the vehicle is a sitting duck, to predict whether the vehicle is parked in a restricted parking area or a permitted parking area, etc. Examples of types of roads for which the system is to perform the parking assessment may include an interstate highway, a state highway, a road along which the posted speed limit (or historical average speed limit) exceeds a speed threshold (e.g., 50 mph), etc.

In response to determining that the vehicle location does not correspond to a predefined type of road at 1120, process 1100 returns to 1105 at which process 1100 iterates over 1105-1120 until the vehicle location corresponds to a predefined type of road.

In response to determining that the vehicle location corresponds to a predefined type of road at 1120, process 1100 proceeds to 1125 at which the system determines whether the vehicle location corresponds to a valid parking area. In some embodiments, 1125 corresponds to, or is similar to, 520 of process 500 of FIG. 5.

In response to determining that the vehicle location corresponds to a valid parking area at 1125, process 1100 returns to 1105 and process 1100 iterates over 1105-1125 until the system determines that the vehicle location corresponds to a predefined type of road and a valid parking area.

In response to determining that the vehicle location does not correspond to a valid parking location at 1125, process 1100 proceeds to 1130 at which the system determines whether traffic is occurring on the road (e.g., the road along which the vehicle is parked). In some embodiments, the system uses traffic data to confirm whether the vehicle is stationary in traffic or parked. For example, the system uses a heuristic indicating that a stationary vehicle along a road comprising current traffic (e.g., a road for which traffic data indicates traffic is moving slowly or is congested) is indicative of the vehicle not being parked.

In response to determining that traffic is occurring on the road at 1130, process 1100 returns to 1105 and process 1105 iterates over 1105-1130 until the system determines that the vehicle is parked in a location corresponding to a predefined type of road, the road has traffic, and the vehicle location is parked in a valid parking area. Conversely, in response to determining that traffic is not occurring on the road at 1130, process 1100 proceeds to 1135 at which the system provides an indication that the vehicle is improperly parked.

At 1140, a determination is made as to whether process 1100 is complete. In some embodiments, process 1100 is determined to be complete in response to a determination that no assessments of whether a vehicle is parked in a permitted parking area or improperly parked, a determination that the vehicle has is not parked (e.g., is not stationary), a user indicates that process 1100 is to be paused or stopped, etc. In response to a determination that process 1100 is complete, process 1100 ends. In response to a determination that process 1100 is not complete, process 1100 returns to 1105.

Figure 12:
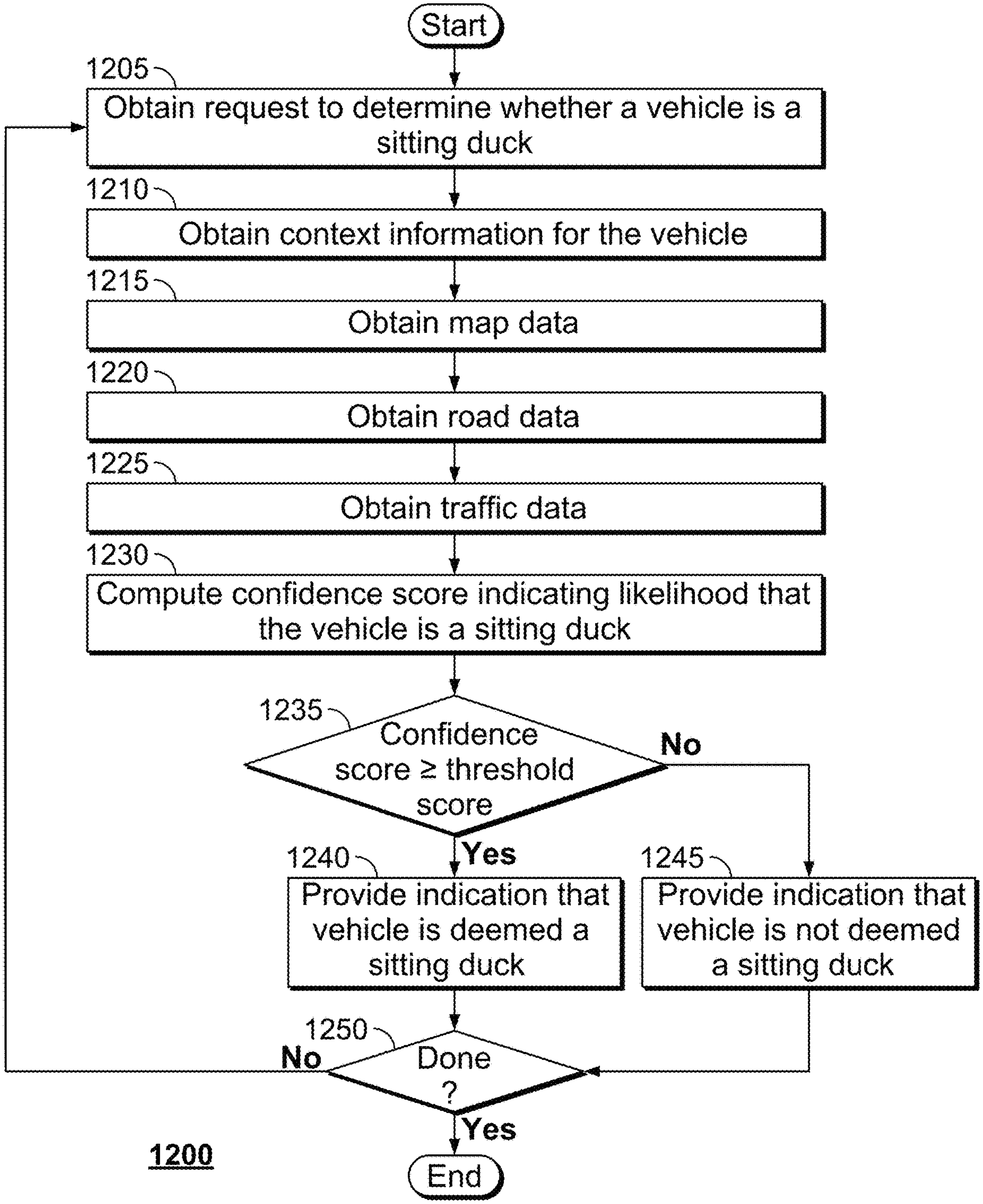
FIG. 12 is a flow diagram of a method for determining whether a vehicle is properly parked according to various embodiments of the present application.

FIG. 12 is a flow diagram of a method for determining whether a vehicle is properly parked according to various embodiments of the present application. In some embodiments, process 1200 is implemented by system 100 of FIG. 1 and/or system 200 of FIG. 2.

At 1205, a request to determine whether a managed vehicle is a sitting duck is obtained. In some embodiments, the system receives a request to perform a parking assessment based on a user input, such as from a fleet manager or a driver for a vehicle. In some embodiments, the system periodically performs parking assessments and the request to perform the parking assessment (e.g., determine whether the vehicle is a sitting duck) is generated according to a predefined frequency or in response to a predefined set of conditions being satisfied (e.g., in response to determining that the vehicle has been stationary for a time threshold).

At 1210, context information for the vehicle is obtained. In some embodiments, 1210 corresponds to, or is similar to, 1005 of process 1000 or 505 of process 500.

At 1215, map data is obtained. In some embodiments, the system obtains map data for a predetermined geographic area, such as a geographic area in which one or more managed vehicles are located. The geographic area may be determined based on the context information for the managed vehicle.

At 1220, road data is obtained. In some embodiments, the system obtains road data for a predetermined geographic area, such as a geographic area in which one or more managed vehicles are located. The geographic area may be determined based on the context information for the managed vehicle. The road data may include one or more characteristics of roads within the geographic area. As an example, the road data includes classifications for roads, such as an indication of whether the road is an interstate highway, a state highway, a rural road, etc. As another example, the road data includes information associated with the road, such as a posted speed limit, a number of lanes, a width of the lanes or road, a historical average speed, a collision rate, etc.

At 1225, traffic data is obtained. In some embodiments, the system obtains traffic data for a predetermined geographic area, such as a geographic area in which one or more managed vehicles are located. The geographic area may be determined based on the context information for the managed vehicle. Examples of traffic data include an indication that a road is congested, a speed of traffic, a number of vehicles on the corresponding road, an indication of whether the speed of traffic is less than a posted speed limit (e.g., the traffic is slower than the posted speed limit by a traffic speed threshold), an indication of whether the speed of traffic is greater than a posted speed limit, an indication that a density of vehicles on the road is greater than a historical average vehicle density, etc.

In some embodiments, 1215-1225 may be implemented in a single step of obtaining unified map data that aggregates the map data, road data, traffic data, etc.

At 1230, the system computes a confidence score indicating a likelihood that the vehicle is a sitting duck. In some embodiments, the system predicts whether the managed vehicle is a sitting duck based at least in part on the map data, the road data, and the traffic data. The system can use a scoring function from which a confidence score (e.g., a composite score) pertaining to a context of the vehicle is computed. As an example, the scoring function is based on one or more heuristics that indicate whether a vehicle is a sitting duck. The one or more heuristics may be based on unified map data, such as one or more conditions that are indicative of the vehicle being a sitting duck, or indicative of the vehicle not being a sitting duck.

At 1235, the system determines whether the confidence score is greater than or equal to a threshold score. The system compares the confidence score to a threshold score, which is predefined based on a desired sensitivity of detecting parked vehicles that are sitting ducks.

In response to determining that the confidence score is greater than or equal to the threshold score at 1235, process 1200 proceeds to 1240 at which the system provides an indication that the vehicle is deemed a sitting duck. Conversely, in response to determining that the confidence score is less than the threshold score at 1235, process 1200 proceeds to 1245 at which the system provides an indication that the vehicle is not deemed a sitting duck.

At 1250, a determination is made as to whether process 1200 is complete. In some embodiments, process 1200 is determined to be complete in response to a determination that no assessments of whether a vehicle is parked in a permitted parking area, improperly parked, or otherwise a sitting duck, a determination that the vehicle has is not parked (e.g., is not stationary), a user indicates that process 1200 is to be paused or stopped, etc. In response to a determination that process 1200 is complete, process 1200 ends. In response to a determination that process 1200 is not complete, process 1200 returns to 1205.

Figure 13:
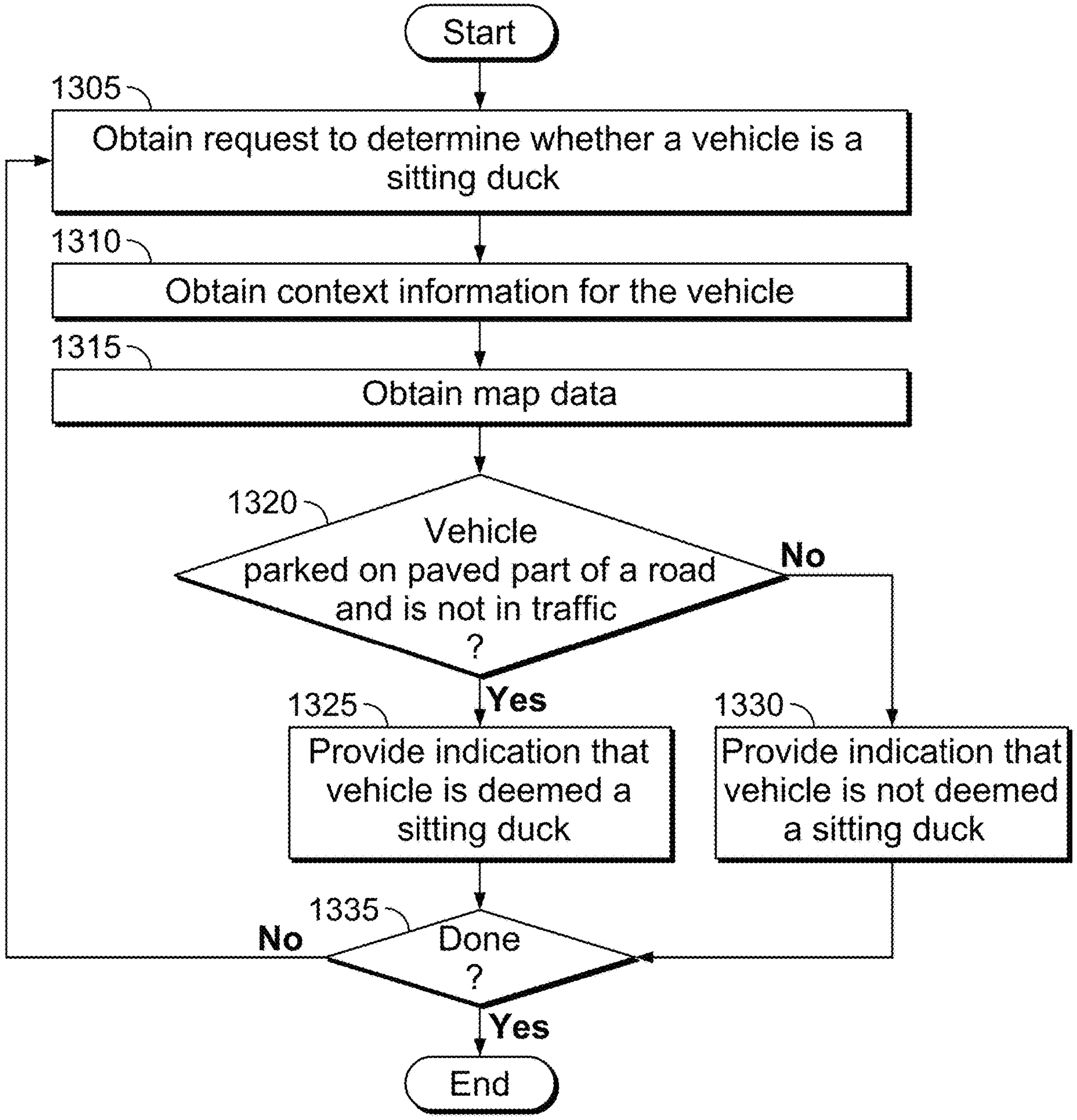
FIG. 13 is a flow diagram of a method for determining whether a vehicle is properly parked according to various embodiments of the present application.

FIG. 13 is a flow diagram of a method for determining whether a vehicle is properly parked according to various embodiments of the present application. In some embodiments, process 1300 is implemented by system 100 of FIG. 1 and/or system 200 of FIG. 2.

At 1305, a request to determine whether a vehicle is a sitting duck is obtained. In some embodiments, 1305 corresponds to, or is similar to 1205 of process 1200.

At 1310, context information for the vehicle is obtained. In some embodiments, 1310 corresponds to, or is similar to, 1005 of process 1000 or 505 of process 500.

At 1315, map data is obtained. In some embodiments, the obtaining the map data includes generating or updating a unified map based on information obtained from one or more data sources, such as map data, weather data, traffic data, road data, data indicating permitted parking areas, data indicating restricted parking areas, etc.

At 1320, the system determines whether the vehicle is parked on a paved part of the road and is not in traffic. For example, the system determines whether the vehicle is located in the middle (e.g., middle third) of a road and the road does not comprise traffic, which would increase the likelihood that the vehicle is merely stationary in traffic rather than parked. The determination of whether the vehicle is parked on a paved part of the road and not in traffic may be a heuristic that the system uses to predict whether the vehicle is a sitting duck. For example, the heuristic may be used in a scoring function to determine a confidence level that the vehicle is a sitting duck.

In response to determining that the vehicle is parked on the paved part of the road and is not in traffic at 320, process 1300 proceeds to 1325 at which the system provides an indication that the vehicle is deemed a sitting duck. Conversely, in response to determining that the vehicle is not parked on the paved part of the road and/or is in traffic at 1320, process 1300 proceeds to 1330 at which the system provides an indication that the vehicle is not deemed a sitting duck.

At 1335, a determination is made as to whether process 1300 is complete. In some embodiments, process 1300 is determined to be complete in response to a determination that no assessments of whether a vehicle is parked in a permitted parking area, improperly parked, or otherwise a sitting duck, a determination that the vehicle has is not parked (e.g., is not stationary), a user indicates that process 1300 is to be paused or stopped, etc. In response to a determination that process 1300 is complete, process 1300 ends. In response to a determination that process 1300 is not complete, process 1300 returns to 1305.

Figure 14:
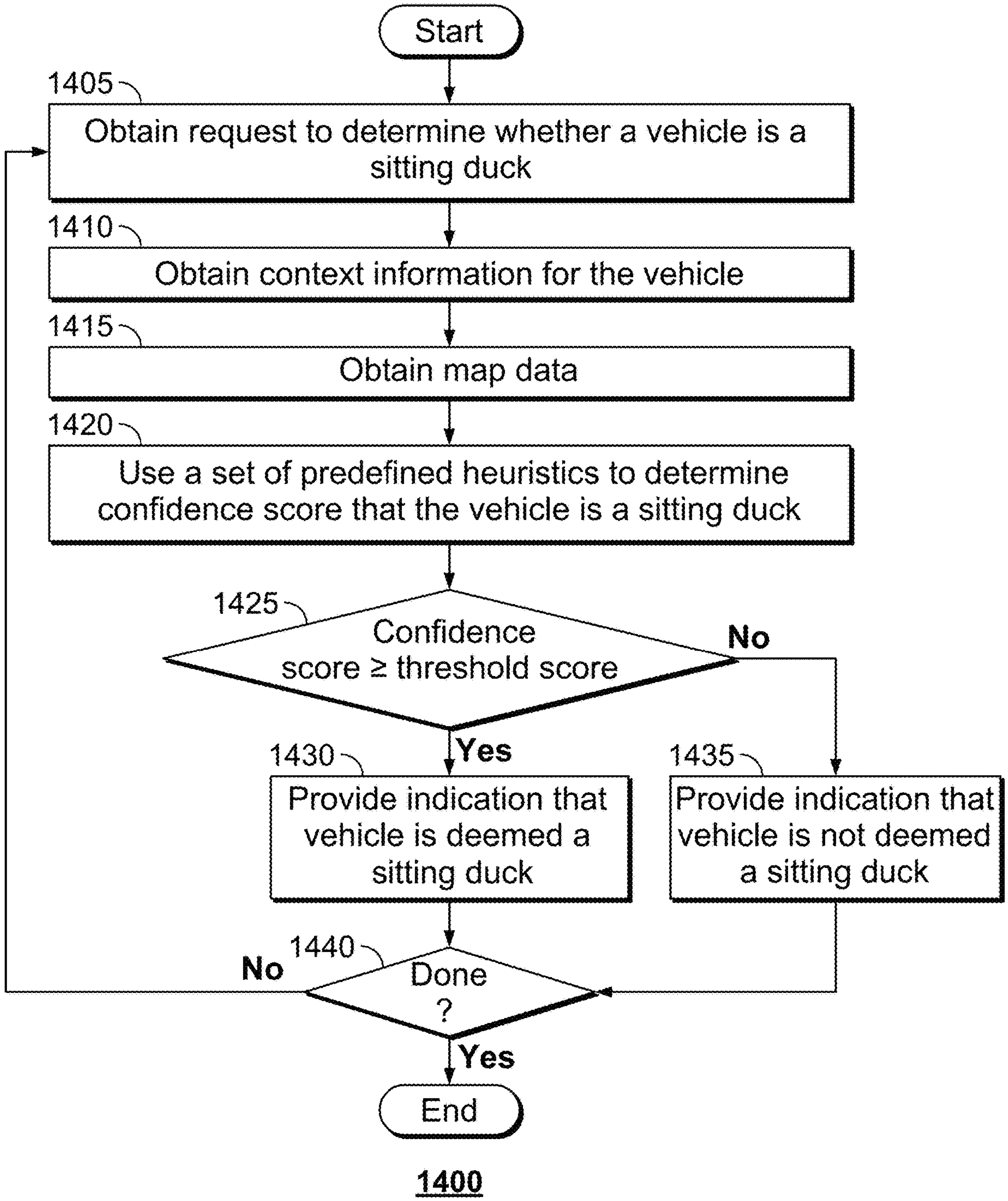
FIG. 14 is a flow diagram of a method for determining whether a vehicle is properly parked according to various embodiments of the present application.

FIG. 14 is a flow diagram of a method for determining whether a vehicle is properly parked according to various embodiments of the present application. In some embodiments, process 1400 is implemented by system 100 of FIG. 1 and/or system 200 of FIG. 2.

At 1405, a request to determine whether a vehicle is a sitting duck is obtained. In some embodiments, 1405 corresponds to, or is similar to 1205 of process 1200.

At 1410, context information for the vehicle is obtained. In some embodiments, 1410 corresponds to, or is similar to, 1005 of process 1000 or 505 of process 500.

At 1415, map data is obtained. In some embodiments, the obtaining the map data includes generating or updating a unified map based on information obtained from one or more data sources, such as map data, weather data, traffic data, road data, data indicating permitted parking areas, data indicating restricted parking areas, etc.

At 1420, the system uses a set of predefined heuristics to determine a confidence score of whether the vehicle is a sitting duck. In some embodiments, the system uses a scoring function to obtain the confidence score. The scoring function may aggregate results of a set of heuristics to predict whether the vehicle is a sitting duck.

At 1425, the system determines whether the confidence score is greater than or equal to the threshold score. In response to determining that the confidence score is greater than or equal to the threshold score at 1425, process 1400 proceeds to 1430 at which the system provides an indication that the vehicle is deemed a sitting duck. Conversely, in response to determining that the confidence score is not greater than or equal to the threshold score at 1425, process 1400 proceeds to 1435 at which the system provides an indication that the vehicle is not deemed a sitting duck.

At 1440, a determination is made as to whether process 1400 is complete. In some embodiments, process 1400 is determined to be complete in response to a determination that no assessments of whether a vehicle is parked in a permitted parking area, improperly parked, or otherwise a sitting duck, a determination that the vehicle has is not parked (e.g., is not stationary), a user indicates that process 1400 is to be paused or stopped, etc. In response to a determination that process 1400 is complete, process 1400 ends. In response to a determination that process 1400 is not complete, process 1400 returns to 1405.

Figure 15:
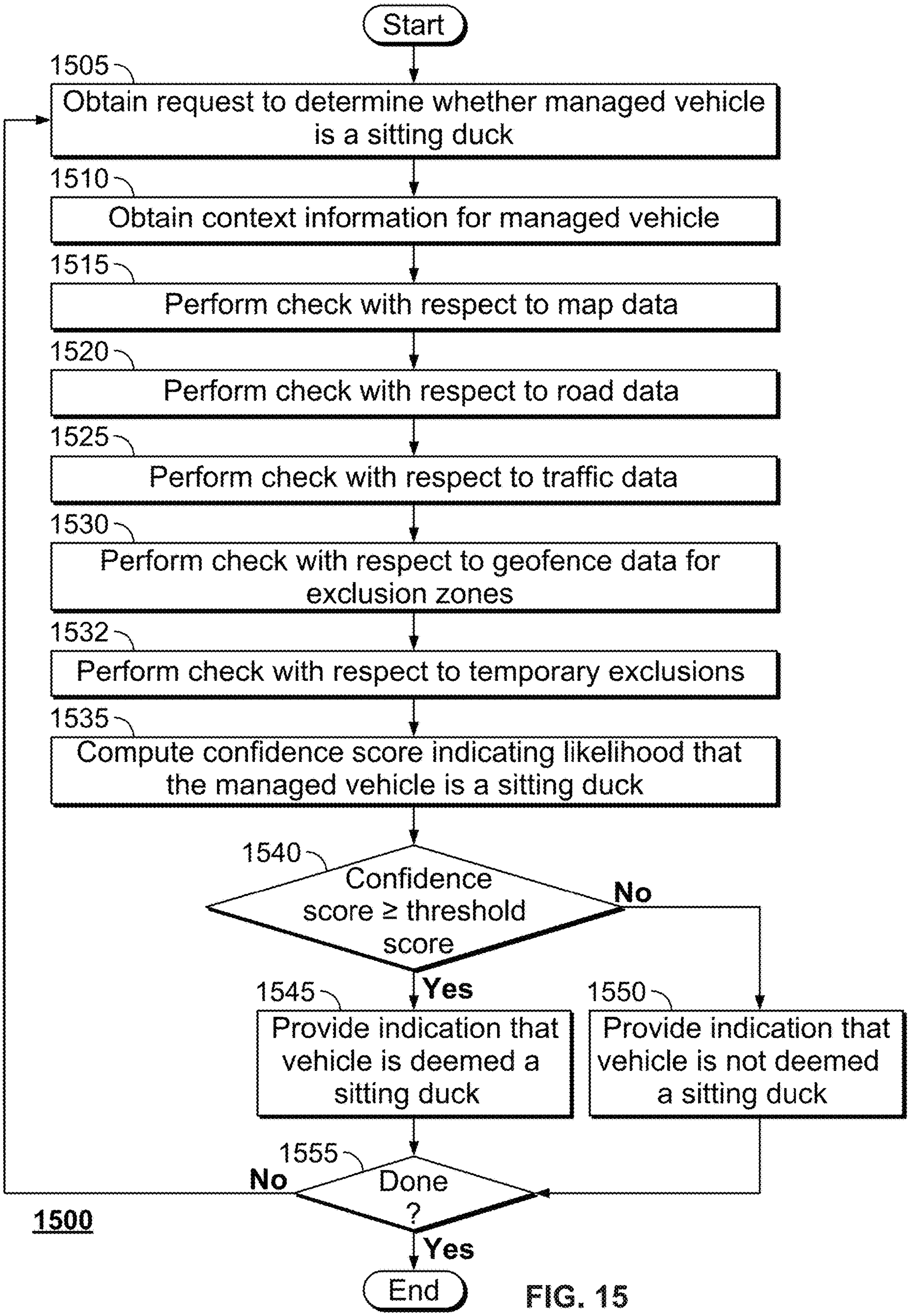
FIG. 15 is a flow diagram of a method for determining whether a vehicle is properly parked according to various embodiments of the present application.

FIG. 15 is a flow diagram of a method for determining whether a vehicle is properly parked according to various embodiments of the present application. In some embodiments, process 1500 is implemented by system 100 of FIG. 1 and/or system 200 of FIG. 2.

At 1505, a request to determine whether a vehicle is a sitting duck is obtained. In some embodiments, 1505 corresponds to, or is similar to 1205 of process 1200.

At 1510, context information for the vehicle is obtained. In some embodiments, 1310 corresponds to, or is similar to, 1005 of process 1000 or 505 of process 500.

At 1515, the system performs a check with respect to map data. For example, the system performs a check to determine whether the vehicle is located in a predefined permitted parking area. In some embodiments, the performing the check with respect to road data comprises determining whether the vehicle corresponds to an area for which the system is to perform a parking assessment (e.g., assess whether the vehicle is parked as a sitting duck).

At 1520, the system performs a check with respect to road data. For example, the system performs a check to determine a type of road corresponding to the vehicle location (e.g., a road along which the vehicle is parked, a road on which the vehicle is located, a road for which the vehicle is within a predefined proximity, etc.). In some embodiments, the system performs a parking assessment for particular types of roads, such as interstate highways, state highways, or other roads on which being parked as a sitting duck is unsafe (e.g., roads on which a collision rate with sitting ducks exceeds a collision rate threshold, roads on which traffic speed exceeds a speed threshold, etc.). In some embodiments, the performing the check with respect to road data comprises determining whether the vehicle is on a road corresponding to a road type for which the system is to perform a parking assessment (e.g., assess whether the vehicle is parked as a sitting duck). In some embodiments, the performing the check with respect to road data comprises determining whether the vehicle location corresponds to a middle (or middle third) of a road, whether the vehicle location corresponds to an unpaved part of the road (e.g., the road shoulder, etc.).

At 1525, the system performs a check with respect to traffic data. For example, the system performs a check to the traffic at (or within a predefined distance/area) the vehicle location. The presence of traffic at the vehicle location may be indicative that the vehicle is stationary in traffic rather than parked as a sitting duck. The absence of traffic may be indicative that the vehicle is parked.

At 1530, the system performs a check with respect to geofence data for exclusion zones. In some embodiments, the system stores predefined geofenced areas for which parking assessment (e.g., assessment of whether the vehicle is a sitting duck) is to be excluded. For example, an exclusion zone corresponds to an area in which parking assessment is not to be performed. The exclusion zone may be an area in which parking assessment is inconclusive or inaccurate. For example, if a parking lot exists under a bridge, then using location data to ascertain whether the vehicle is properly parked is difficult because the vehicle may be on the road for the overpass or parked in the parking lot beneath the overpass. An exclusion zone is then classified as not unsafe, safe, inconclusive, inaccurate, or any other appropriate classification.

In some embodiments, vehicles safely park in minor rest areas. Minor rest areas are often not part of existing map data. In some embodiments, minor rest areas are determined by analyzing road networks around the prospective minor rest area candidates. In various embodiments, minor rest areas comprise simple bypass roads parallel to a highway, simple parking lot next to a highway bypass ramp, or any other appropriate minor rest area.

At 1532, the system performs a check with respect to temporary exclusions. In some embodiments, the system determines whether a managed vehicle is parked in an unsafe location comprises determining whether the managed vehicle is subject to a temporary exclusion from being indicated that the managed vehicle is parked unsafely. In some embodiments, the temporary exclusion comprises an exclusion due to weather conditions (e.g., extreme weather conditions such as high winds, snow, ice, etc. that enable a vehicle to be allowed to park on roadsides temporarily for safety during the weather condition) or emergency conditions (e.g., temporary emergency conditions such as having a breakdown, being near a police or other emergency vehicle, near to an accident, near to a vehicle with their hood up, etc. that enable a vehicle to be allowed to park on road sides temporarily). In various embodiments, the temporary conditions (e.g., weather or emergency conditions) are detected using an analysis video, using emergency vehicle databases, weather databases, or any other appropriate database.

At 1535, the system computes a confidence score indicating that the managed vehicle is a sitting duck. For example, the system uses a set of predefined heuristics to determine a confidence score of whether the vehicle is a sitting duck. In some embodiments, the system uses a scoring function to obtain the confidence score. The scoring function may aggregate results of a set of heuristics to predict whether the vehicle is a sitting duck. For example, the scoring function aggregates the heuristics applied with respect to performing the check using the map data, the check using the road data, or check using the traffic data.

At 1540, the system determines whether the confidence score is greater than or equal to the threshold score. In response to determining that the confidence score is greater than or equal to the threshold score at 1540, process 1500 proceeds to 1545 at which the system provides an indication that the vehicle is deemed a sitting duck. Conversely, in response to determining that the confidence score is not greater than or equal to the threshold score at 1540, process 1500 proceeds to 1550 at which the system provides an indication that the vehicle is not deemed a sitting duck.

At 1555, a determination is made as to whether process 1500 is complete. In some embodiments, process 1500 is determined to be complete in response to a determination that no assessments of whether a vehicle is parked in a permitted parking area, improperly parked, or otherwise a sitting duck, a determination that the vehicle has is not parked (e.g., is not stationary), a user indicates that process 1500 is to be paused or stopped, etc. In response to a determination that process 1500 is complete, process 1500 ends. In response to a determination that process 1500 is not complete, process 1500 returns to 1505.

Figure 16:
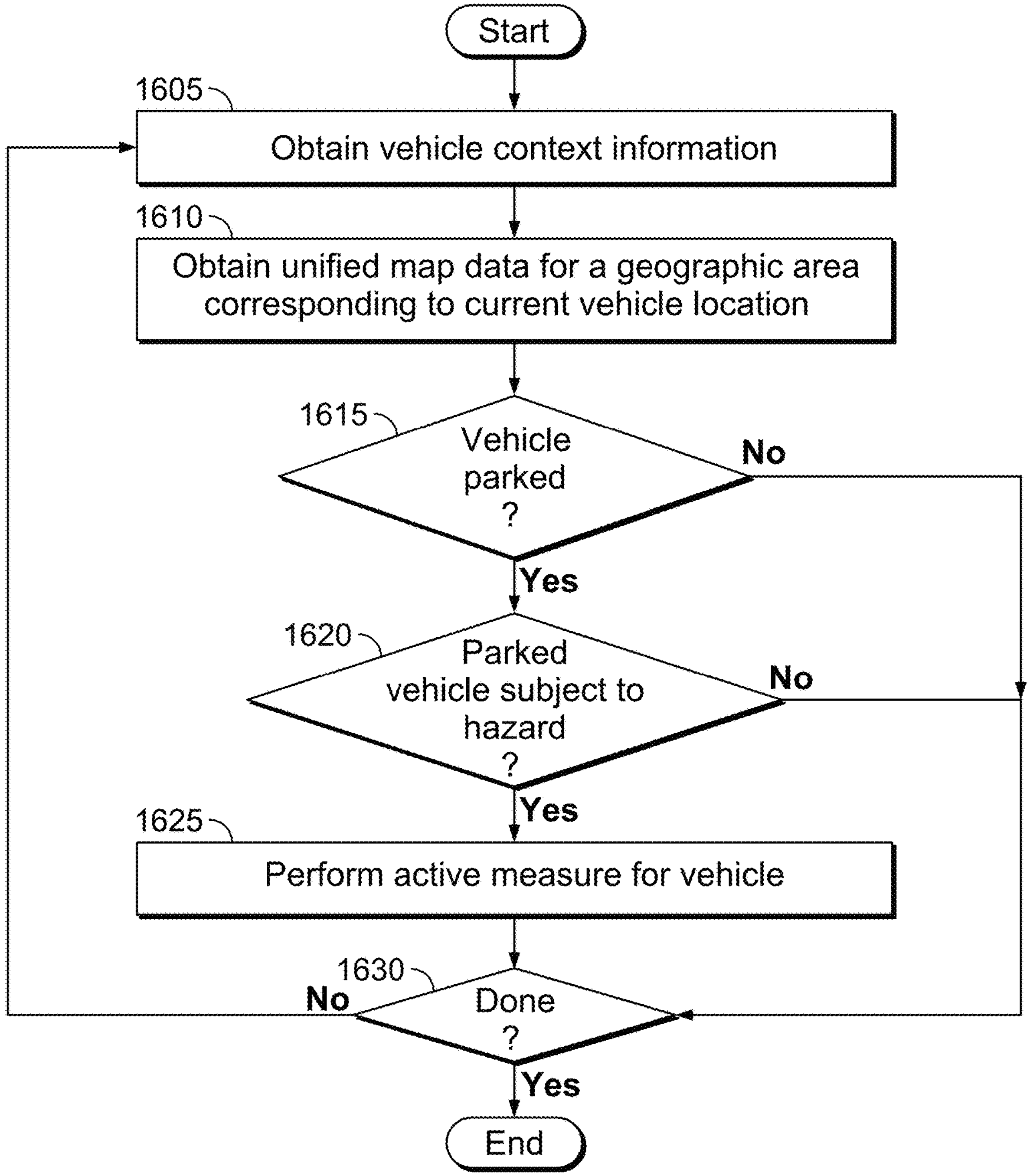
FIG. 16 is a flow diagram of a method for performing an active measure with respect to a parked vehicle according to various embodiments of the present application.

FIG. 16 is a flow diagram of a method for performing an active measure with respect to a parked vehicle according to various embodiments of the present application. In some embodiments, process 1600 is implemented by system 100 of FIG. 1 and/or system 200 of FIG. 2.

At 1605, context information for the vehicle is obtained. In some embodiments, 1605 corresponds to, or is similar to, 1005 of process 1000 or 505 of process 500.

At 1610, unified map data for the geographic area corresponding to the current vehicle location is obtained.

At 1615, the system determines whether the vehicle is parked. In some embodiments, the system determines whether the vehicle is parked based at least in part on the vehicle context information (e.g., the current vehicle location) and the unified map data. For example, the system uses one or more heuristics or a scoring function to obtain a prediction of whether the vehicle is parked.

In response to determining that the vehicle is not parked at 1615, process 1600 proceeds to 1630. Conversely, in response to determining that the vehicle is parked at 1615, process 1600 proceeds to 1620 at which the system determines whether the parked vehicle is subject to a hazard. In some embodiments, the system determines whether the vehicle is subject to a hazard based at least in part on the current vehicle location and the unified map data. For example, the system uses weather data comprised in the unified map data to determine whether the current vehicle corresponds to a weather warning (e.g., a flood warning, a blizzard warning, a high wind warning, a tropical storm warning, etc.). The system may apply a scoring function that provides a prediction of whether the vehicle is expected to be subject to a parking condition such as a hazard. As an example, the system determines that the vehicle is parked in a flood zone and the weather data indicates that a flood warning has been issued.

In response to determining that the parked vehicle is not subject to the hazard at 1620, process 1600 proceeds to 1630. Conversely, in response to determining that the parked vehicle is subject to the hazard at 1620, process 1600 proceeds to 1625 at which the system performs the active measure for the vehicle. For example, in response to determining that the parked vehicle is expected to be impacted by the hazard, the system provides an alert/prompt to a user (e.g., a fleet manager or driver). As another example, in response to determining that the parked vehicle is expected to be impacted by the hazard, the system determines a recommended alternative parking location(s) and provides a routing of the parked vehicle to the alternative parking location.

At 1630, a determination is made as to whether process 1600 is complete. In some embodiments, process 1600 is determined to be complete in response to a determination that no further active measures are to be performed for one or more vehicles, a determination that the vehicle has is not parked (e.g., is not stationary), a user indicates that process 1600 is to be paused or stopped, etc. In response to a determination that process 1600 is complete, process 1600 ends. In response to a determination that process 1600 is not complete, process 1600 returns to 1605.

Figure 17:
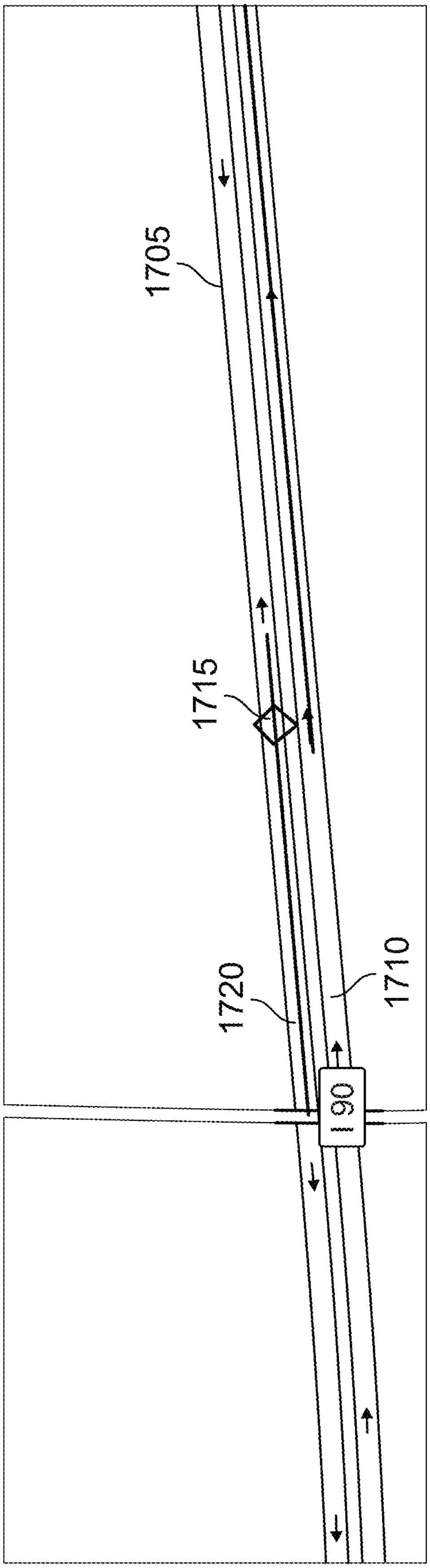
FIG. 17 is a diagram illustrating a location of a vehicle according to various embodiments of the present application.

FIG. 17 is a diagram illustrating a location of a vehicle according to various embodiments of the present application. In the example shown, the system obtains a unified map data comprising various data from various data sources. For example, unified map 1700 comprises map data and/or road data, such as an indication of I-90 westbound 1705, I-90 eastbound 1710, etc. The map data and/or road data comprises information that classifies the road, such as identifying information, or designates the type of road as being an interstate highway. As another example, unified map 1700 comprises vehicle location data, such as a current location 1715 for a vehicle. For example, the system overlays the current location 1715 of the vehicle onto the map data and/or road data such that the system is able to determine that the vehicle is located on I-90 westbound 1705. The system may use the centroid of the location data obtained from the vehicle to determine where the vehicle is in relation to I-90 westbound 1705 (e.g., to determine that the vehicle is in the middle of the road). As another example, unified map 1700 comprises traffic data, such as a traffic indicator 1720 that traffic is occurring along the road (e.g., traffic that is greater than the average traffic along the road, traffic that is congested or slow moving, etc.).

In some embodiments, the system uses unified map 1700 in connection with determining whether the vehicle is parked as a sitting duck. Using unified map 1700, the system determines that the vehicle is located on the road (e.g., the centroid of the location data is within the middle third of the road for I-90 westbound 1705) and that I-90 westbound 1705 comprises traffic. The system may use a heuristic to determine that the vehicle is likely not parked and thus is not expected to be a sitting duck (e.g., the system may determine that the vehicle is stationary because it is within congested traffic).

Figure 18:
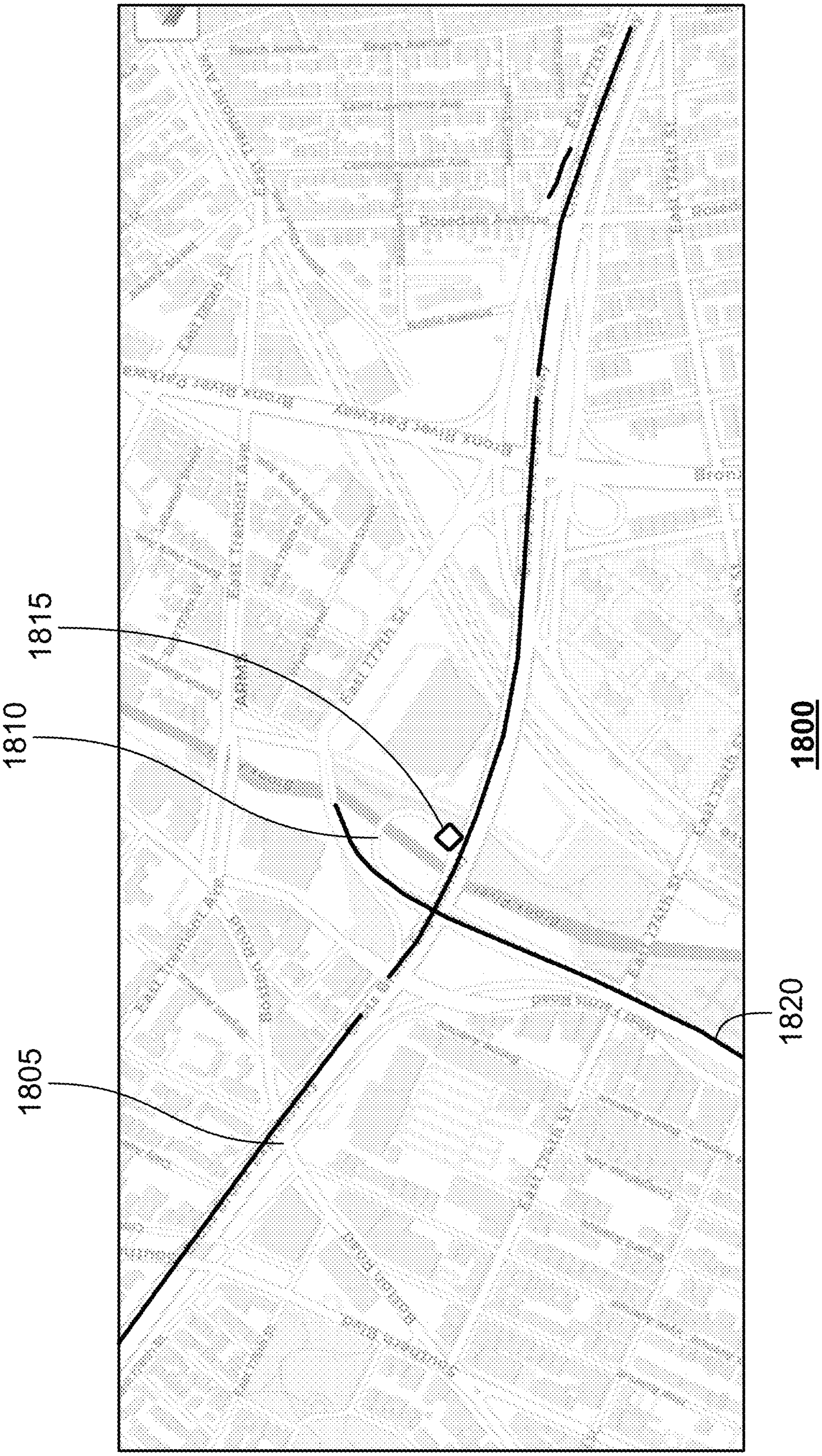
FIG. 18 is a diagram illustrating a location of a vehicle according to various embodiments of the present application.

FIG. 18 is a diagram illustrating a location of a vehicle according to various embodiments of the present application. In the example shown, the system obtains a unified map data comprising various data from various data sources. For example, unified map 1800 comprises map data and/or road data, such as an indication of various roads within the geographic area of the map, such as Cross Bronx expressway 1805, or on-ramp 1810 that serves as a ramp for traffic to enter Cross Bronx expressway 1805. As another example, unified map 1800 comprises vehicle location data, such as a current location 1815 for a vehicle. For example, the system overlays the current location 1815 of the vehicle onto the map data and/or road data such that the system is able to determine that the vehicle is located on on-ramp 1810. As another example, unified map 1800 comprises traffic data, such as a traffic indicator 1820 that traffic is occurring along roads within the geographic area, including cross Bronx expressway 1805.

In some embodiments, the system uses unified map 1800 in connection with determining whether the vehicle is parked as a sitting duck. Using unified map 1800, the system determines that the vehicle is located on the road corresponding to on-ramp 1810 and that on-ramp 1810 does not have live traffic data available. The system may use a heuristic to determine that the vehicle is likely parked on on-ramp 1810. The system may further use unified map 1800 in connection with a scoring function or set of heuristics to determine whether the vehicle is parked on the ramp as a sitting duck or if the vehicle is not a sitting duck because it is stopped in a traffic backup that is resolved using the available live traffic data from the Cross Bronx expressway (1805).

Figure 19:
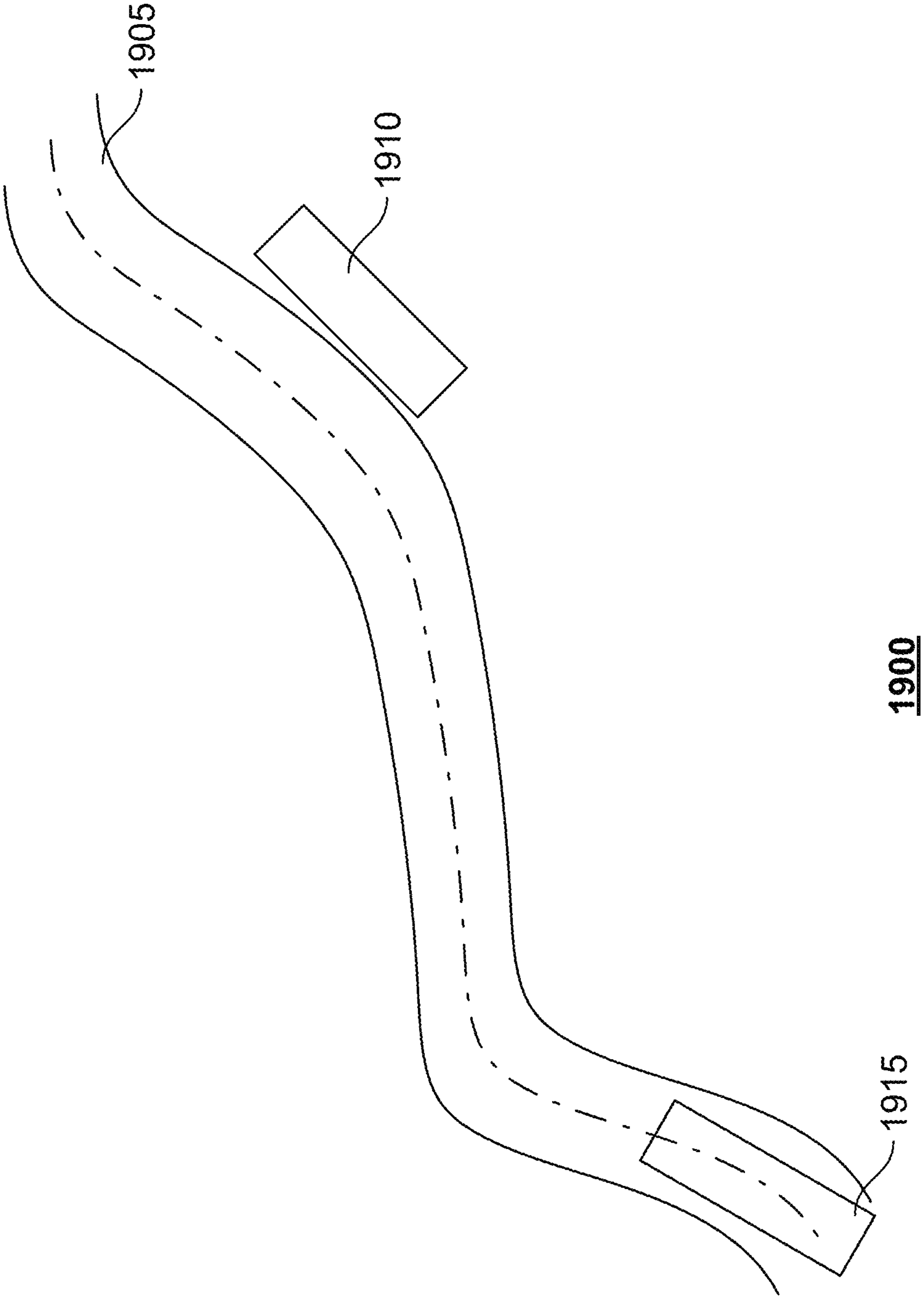
FIG. 19 is a diagram illustrating vehicle locations according to various embodiments of the present application.

FIG. 19 is a diagram illustrating vehicle locations according to various embodiments of the present application. In the example shown, unified map 1900 comprises information pertaining to vehicle 1910 and vehicle 1915 which are on or within proximity to road 1905. The system may use unified map 1900 to determine that vehicle 1910 is not a sitting duck because it is parked a relatively safe distance from road 1905 (e.g., from the side of the road or middle third of the road, depending on the heuristics used to perform the parking assessment). The system may further use unified map 1900 to determine that vehicle 1915 is parked as a sitting duck because vehicle 1915 is located in the middle of road 1905 (e.g., in the absence of traffic). If road 1905 has traffic (not shown), then the system may deem vehicle 1915 to not be a sitting duck because it is likely not parked but rather is stationary because of traffic.

Figure 20:
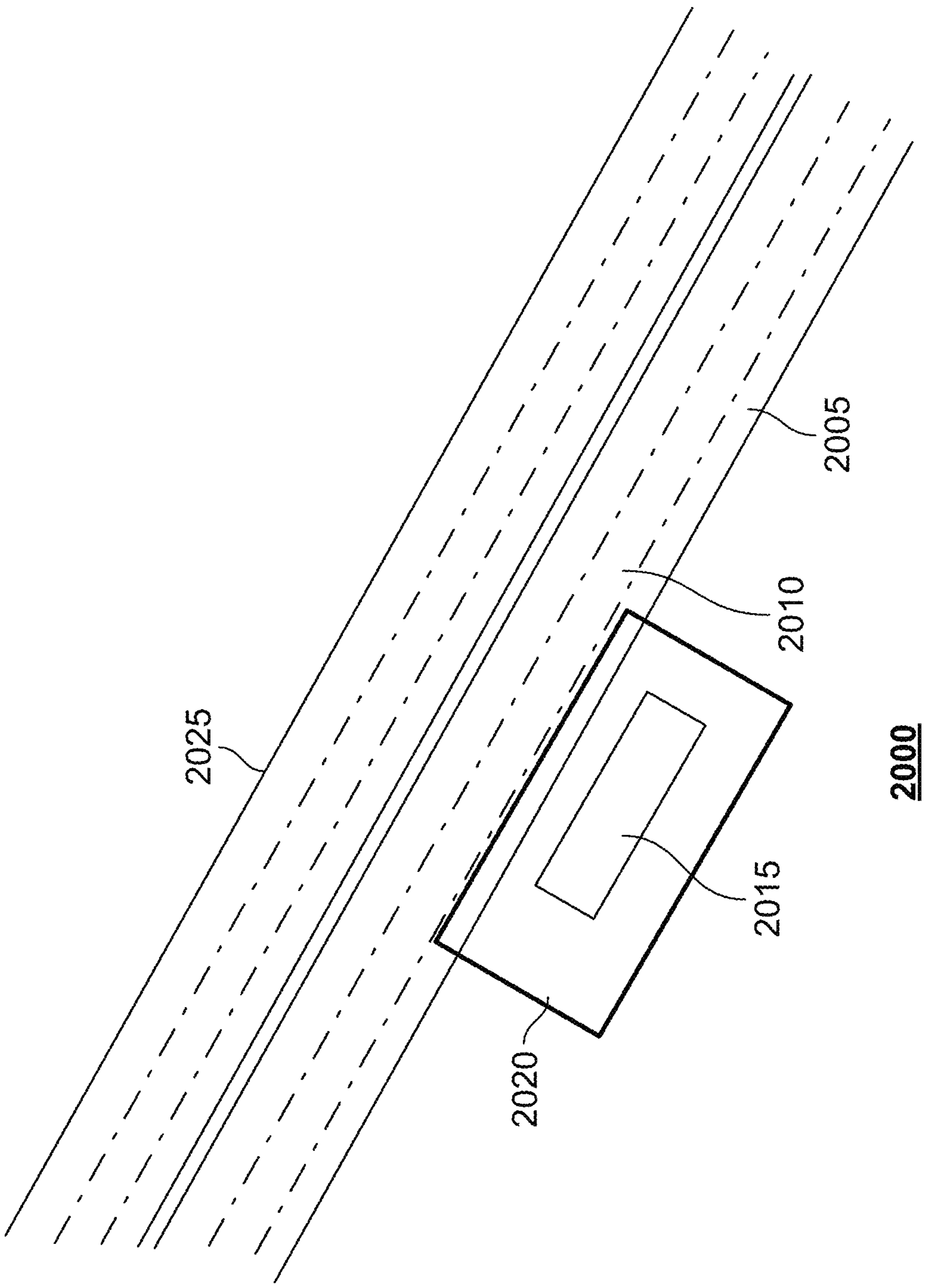
FIG. 20 is a diagram illustrating vehicle locations according to various embodiments of the present application.

FIG. 20 is a diagram illustrating vehicle locations according to various embodiments of the present application. In the example shown, the system uses unified map 2000 to perform a parking assessment, such as to determine whether vehicle 2015 is parked, or whether vehicle 2015 is a sitting duck with respect to road 2005. The system obtains map data indicating the various roads within the geographic area, including road 2005, and road 2025. The system uses road data to determine a middle portion 2010 of road 2005. For example, the system determines a road classification for road 2005 or a road width. The system determines a bounding box 2020 with respect to vehicle 2015 and determines the position of bounding box 2020 in relation to road 2005 and/or road 2025. For example, the system determines that bounding box 2020 partially overlaps with road 2005. The system may use a heuristic indicating that if the bounding box does not overlap with a middle portion of the road (e.g., middle portion 2010 for road 2005), then vehicle 2015 is not within the roadway or at an unsafe location with respect to road 2005 (e.g., the system determines that the vehicle is parked along road 2005). As another example, the system may use a heuristic indicating that if the centroid of bounding box 2020 or vehicle 2015 overlaps with road 2005 (or a middle portion 2010 of road 2005), then vehicle 2015 is deemed to be within the roadway.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory;

one or more processors configured to:

obtain context information for a managed vehicle;

obtain map data;

determine, based at least in part on the context information and the map data, whether the managed vehicle is parked in an unsafe location, comprising to:

determine whether the managed vehicle is parked; and in response to determining that the managed vehicle is parked, determine whether a location of the managed vehicle is within an unsafe location, comprising to:

obtain Global Positioning System (GPS) data associated with the location of the managed vehicle;

determine a bounding box for the managed vehicle based at least in part on the GPS data; and determine whether the bounding box is within the unsafe location of a map corresponding to the map data;

in response to determining that the managed vehicle is parked in the unsafe location, determine whether to perform an active measure with respect to the managed vehicle; and in response to determining to perform the active measure, perform the active measure.

2. The system of claim 1, wherein:

the context information comprises Global Positioning System (GPS) data associated with a location of the managed vehicle;

the map data comprises an indication of one or more roads; and determining whether the managed vehicle is parked in the unsafe location comprises determining whether the managed vehicle is parked on or within a threshold distance of at least one or more roads.

3. The system of claim 1, wherein a determination of whether the managed vehicle is parked is based at least in part on driving data obtained from the managed vehicle.

4. The system of claim 3, wherein the driving data comprises a current speed, a direction of travel, and/or a vehicle location.

5. The system of claim 1, wherein a determination of whether the managed vehicle is parked is based at least in part on a current image of an exterior of the managed vehicle obtained from the managed vehicle.

6. The system of claim 1, wherein the bounding box for the managed vehicle is determined based on using coordinates of the GPS data as a centroid of the bounding box and an expected size of the managed vehicle.

7. The system of claim 1, wherein the unsafe location of the map is determined based on a predetermined parts of the map deemed unsafe.

8. The system of claim 1, wherein determining whether the location of the managed vehicle is within the unsafe location comprises:

determining the location of the managed vehicle;

determining a road corresponding to the location of the managed vehicle and/or a plausible driving pattern prior to parking; and determining whether the road corresponding to the location of the managed vehicle corresponds to the unsafe parking location based at least in part on a road classification for the road and/or the plausible driving pattern prior to parking.

9. The system of claim 8, wherein determining whether the road corresponding to the location of the managed vehicle corresponds to the unsafe parking location based at least in part on the road classification for the road comprises:

obtaining the road classification for the road, wherein the road is classified based at least in part on one or more of (i) a highway indication that the road is an interstate highway, (ii) a determination that a speed limit for traffic on the road exceeds a predefined speed limit, (iii) an on ramp unsafe indication or an off ramp unsafe indication to a controlled access highway, and (iv) an area indication of whether the road is within a rural or urban area.

10. The system of claim 1, wherein determining whether the managed vehicle is parked in the unsafe location comprises:

computing a confidence level associated with a likelihood that a location of the managed vehicle corresponds to the unsafe location;

determining whether the confidence score is greater than a confidence level threshold; and in response to determining that the confidence level is greater than the confidence level threshold, deeming the managed vehicle as being parked in the unsafe location.

11. The system of claim 10, wherein the confidence level is based at least in part on one or more of: (i) a determination of whether the location of the managed vehicle is within a roadway of a road, (ii) validating plausible vehicle movements prior to parking, and (iii) traffic data pertaining to the location of the managed vehicle.

12. The system of claim 1, wherein the active measure comprises sending an alert to one or more of a driver of the managed vehicle and a fleet manager associated with the managed vehicle.

13. The system of claim 1, wherein determining whether the managed vehicle is parked in an unsafe location further comprises determine whether the managed vehicle is subject to a temporarily exclusion from being indicated that the managed vehicle is parked unsafely.

14. The system of claim 13, wherein the temporary exclusion comprises an exclusion due to weather conditions.

15. The system of claim 13, wherein the temporary exclusion comprises an exclusion due to emergency conditions.

16. A system, comprising:

a memory;

one or more processors configured to:

obtain context information for a managed vehicle;

obtain map data;

determine, based at least in part on the context information and the map data, whether the managed vehicle is parked in an unsafe location, comprising to:

determining whether the managed vehicle is parked; and in response to determining that the managed vehicle is parked, determining whether a location of the managed vehicle is within an unsafe location, comprising:

determining the location of the managed vehicle and a plausible driving pattern prior to parking;

determining whether the location of the managed vehicle corresponds to a predefined exclusion zone and the plausible driving pattern prior to parking; and in response to determining that the location of the managed vehicle corresponds to the predefined exclusion zone, determining that the location of the managed vehicle is within a safe location;

in response to determining that the managed vehicle is parked in the unsafe location, determine whether to perform an active measure with respect to the managed vehicle; and in response to determining to perform the active measure, perform the active measure.

17. The system of claim 16, wherein a location is classified as a safe position based at least in part on one or more of traffic data, road data, current traffic data, current weather data, and hazard data.

18. The system of claim 16, wherein the predefined exclusion zones correspond to one or more of a parking lot and a part of the map corresponding to an underpass of a road deemed unsafe.

19. A method, comprising:

obtaining, by one or more processors, context information for a managed vehicle;

obtaining map data;

determining, based at least in part on the context information and the map data, whether the managed vehicle is parked in an unsafe location, comprising:

determining whether the managed vehicle is parked; and in response to determining that the managed vehicle is parked, determining whether a location of the managed vehicle is within an unsafe location, comprising:

obtaining Global Positioning System (GPS) data associated with the location of the managed vehicle;

determining a bounding box for the managed vehicle based at least in part on the GPS data; and determining whether the bounding box is within the unsafe location of a map corresponding to the map data;

in response to determining that the managed vehicle is parked in the unsafe location, determining whether to perform an active measure with respect to the managed vehicle; and in response to determining to perform the active measure, performing the active measure.

20. A computer program product embodied in a non-transitory computer readable medium and comprising computer instructions for:

obtaining, by one or more processors, context information for a managed vehicle;

obtaining map data;

determining, based at least in part on the context information and the map data, whether the managed vehicle is parked in an unsafe location, comprising:

determining whether the managed vehicle is parked; and in response to determining that the managed vehicle is parked, determining whether a location of the managed vehicle is within an unsafe location, comprising:

obtaining Global Positioning System (GPS) data associated with the location of the managed vehicle:

determining a bounding box for the managed vehicle based at least in part on the GPS data; and determining whether the bounding box is within the unsafe location of a map corresponding to the map data:

in response to determining that the managed vehicle is parked in the unsafe location, determining whether to perform an active measure with respect to the managed vehicle; and in response to determining to perform the active measure, performing the active measure.

21. A method, comprising:

obtaining, by one or more processors, context information for a managed vehicle;

obtaining map data;

determining, based at least in part on the context information and the map data, whether the managed vehicle is parked in an unsafe location, comprising:

determining whether the managed vehicle is parked; and in response to determining that the managed vehicle is parked, determining whether a location of the managed vehicle is within an unsafe location, comprising to:

determining the location of the managed vehicle and a plausible driving pattern prior to parking;

determining whether the location of the managed vehicle corresponds to a predefined exclusion zone and the plausible driving pattern prior to parking; and in response to determining that the location of the managed vehicle corresponds to the predefined exclusion zone, determining that the location of the managed vehicle is within a safe location;

in response to determining that the managed vehicle is parked in the unsafe location, determining whether to perform an active measure with respect to the managed vehicle; and in response to determining to perform the active measure, performing the active measure.

22. A computer program product embodied in a non-transitory computer readable medium and comprising computer instructions for:

obtaining, by one or more processors, context information for a managed vehicle;

obtaining map data;

determining, based at least in part on the context information and the map data, whether the managed vehicle is parked in an unsafe location, comprising:

determining whether the managed vehicle is parked; and in response to determining that the managed vehicle is parked, determining whether a location of the managed vehicle is within an unsafe location, comprising:

determining the location of the managed vehicle and a plausible driving pattern prior to parking;

determining whether the location of the managed vehicle corresponds to a predefined exclusion zone and the plausible driving pattern prior to parking; and in response to determining that the location of the managed vehicle corresponds to the predefined exclusion zone, determining that the location of the managed vehicle is within a safe location;

in response to determining that the managed vehicle is parked in the unsafe location, determining whether to perform an active measure with respect to the managed vehicle; and in response to determining to perform the active measure, performing the active measure.

23. A system, comprising:

a memory;

one or more processors configured to:

obtain context information for a managed vehicle;

obtain map data;

determine, based at least in part on the context information and the map data, whether the managed vehicle is parked in an unsafe location, comprising to:

determine whether the managed vehicle is expected to be parked;

in response to determining that the managed vehicle is expected to be parked, determine whether the managed vehicle is expected to be parked in the unsafe location;

in response to determining that the managed vehicle is expected to be parked in the unsafe location, set a status for the managed vehicle to a pending status;

determine whether a threshold parking time has elapsed since the status for the managed vehicle was set to the pending status; and in response to determining that the threshold parking time has elapsed since the status for the managed vehicle was set to the pending status, determine that the managed vehicle is parked in the unsafe location;

in response to determining that the managed vehicle is parked in the unsafe location, determine whether to perform an active measure with respect to the managed vehicle; and in response to determining to perform the active measure, perform the active measure.

24. A method, comprising:

obtaining, by one or more processors, context information for a managed vehicle;

obtaining map data;

determining, based at least in part on the context information and the map data, whether the managed vehicle is parked in an unsafe location, comprising:

determining whether the managed vehicle is expected to be parked;

in response to determining that the managed vehicle is expected to be parked, determining whether the managed vehicle is expected to be parked in the unsafe location;

in response to determining that the managed vehicle is expected to be parked in the unsafe location, setting a status for the managed vehicle to a pending status;

determining whether a threshold parking time has elapsed since the status for the managed vehicle was set to the pending status; and in response to determining that the threshold parking time has elapsed since the status for the managed vehicle was set to the pending status, determining that the managed vehicle is parked in the unsafe location;

in response to determining that the managed vehicle is parked in the unsafe location, determining whether to perform an active measure with respect to the managed vehicle; and in response to determining to perform the active measure, performing the active measure.

25. A computer program product embodied in a non-transitory computer readable medium and comprising computer instructions for:

obtaining, by one or more processors, context information for a managed vehicle;

obtaining map data;

determining, based at least in part on the context information and the map data, whether the managed vehicle is parked in an unsafe location, comprising:

determining whether the managed vehicle is expected to be parked;

in response to determining that the managed vehicle is expected to be parked, determining whether the managed vehicle is expected to be parked in the unsafe location;

in response to determining that the managed vehicle is expected to be parked in the unsafe location, setting a status for the managed vehicle to a pending status;

determining whether a threshold parking time has elapsed since the status for the managed vehicle was set to the pending status; and in response to determining that the threshold parking time has elapsed since the status for the managed vehicle was set to the pending status, determining that the managed vehicle is parked in the unsafe location;

in response to determining that the managed vehicle is parked in the unsafe location, determining whether to perform an active measure with respect to the managed vehicle; and in response to determining to perform the active measure, performing the active measure.

* * * * *